United States Patent
Ogawa et al.

(10) Patent No.: US 8,318,380 B2
(45) Date of Patent: Nov. 27, 2012

(54) FUEL CELL AND VEHICLE HAVING FUEL CELL

(75) Inventors: Tomohiro Ogawa, Susono (JP);
Masaaki Kondo, Owariasahi (JP);
Kazunori Shibata, Mishima (JP);
Takashi Kajiwara, Gotemba (JP);
Tsutomu Shirakawa, Susono (JP);
Satoshi Futami, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 453 days.

(21) Appl. No.: 12/525,974

(22) PCT Filed: Feb. 5, 2008

(86) PCT No.: PCT/IB2008/000242
§ 371 (c)(1),
(2), (4) Date: Aug. 5, 2009

(87) PCT Pub. No.: WO2008/096227
PCT Pub. Date: Aug. 14, 2008

(65) Prior Publication Data
US 2010/0104912 A1 Apr. 29, 2010

(30) Foreign Application Priority Data

Feb. 5, 2007 (JP) .................................. 2007-025190
Jul. 18, 2007 (JP) .................................. 2007-186674

(51) Int. Cl.
*H01M 8/04* (2006.01)
(52) U.S. Cl. .......................................................... 429/513
(58) Field of Classification Search ........................... None
See application file for complete search history.

(56) References Cited

U.S. PATENT DOCUMENTS

| | | | | |
|---|---|---|---|---|
| 5,482,792 A | * | 1/1996 | Faita et al. | 429/437 |
| 6,686,084 B2 | * | 2/2004 | Issacci et al. | 429/450 |
| 2003/0039874 A1 | | 2/2003 | Jankowski et al. | |
| 2003/0039876 A1 | * | 2/2003 | Knights et al. | 429/30 |
| 2003/0138685 A1 | | 7/2003 | Jankowski et al. | |
| 2004/0043273 A1 | | 3/2004 | Jankowksi et al. | |
| 2004/0048128 A1 | | 3/2004 | Jankowksi et al. | |

(Continued)

FOREIGN PATENT DOCUMENTS

EP 1 501 143 A1 1/2005

(Continued)

OTHER PUBLICATIONS

Office Action issued May 18, 2011, in Canada Patent Application No. 2,676,027.

(Continued)

*Primary Examiner* — Patrick Ryan
*Assistant Examiner* — Wyatt McConnell
(74) *Attorney, Agent, or Firm* — Oblon, Spivak, McClelland, Maier & Neustadt, L.L.P.

(57) ABSTRACT

A fuel cell has: an electrolyte; an anode provided on one side of the electrolyte and having a fuel-gas consuming face at which fuel gas is consumed; a cathode provided on the other side of the electrolyte and having an oxidizing-gas consuming face at which oxidizing gas is consumed; and a fuel-gas passage portion forming a passage through which fuel gas is supplied to predetermined regions of the fuel-gas consuming face of the anode. The fuel cell has an operation mode in which almost the entire amount of the supplied fuel gas is consumed at the fuel-gas consuming face of the anode.

21 Claims, 46 Drawing Sheets

U.S. PATENT DOCUMENTS

| | | | |
|---|---|---|---|
| 2005/0233080 A1* | 10/2005 | Ji et al. | 427/256 |
| 2005/0282057 A1* | 12/2005 | Brenner et al. | 429/34 |
| 2006/0147779 A1 | 7/2006 | Schwartz | |
| 2007/0048594 A1* | 3/2007 | Oh et al. | 429/44 |
| 2007/0221496 A1 | 9/2007 | Bohnke et al. | |

FOREIGN PATENT DOCUMENTS

| | | |
|---|---|---|
| JP | 01 076671 | 3/1989 |
| JP | 1 320772 | 12/1989 |
| JP | 3 110761 | 5/1991 |
| JP | 3-130150 U | 12/1991 |
| JP | 4 322062 | 11/1992 |
| JP | 6 36780 | 2/1994 |
| JP | 8 167417 | 6/1995 |
| JP | 08-124583 | 5/1996 |
| JP | 10 15419 | 1/1998 |
| JP | 10-294117 | 11/1998 |
| JP | 11 297340 | 10/1999 |
| JP | 2000 82482 | 3/2000 |
| JP | 2000 100458 | 4/2000 |
| JP | 2000 195529 | 7/2000 |
| JP | 2002-042832 | 2/2002 |
| JP | 2002 280028 | 9/2002 |
| JP | 2004 6104 | 1/2004 |
| JP | 2004 55220 | 2/2004 |
| JP | 2004 55481 | 2/2004 |
| JP | 2004-127566 | 4/2004 |
| JP | 2005-038738 | 2/2005 |
| JP | 2005 85517 | 3/2005 |
| JP | 2005 108820 | 4/2005 |
| JP | 2005 235571 | 9/2005 |
| JP | 2005 243476 | 9/2005 |
| JP | 2005 302675 | 10/2005 |
| JP | 2005 339943 | 12/2005 |
| JP | 2005-353303 | 12/2005 |
| JP | 2006 49177 | 2/2006 |
| JP | 2006 107899 | 4/2006 |
| JP | 2006 107968 | 4/2006 |
| JP | 2006-164942 | 6/2006 |
| JP | 2006 236597 | 9/2006 |
| JP | 2006 236851 | 9/2006 |
| JP | 2007 48538 | 2/2007 |
| WO | 2005 103336 | 11/2005 |

OTHER PUBLICATIONS

Office Action (with English translation) issued on Jul. 11, 2012, in counterpart Japanese Patent Appln. No. JP 2007-186674 (6 pages).

* cited by examiner

FIG. 3
COMPARATIVE EXAMPLE
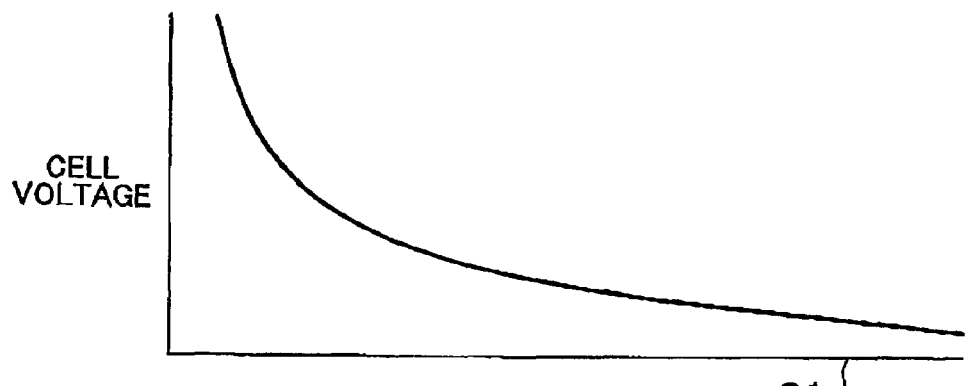
RELATION BETWEEN TIME FROM FUEL-GAS
DISCHARGE STOP AND CELL VOLTAGE
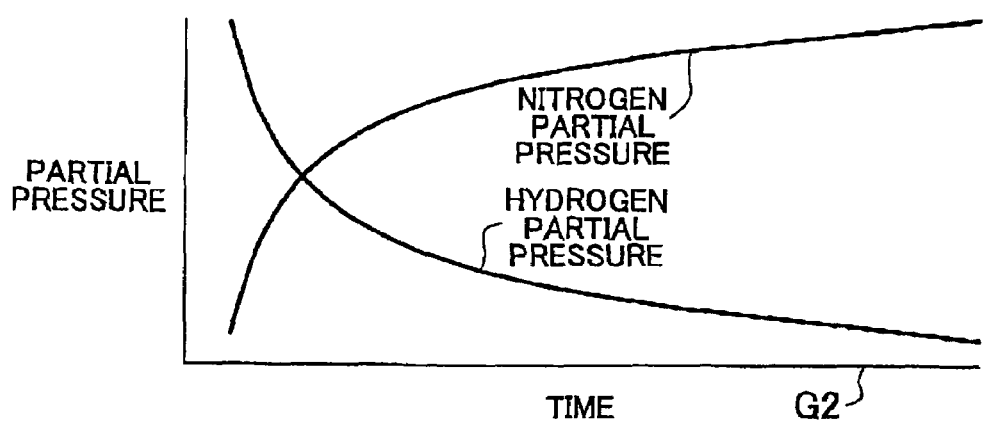
RELATION BETWEEN TIME FROM FUEL-GAS
DISCHARGE STOP AND GAS PARTIAL PRESSURE

COMPARATIVE EXAMPLE

FUEL-GAS SUPPLY PASSAGE
(DURING STOPPAGE OF FUEL GAS DISCHARGE)

B-B CROSS SECTION

EXAMPLE EMBODIMENT

C-C CROSS SECTION (ENLARGED VIEW)

FIG.19
D-D CROSS SECTION (OTHER EXAMPLE)
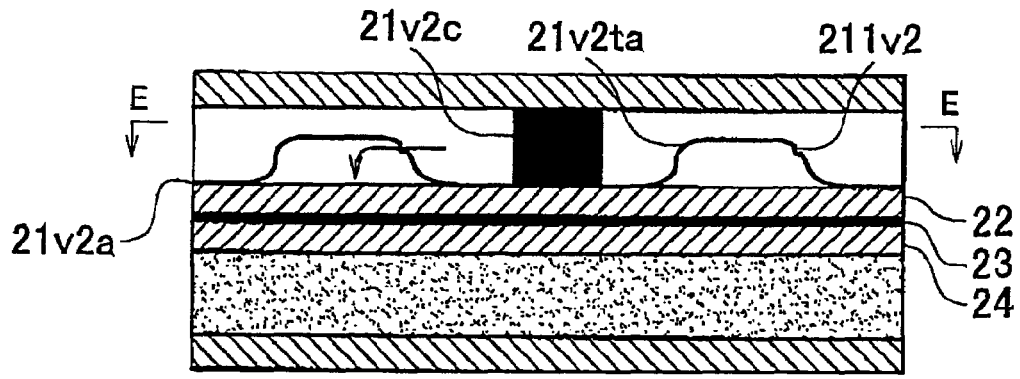
E-E CROSS SECTION (OTHER EXAMPLE)
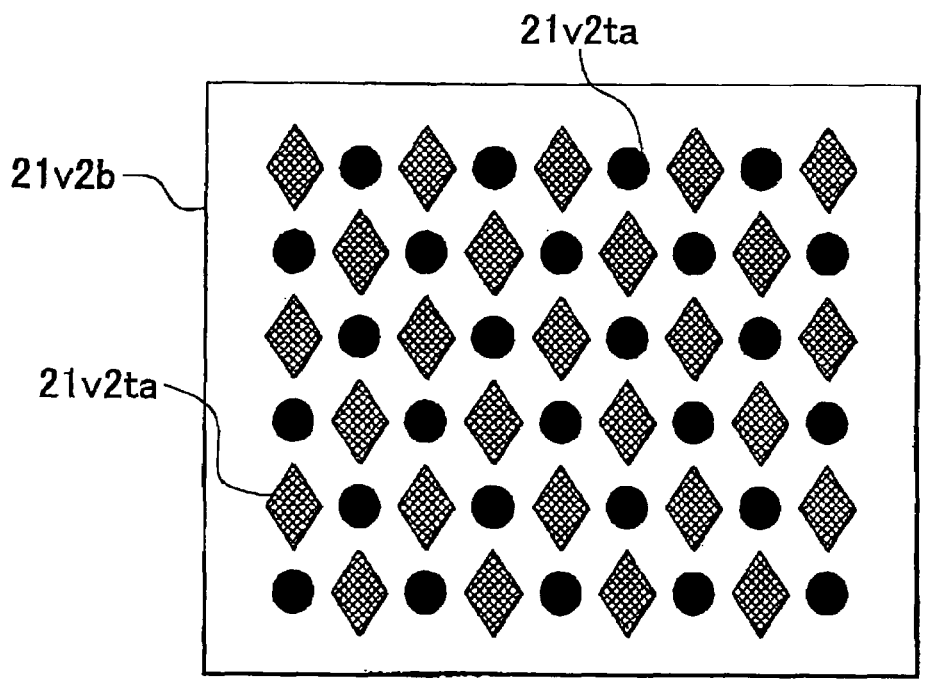

FIG. 22

NERNST EQUATION
(HIGH-TEMPERATURE TYPE FUEL CELL)

$$E = E^0 + \frac{RT}{2F} \ln\left(\frac{\frac{P_{H_2}}{P^0} \cdot \left(\frac{P_{O_2}}{P^0}\right)^{\frac{1}{2}}}{\frac{P_{H_2O}}{P^0}}\right) \quad \cdots F1$$

$$\Delta V = \frac{RT}{2F} \ln\left(\frac{P_2}{P_1}\right) = 0.010 \ln\left(\frac{P_2}{P_1}\right) \quad \cdots F2$$

E : ELECTROMOTIVE FORCE
$E^0$ : STANDARD ELECTROMOTIVE FORCE
R : GAS CONSTANT
T : ABSOLUTE TEMPERATURE
F : FARADAY CONSTANT
$P_{H_2}$ : HYDROGEN PARTIAL PRESSURE
$P_{O_2}$ : OXYGEN PARTIAL PRESSURE
$P^0$ : STANDARD PRESSURE

FIG. 23

PARSONS EMPIRICAL FORMULA
(LOW-TEMPERATURE TYPE FUEL CELL)

$$\Delta V = 0.063 \ln\left(\frac{P_2}{P_1}\right) \quad \cdots F3$$

FIG. 24

$$J = -D \frac{dc}{dx} \quad \cdots F4$$

J : DIFFUSION FLUX
   (DIFFUSION AMOUNT PER UNIT TIME AND UNIT AREA)
D: DIFFUSION COEFFICIENT
c: CONCENTRATION
x: POSITION

B-B CROSS SECTION

FIG. 31
OXIDIZING-GAS PASSAGE PORTION
(DURING STOPPAGE OF FUEL GAS DISCHARGE)
FIRST MODIFICATION EXAMPLE
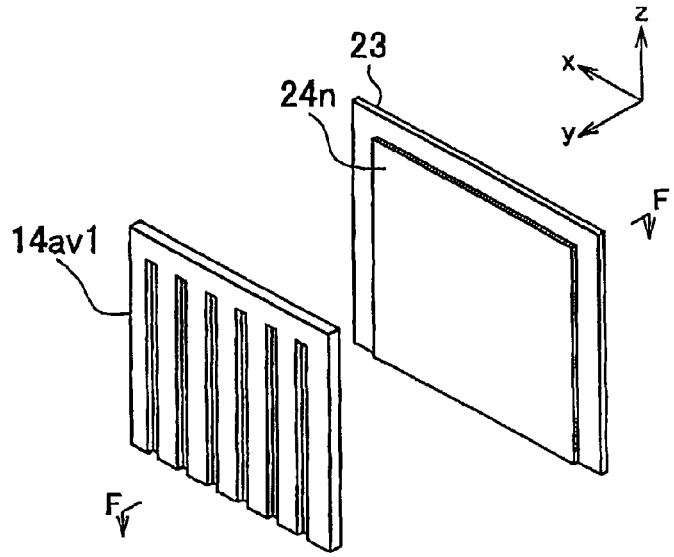
F-F CROSS SECTION
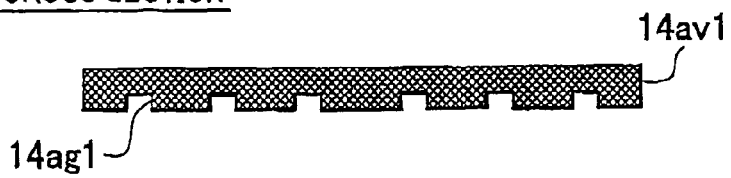
FIG. 32
SECOND MODIFICATION EXAMPLE
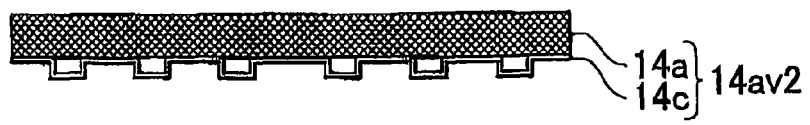

THIRD MODIFICATION EXAMPLE

FOURTH MODIFICATION EXAMPLE

FIG. 36
FIFTH MODIFICATION EXAMPLE
OF FUEL GAS PASSAGE PORTION
(MANUFACTURING METHOD)
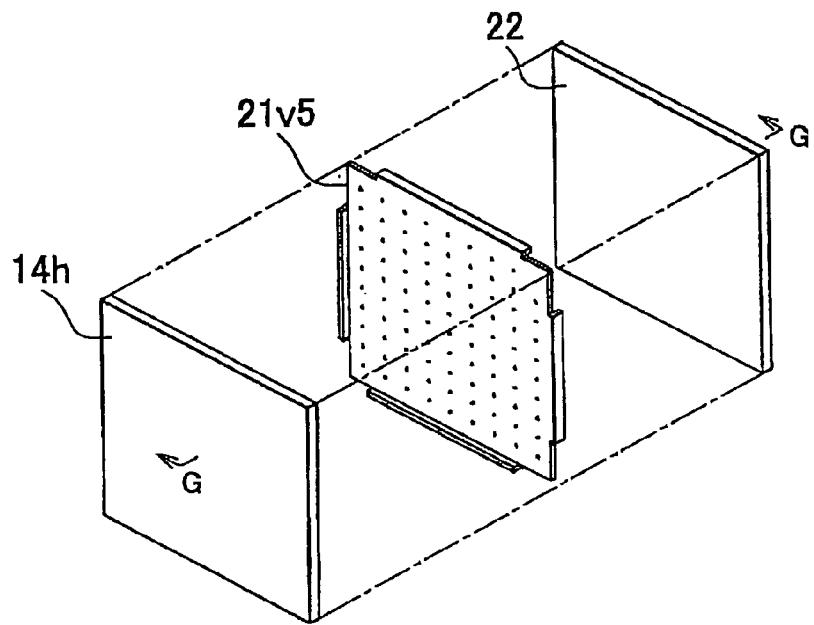
G-G CROSS SECTION
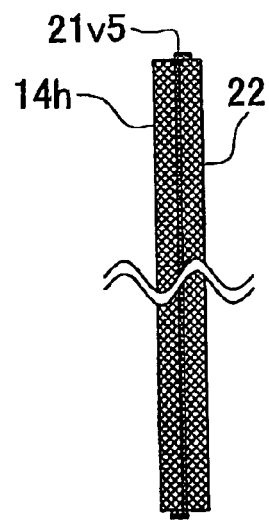

FIG. 37
SIXTH MODIFICATION EXAMPLE
OF FUEL GAS PASSAGE PORTION
(OTHER MANUFACTURING METHOD)
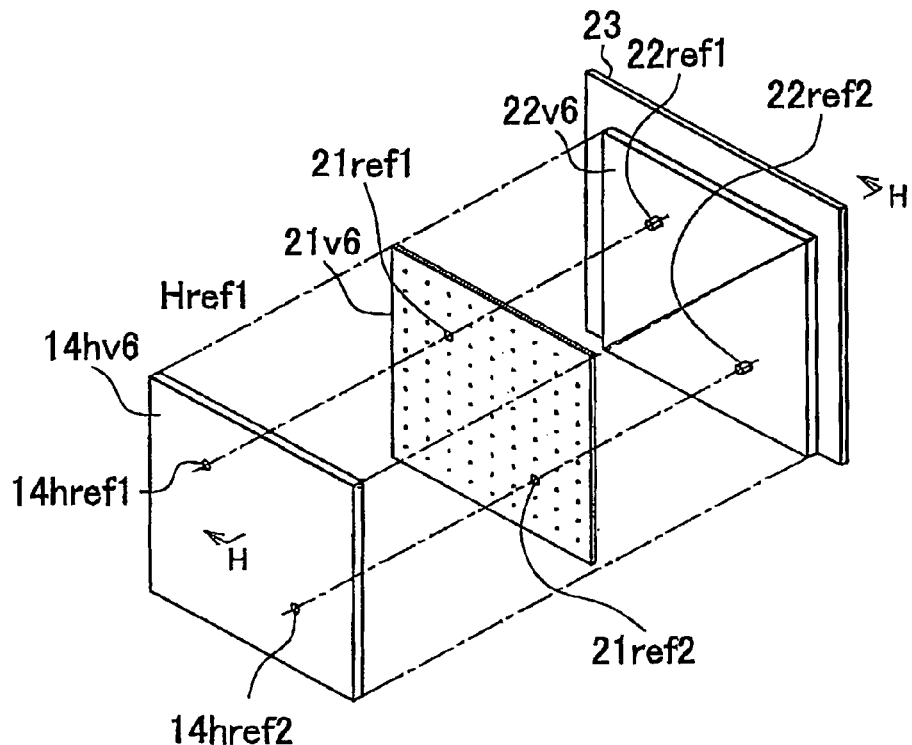
H-H CROSS SECTION
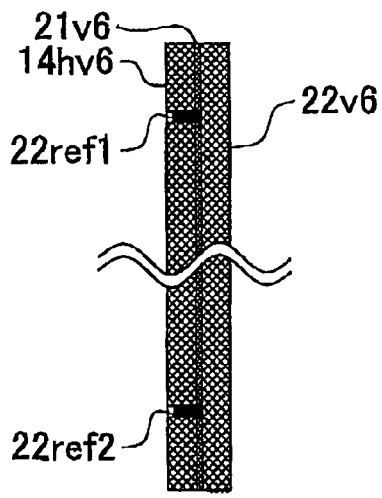

EXAMPLE EMBODIMENT

FUEL CELL AND VEHICLE HAVING FUEL CELL

BACKGROUND OF THE INVENTION

1. Field of the Invention

The invention relates to a fuel cell stack.

2. Description of the Related Art

Conventionally, fuel cell stacks employ a so-called circulation type fuel-gas passage structure for distributing fuel gas within the fuel cell stack. The circulation type fuel-gas passage structure is used to discharge nitrogen gas, which accumulates within a fuel-gas passage portion and interferes with the supply of fuel gas, to the outside of the fuel cell stack. The nitrogen gas enters the fuel-gas passage portion from an oxidizing-gas passage portion via the electrolyte. Meanwhile, a non-circulation type fuel-gas passage structure for fuel cell stacks has been proposed which is used with a nitrogen gas storage provided outside of the fuel cell stack and connected to the fuel cell stack via a valve, which is described in Japanese Patent Application Publication No. 2005-243476 (JP-A-2005-243476). According to this structure, fuel gas is supplied to the fuel cell stack while repeatedly switching the state of the valve between the open state and the closed state (non-continuous operation type fuel cell system). That is, when fuel gas is supplied to the fuel cell stack, the valve is closed, whereby the pressure in the fuel cell stack increases.

However, the above publication recites nothing regarding the possibility or the necessity to provide a fuel cell stack having a non-circulation type fuel-gas passage structure that allows continuous fuel cell operation.

SUMMARY OF THE INVENTION

The invention provides a technology that enables continuous operation of a fuel-cell stack having a non-circulation type fuel gas passage structure.

A first aspect of the invention relates to a fuel cell having: an electrolyte; an anode provided on one side of the electrolyte and having a fuel-gas consuming face at which fuel gas is consumed; a cathode provided on the other side of the electrolyte and having an oxidizing-gas consuming face at which oxidizing gas is consumed; and a fuel-gas passage portion forming a passage through which fuel gas is supplied to predetermined regions of the fuel-gas consuming face of the anode. The fuel cell has an operation mode in which almost the entire amount of the supplied fuel gas is consumed at the fuel-gas consuming face of the anode.

According to the fuel cell described above, because fuel gas is supplied to the predetermined regions of the fuel-gas consuming face of the anode, the consumption of hydrogen at other regions is suppressed and nitrogen gas is inhibited from entering other regions, whereby fuel gas is evenly supplied to the respective regions of the fuel-gas consuming face of the anode.

As such, power generation is performed using almost the entire amount of the fuel gas supplied as described above at the respective regions of the fuel-consuming face of the anode. According to the fuel cell described above, therefore, there is no need to provide any fuel-gas discharge system, and thus the system configuration can be simplified, and further it is possible to eliminate the possibility of loss at the compressor which may otherwise be caused when it is used to circulate fuel gas, whereby the system operation efficiency improves.

Referring to the wording of the foregoing description of the fuel cell, "fuel-gas consuming face" represents a face of the anode at which a layer that consumes fuel gas is exposed to the fuel-gas passage portion, and "oxidizing-gas consuming face" represents a face of the cathode at which a layer that consumes oxidizing gas is exposed to an oxidizing-gas passage portion. Further, "consumption" is intended to have a broad meaning including both consumptions for reactions and cross-leaks. The sentence "the fuel gas has an operation mode" means that the described operation mode is not always necessary in effect and there may be various other modes including the one that is periodically used to discharge fuel gas from the fuel cell for maintenance. Further, "predetermined regions" include, for example, regions to which fuel gas is supplied from corresponding orifices.

The above-described fuel cell may be such that the fuel-gas passage portion includes: a first passage portion through which fuel gas is distributed toward the predetermined regions of the fuel-gas consuming face of the anode; a second passage portion through which the distributed gases are supplied to the predetermined regions of the fuel-gas consuming face of the anode, respectively, and; a reverse-flow suppressing portion that suppresses a reverse flow from the second passage portion to the first passage portion.

Note that "first passage portion" corresponds to, for example, the hydrogen-side porous passage portion $14h$ in the example embodiment, and "second passage portion" corresponds to, for example, the hydrogen-side electrode layer $22$ in the example embodiment, and "reverse-flow suppressing portion" corresponds to, for example, the fuel gas supply plate $21n$ in the example embodiment.

The above-described fuel cell may be such that the reverse-flow suppressing portion supplies fuel gas at a flow rate equal to or higher than a flow rate that is predetermined based on a diffusion rate of nitrogen in a given operation state of the fuel cell, or may be such that the reverse-flow suppressing portion is provided between the first passage portion and the second passage portion and has a plurality of through holes via which fuel gas is supplied at a flow rate equal to or higher than the flow rate that is predetermined based on the nitrogen diffusion rate. According to these structures, the flow of nitrogen gas dispersing from the second passage portion to the first passage portion can be suppressed more properly.

Further, the above-described fuel cell may be such that the second passage portion has a plurality of holes communicating with at least one of the through holes of the reverse-flow suppressing portion. According to this structure, exhaust water membranes are divided by the supplied fuel gas, whereby flooding of exhaust water can be effectively suppressed.

The above-described fuel cell may be such that the first passage portion and the second passage portion each have a porous portion permeable to a reaction gas and a pressure loss per unit length of the porous portion of the first passage portion is smaller than a pressure loss per unit length of the porous portion of the second passage portion. According to this structure, the pressure at which to supply fuel gas to the reverse-flow suppressing portion can be easily made uniform.

The above-described fuel cell may be such that the first passage portion and the second passage portion each have a porous portion permeable to a reaction gas, and a pressure loss per unit length of the porous portion of the second passage portion is smaller than a pressure loss per unit length of the porous portion of the first passage portion. This structure promotes dispersion of nitrogen gas in the second passage portion and thus inhibits nitrogen gas from entering the first passage portion from the second passage portion.

The above-described fuel cell may be such that the water repellency of the second passage portion increases toward the electrolyte in a direction in which components of the fuel cell are stacked, such that the hydrophilicity of the second passage portion increases toward the side away from the electrolyte in a direction in which components of the fuel cell are stacked, or such that the second passage portion is formed of a porous material, the density of which increases toward the side away from the electrolyte in a direction in which components of the fuel cell are stacked. These structures may be employed in various combinations.

According to the structures described above, the drainability of exhaust water improves and flooding of exhaust water can be effectively suppressed at the fuel-gas side electrode.

Further, the above-described fuel cell may be such that: the oxidizing gas contains air; the anode is provided on an outer face of the electrolyte on one side thereof and has a gas diffusibility; the cathode is provided on an outer face of the electrolyte on the other side thereof and has a gas diffusibility; a conductive sheet portion is provided adjacent to an outer face of the anode, which has a gas impermeability, a sheet-like shape, and a plurality of through holes that spread two-dimensionally along a horizontal plane of the conductive sheet portion; a conductive porous portion is provided adjacent to an outer face of the conductive sheet portion and forming a fuel-gas supply passage through which fuel gas is dispersedly distributed in directions along the horizontal plane of the conductive sheet portion; and a separator is provided adjacent to an outer face of the conductive porous portion.

According to the structure described above, the conductive sheet portion inhibits the leak gas, which leaks from the cathode side to the anode side, from entering the conductive porous portion, and therefore fuel gas can be dispersedly supplied to the anode. As a result, the power generation efficiency of the entire fuel cell improves.

A second aspect of the invention relates to a fuel cell having: an electrolyte; an anode provided on one side of the electrolyte and having a fuel-gas consuming face at which fuel gas is consumed; a cathode provided on the other side of the electrolyte and having an oxidizing-gas consuming face at which oxidizing gas is consumed; and a fuel-gas passage portion forming a passage through which fuel gas is supplied to predetermined regions of the fuel-gas consuming face of the anode in a direction crossing the fuel-gas consuming face of the anode. The fuel cell has an operation mode in which almost the entire amount of the supplied fuel gas is consumed at the fuel-gas consuming face of the anode.

The above-described fuel cell may be such that the fuel-gas passage portion includes: a first passage portion which is partitioned off from the fuel-gas consuming face of the anode and through which fuel gas is distributed to the predetermined regions of the fuel-gas consuming face of the anode; a second passage portion through which the distributed gases are supplied to the predetermined regions of the fuel-gas consuming face of the anode, respectively; and a reverse-flow suppressing portion that suppresses a reverse flow from the second passage to the first passage. Note that the word "partitioned" is intended to have a broad meaning, referring to the states where two or more regions or portions are partitioned off from each other such that contacts or fluid movements between the regions or portions are inhibited as well as the states where the regions or portions are completely partitioned off from each other.

Further, the above-described fuel cell may be such that the reverse-flow suppressing portion supplies fuel gas at a flow rate equal to or higher than a flow rate that is predetermined based on a diffusion rate of nitrogen in a given operation state of the fuel cell.

A third aspect of the invention relates to a fuel cell having: an electrolyte; an anode provided on one side of the electrolyte and having a fuel-gas consuming face at which fuel gas is consumed; a cathode provided on the other side of the electrolyte and having an oxidizing-gas consuming face at which oxidizing gas is consumed; and a fuel-gas passage portion forming a passage through which fuel gas is supplied to regions of the fuel-gas consuming face of the anode so as to reduce an unevenness between the fuel gas amounts to be supplied to the respective regions of the fuel-gas consuming face, which results from an unevenness between the fuel gas amounts consumed at the respective regions of the fuel-gas consuming face, wherein the fuel cell has an operation mode in which almost the entire amount of the supplied fuel gas is consumed at the fuel-gas consuming face of the anode.

According to the fuel cell described above, fuel gas is supplied so as to reduce the unevenness between the fuel gas amounts to be supplied to the respective regions of the fuel-gas consuming face, which has been caused by the variation of the total fuel gas pressure. Therefore, even if stagnation of gas other than fuel gas (i.e., nitrogen gas) occurs, fuel gas can be stably supplied to the respective regions of the fuel-gas consuming face. As such, in the fuel cell of the invention, power generation is performed using almost the entire amount of the fuel gas supplied as described above at the respective regions of the fuel-consuming face of the anode. Therefore, there is no need to provide any fuel-gas discharge system, and thus the system configuration can be simplified, and further it is possible to eliminate the possibility of loss at the compressor which may otherwise be caused when it is used to circulate fuel gas, whereby the system operation efficiency improves.

The above-described fuel cell may be such that the fuel-gas passage portion has a pressure-loss portion that produces a pressure loss that is predetermined based on the supply amount of the fuel gas.

The above-described fuel cell may be a solid polymer fuel cell.

Another aspect of the invention relates to a vehicle having the fuel cell described above and a drive portion that drives the vehicle using power supplied from the fuel cell.

Another aspect of the invention relates to a membrane-electrode assembly for a solid polymer fuel cell, having: an electrolyte membrane; an anode provided on one side of the electrolyte membrane, and having a fuel-gas consuming face at which fuel gas is consumed; a cathode provided on the other side of the electrolyte membrane and having an oxidizing-gas consuming face at which oxidizing gas is consumed, and a fuel-gas supply plate having at least one opening through which fuel gas is supplied to the fuel-gas consuming face of the anode in a direction crossing the fuel-gas consuming face of the anode, the at least one opening being formed so as to achieve a given aperture ratio of the fuel-gas supply plate. Note that "aperture ratio" is the value obtained by dividing the total area of the at least one opening by the area of the entire fuel-gas supply plate.

Another aspect of the invention relates to a fuel cell that is configured to operate in a mode in which power generation is continuously performed while maintaining the partial pressure of an impurity (e.g., nitrogen) at the anode (hydrogen-side electrode) and the partial pressure of the same impurity at the cathode (oxygen-side electrode) in balance. Note that "in balance" refers to, for example, a state where the impurity partial pressure at the anode and the impurity partial pressure at the cathode are in equilibrium, however, it is not limited to states where the partial pressures are equal to each other.

Optionally, the fuel cell of the invention may incorporate the structures shown in FIG. 50 and FIG. 51. The structure shown in FIG. 50 includes a first passage and a second passage. The first passage is located upstream of the second passage. The first passage and the second passage communicate with each other via a high-resistance communication passage portion 2100X having a flow resistance higher than the first passage or the second passage. Through these passages, fuel gas is distributed from the outside of the generation region (the outside of the fuel cell) via fuel gas distribution passages (manifolds). In other words, fuel gas is distributed from the first passage to the second passage mainly via the high-resistance communication passage portion 2100*x* (e.g., only via the high-resistance communication passage portion 2100X).

The first and second passages may be formed by porous materials as in the example described below. For example, they may be formed by using sealers S1, S2 (FIG. 50) or using a honeycomb-shaped member H2 (FIG. 51).

The high-resistance communication passage portion 2100X may be a plate member having inlet openings 2110*x* (through holes) that are formed so as to spread along the horizontal plane of said plate member. The high-resistance communication passage portion 2100X has at least one of the following roles. The first role is to limit the supply of fuel gas to the region of the second passage that is adjacent the fuel gas distribution passage. The second role is to reduce the unevenness in the gas pressure acting in the direction perpendicular to the planar direction of the second passage extending along the anode reaction portion. The third role is to change the direction of fuel gas flowing in the first passage from the planar direction of the first passage to a direction crossing or perpendicular to the planar direction of the first passage.

Another aspect of the invention relates to a fuel-cell system configured as follows. The fuel cell system has an operation mode in which the supplied fuel gas is substantially fully consumed at the anode reaction portion. The fuel cell system includes power generation cells each having: a gas inlet for taking in anode gas; a first gas passage guiding the anode gas taken in from the gas inlet to flow along the horizontal plane of the power generation cell; and a high-resistance portion extending along the anode reaction portion and having a plurality of communication passages that have a flow resistance higher than the flow resistance of the first gas passage and are formed so as to spread along the horizontal plane of the power generation cell, guiding the anode gas from the first passage to the second passage while restricting the flow of the anode gas entering the second gas passage from the first passage.

Another aspect of the invention relates to a fuel cell system configured as follows. That is, in this fuel cell system, the high-resistance portion has a first communication passage corresponding to a first portion of the anode reaction portion and a second communication passage corresponding to a second portion of the anode reaction portion, and the ratio of the amount of the anode gas delivered through the first communication passage to the amount of the anode gas consumed at the first portion of the anode reaction portion is higher than the ratio of the amount of the anode gas delivered through the second communication passage to the amount of the anode gas consumed at the first portion of the anode reaction portion. In this fuel cell, alternatively, the high-resistance portion has a first communication passage corresponding to a first portion of the anode reaction portion and a second communication passage corresponding to a second portion of the anode reaction portion, and the ratio of the amount of the anode gas consumed at the first portion of the anode reaction portion to the amount of the anode gas delivered through the first communication passage is higher than the ratio of the amount of the anode gas consumed at the second portion of the anode reaction portion to the amount of the anode gas delivered through the first communication passage.

Meanwhile, preferably, the high-resistance portion is not provided in the cathode passage. Further, preferably, the second passage is not provided in the cathode passage. That is, in the cathode passage, preferably, only the first passage is provided to deliver the cathode gas from a gas inlet for the cathode to the inner side of the power generation cell. However, if a gas-diffusion layer is regarded as the second passage, the first passage and the second passage may be provided in combination. In any case, it is considered that, by not providing the high-resistance passage portion in the cathode, the workload of a device for delivering the cathode gas can be maintained low and the drainability at the cathode can be maintained high. In particular, the above structure provides significant effects when it is employed in a system in which the water drainability from the anode of each cell is low (i.e., a system that does not discharge the fuel gas periodically).

Note that the invention can be applied in various forms including fuel cells, fuel-cell stack manufacturing methods, fuel-cell systems, fuel-cell-equipped vehicles, membrane-electrode assemblies, and so on.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3 are graphs each indicating the state of the fuel cell system of the comparative example when the circulation through a fuel-gas passage is stopped;

FIG. 19 is a view showing another example structure of the second modification example;

FIG. 22 is an arithmetic formula regarding the performance of the fuel cell;

FIG. 23 is an arithmetic formula regarding the performance of the fuel cell;

FIG. 24 is an arithmetic formula regarding the performance of the fuel cell;

FIG. 31 is a view showing an air-side electrode porous passage portion of the first modification example;

FIG. 32 is a view showing an air-side electrode porous passage portion of the second modification example;

FIG. 36 is a view illustrating a fuel-gas supply plate of the fifth modification example;

FIG. 37 is a view illustrating a fuel-gas supply plate of the sixth modification example;

DETAILED DESCRIPTION OF THE EMBODIMENTS

Hereinafter, examples embodiments of the invention will be described in the following order.
A. Configuration of Fuel-cell Vehicle of Example Embodiment
B. Structure of Fuel-cell systems of Comparative Example and Example Embodiment
C. Fuel-cell Stack Structures of Comparative Example and Example Embodiment
C-1. Structure of Fuel-cell Stack of Comparative Example
C-2. Structure of Fuel-cell Stack of Example Embodiment
D. Manufacturing of Fuel-cell Stack of Example Embodiment
E. Modification Examples

A. Configuration of Fuel-Cell Vehicle of Example Embodiment

Figure 1:
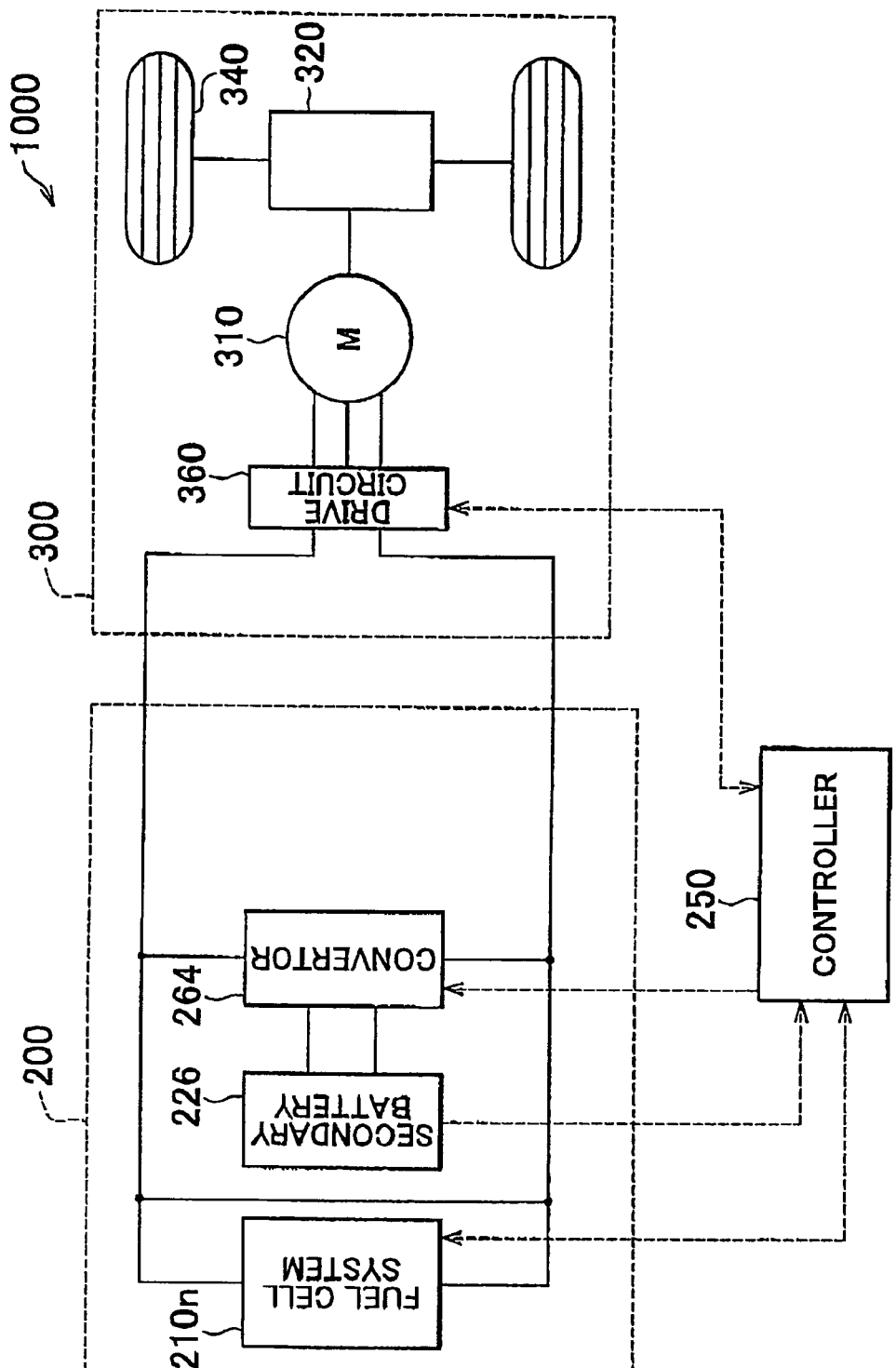
FIG. 1 is a view schematically showing the configuration of a fuel cell vehicle according to an example embodiment of the invention.

FIG. 1 is a view schematically showing the configuration of a fuel cell vehicle 1000 according to an example embodiment of the invention. The fuel cell vehicle 1000 has a power supply system 200, a load section 300, and a controller 250. The power supply system 200 supplies electric power for propelling the fuel cell vehicle 1000. The load section 300 converts the supplied electric power into drive force for propelling the fuel cell vehicle 1000. The controller 250 controls the power supply system 200 and the load section 300.

The power supply system 200 has a fuel cell system 210*n*, a secondary battery 226 (also called "capacitor"), and a DC-DC converter 264. The load section 300 has a drive circuit 360, a motor 310, a gear mechanism 320, and wheels 340. For use in vehicles, the fuel cell system 210*n* is required to be small and light-weight and have a large capacity.

The controller 250 is electrically connected to the fuel cell system 210*n*, the DC-DC converter 264, and the drive circuit 360, and executes various control procedures including those for controlling these circuits. These control procedures are provided as computer programs stored in a memory incorporated in the controller 250 (not shown in the drawings) and executed by the controller 250. The memory in the controller 250 may be selected from among various data storages including ROMs and hard drives.

Figure 2:
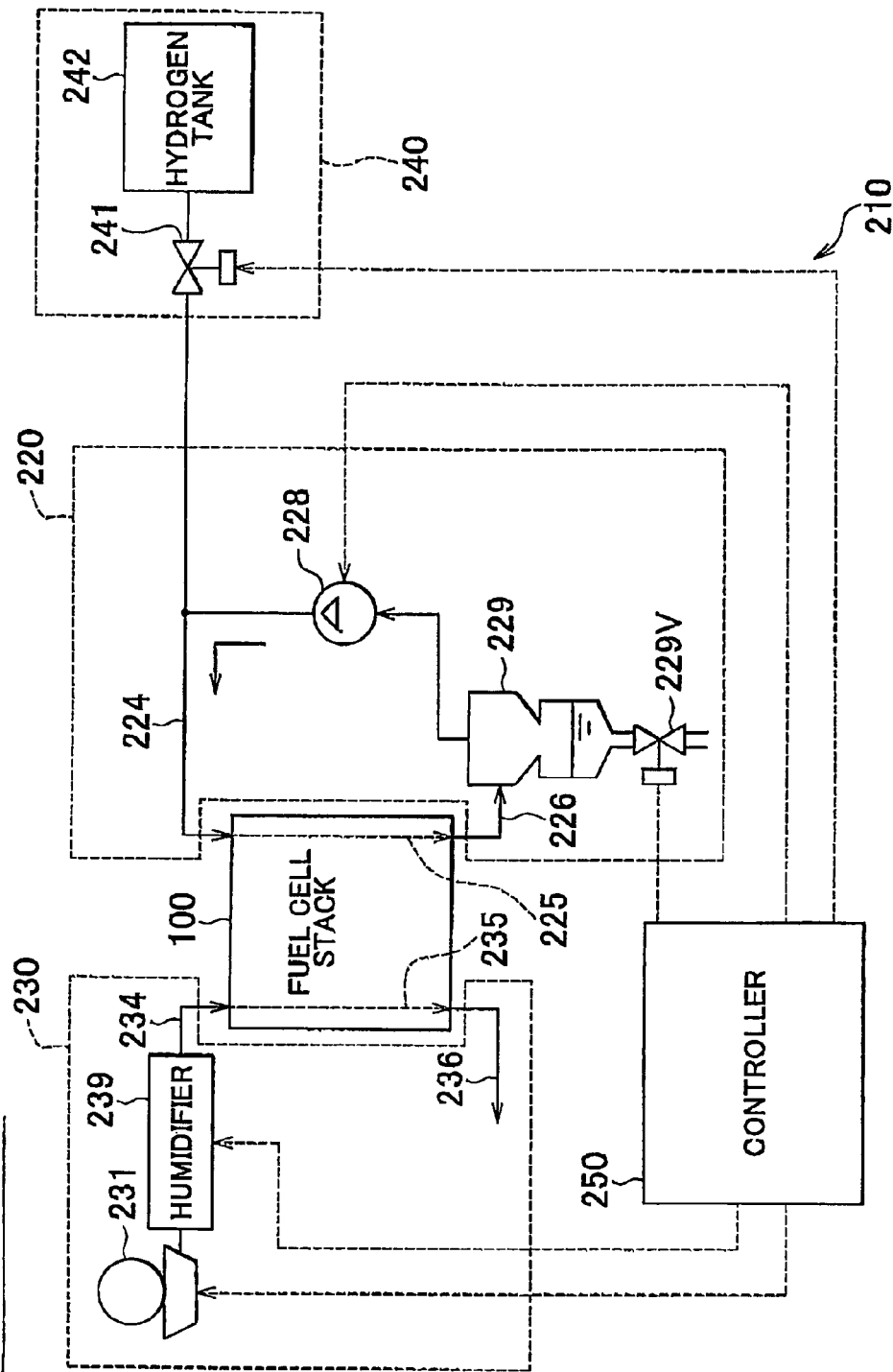
FIG. 2 is a block diagram showing the configuration of a fuel cell system of a comparative example.

FIG. 2 is a block diagram showing the configuration of a fuel cell system 210 according to a comparative example. The fuel cell system 210 has a fuel cell stack 100, an air supply system 230 for supplying air to the fuel cell stack 100 as oxidizing gas, a hydrogen-gas circulation system 220 for circulating hydrogen gas through the fuel cell stack 100 as fuel gas, and a hydrogen gas supply system 240 for supplying hydrogen gas to the hydrogen-gas circulation system 220.

The controller 250 controls the air supply system 230, the hydrogen-gas supply system 240, and the hydrogen-gas circulation system 220.

The fuel cell stack 100 is a solid polymer electrolyte fuel cell stack constituted of a plurality of fuel cells stacked on top of each other, which will be described later. An air passage 235 and a fuel-gas passage 225 are formed through the fuel cells.

The air supply system 230 delivers humidified air into the air passage 235. The air supply system 230 has a blower 231 for taking in air from the outside, a humidifier 239 for humidifying the air taken in via the blower 231, a humidified-air supply pipe 234 for supplying the humidified air to the air passage 235, and a discharge pipe 236 for discharging air from the air passage 235.

The hydrogen gas supply system 240 has a hydrogen tank 242 for storing hydrogen gas and a hydrogen valve 241 for controlling the supply of hydrogen gas to the hydrogen-gas circulation system 220.

The hydrogen-gas circulation system 220 has a circulation pump 228 for circulating hydrogen gas in the hydrogen-gas circulation system 220, a hydrogen-gas supply pipe 224 via which the hydrogen gas discharged from the circulation pump 228 is supplied to the fuel-gas passage 225, a gas-discharge pipe 226 via which water-containing hydrogen gas is supplied from the fuel-gas passage 225 to a gas-liquid separator 229, the gas-liquid separator 229 that separates the water-containing hydrogen gas into water and hydrogen gas and then supplies the obtained hydrogen gas to the circulation pump 228, and an water-discharge valve 229V.

The purpose of circulating hydrogen gas through the gas-discharge pipe 226, the gas-liquid separator 229, and the circulation pump 228 in this related-art fuel cell system is to prevent that the nitrogen gas entering the fuel-gas passage 225 from the air passage 235 through an electrolyte layer, which will be described later, accumulates in the fuel-gas passage 225, because it may make the fuel cell stack 100 incapable of generating electric power.

FIG. 3 shows graphs G1, G2 each indicating the state of the fuel cell system 210 when the circulation through the fuel-gas passage 225 is stopped. More specifically, the graph G1 represents the relation between the time elapsed from when the discharge of fuel gas is stopped and the cell voltage, and the graph G2 represents the relation between the time elapsed from when the discharge of fuel gas is stopped and the hydrogen partial pressure (i.e., the hydrogen partial pressure in the fuel-gas passage 225).

As is evident from the graph G1, the cell voltage gradually decreases with time. This decrease in the cell voltage results from a decrease in the hydrogen partial pressure such as shown in the graph G2. Such a decrease in the hydrogen partial pressure is caused by an increase in the partial pressure of the nitrogen gas entering the hydrogen-gas supply passage 225 from the air passage 235 as mentioned earlier. Thus, in order to prevent such a decrease in the hydrogen partial pressure, for example, Japanese Patent Application Publication No. 2005-243476 (JP-A-2005-243476) proposes to supply hydrogen gas to a fuel cell stack while increasing the total pressure of hydrogen gas so that the hydrogen partial pressure is maintained at a sufficient level against an increase in the nitrogen partial pressure. However, because the allowable total pressure of hydrogen gas is limited, the hydrogen gas needs to be discharged periodically.

Figure 4:
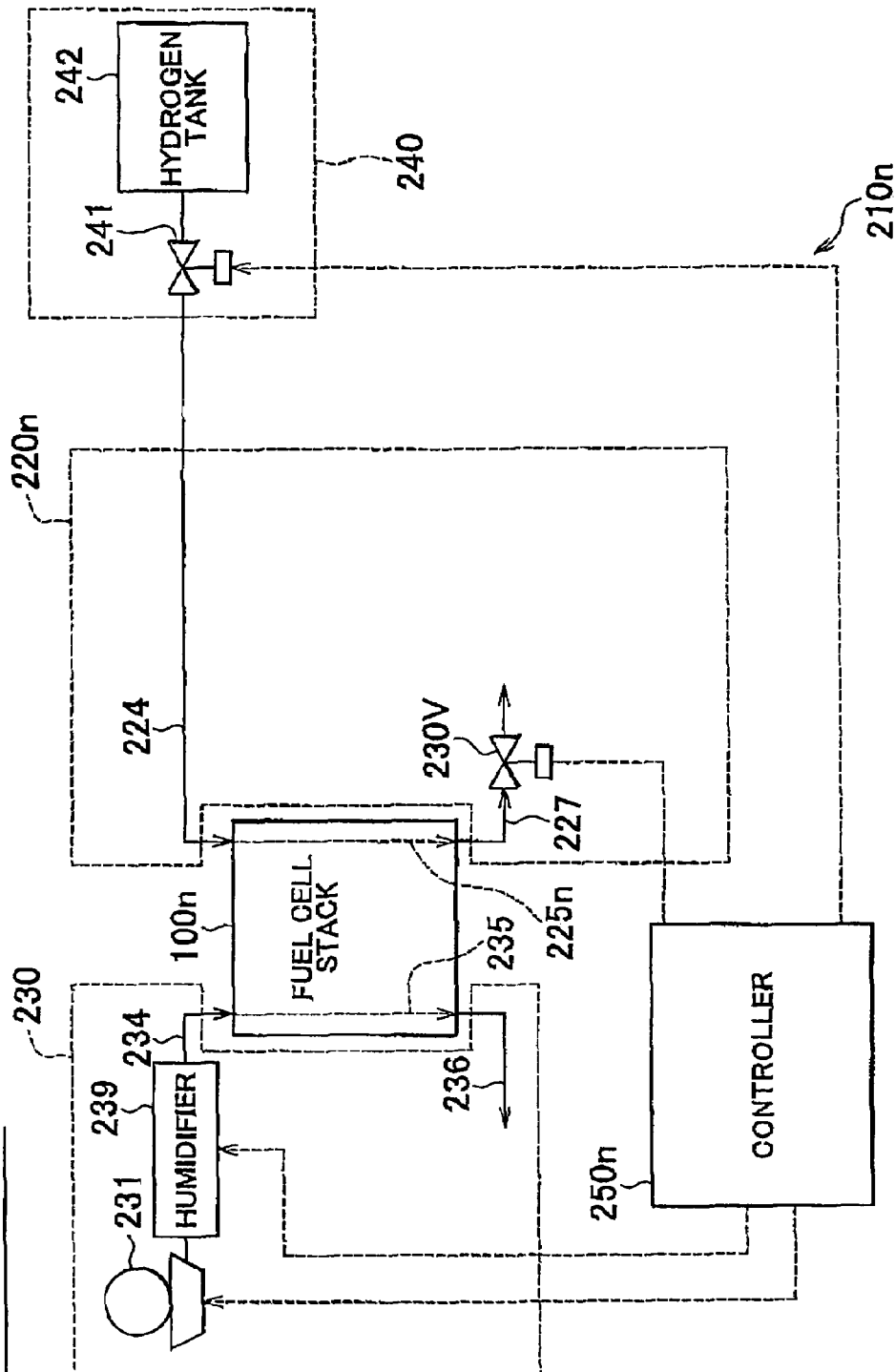
FIG. 4 is a block diagram showing the configuration of a fuel cell system of the example embodiment of the invention.

FIG. 4 is a block diagram showing the configuration of the fuel cell system 210n of the example embodiment of the invention. Referring to FIG. 4, the fuel cell system 210n has a gas-discharge pipe 227 and a gas-discharge valve 230V for maintenance use in place of the gas discharge pipe 226, the gas-liquid separator 229, and the circulation pump 228 together constituting the hydrogen-gas circulation passage described above. Further, the fuel cell system 210 has a fuel cell stack 100n in place of the fuel cell stack 100. The fuel cell stack 100n has been newly designed to enable stable fuel cell operation even after the discharging of fuel gas is stopped.

C. Fuel-Cell Stack Structures of Comparative Example and Example Embodiment

Prior to describing the newly designed fuel cell stack 100n, the structure of a typical related-art fuel cell stack and the mechanism of nitrogen stagnation discovered by the inventors will be described with reference to FIG. 5 to FIG. 9.

C-1. Structure of Fuel-Cell Stack of Comparative Example

Figure 5:
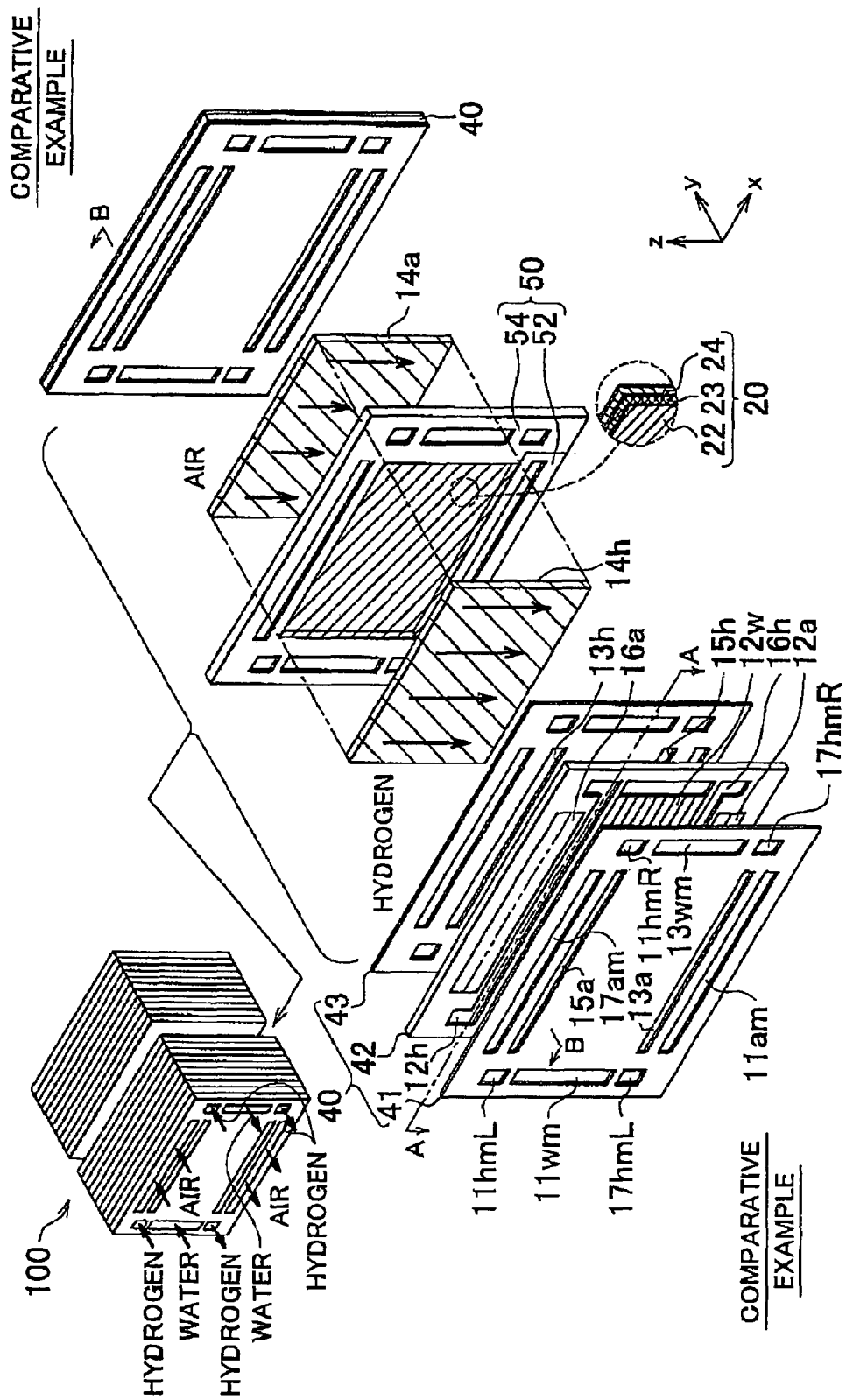
FIG. 5 is a view schematically showing the structure of a fuel cell stack of the comparative example.

FIG. 5 schematically shows the structure of the fuel cell stack 100 of the comparative example. Note that the fuel cell stack of the comparative example and the fuel cell stack of the following example embodiment of the invention are both a solid polymer fuel cell stack. The fuel cell stack 100 of the comparative example is constituted of membrane-electrode assemblies 20, hydrogen-side porous passage portions 14h, and air-side porous passage portions 14a, and separators 40, which are alternately stacked on top of each other and sandwiched by terminals, insulators, and end plates; not shown in the drawings, from both sides.

The membrane-electrode assemblies 20 are a component at which electrochemical reactions occur, and each membrane-electrode assembly 20 is constituted of a hydrogen-side electrode layer 22, an electrolyte membrane 23, and an air-side electrode layer 24. The electrolyte membrane 23 is an ion-exchange membrane made of a solid polymer material and having a proton conductivity. The hydrogen-side electrode layer 22 and the air-side electrode layer 24 are each formed of conductive carriers and catalysts supported thereon.

The hydrogen-side porous passage portion 14h and the air-side porous passage portion 14a serve as the passages for the reaction gases used for electrochemical reactions at the membrane-electrode assembly 20 (i.e., hydrogen-containing gas and oxygen-containing gas) and also serve as power collectors. For example, the hydrogen-side porous passage portion 14h and the air-side porous passage portion 14a are formed of a conductive material having a gas permeability, such as carbon papers, carbon cloths, carbon nanotubes, etc.

A seal portion 50 is provided so as to surround each membrane-electrode assembly 20 and the porous passage portions 14h, 14a adjacent said membrane-electrode assembly 20. The seal portion 50 serves to seal the reaction gas passages formed by the porous passage portions 14h, 14a and includes a gasket 52 and a seal frame 54.

The separators 40 serves as walls of the porous passage portions 14h, 14a forming the reaction gas passages. The separators 40 are formed of a material that is conductive but not permeable to the reaction gases, such as gas-impermeable dense carbon obtained by compressing carbon, calcined carbon, stainless steel, and so on. In this example embodiment, each separator 40 has a three-layer structure incorporating, as its integrated portions, a cathode-side separator 41 abutting on the air-side porous passage portion 14a, an anode-side separator 43 abutting on the hydrogen-side porous passage portion 14h, and an intermediate separator 42 interposed between the cathode-side separator 41 and the anode-side separator 43.

Figure 6:
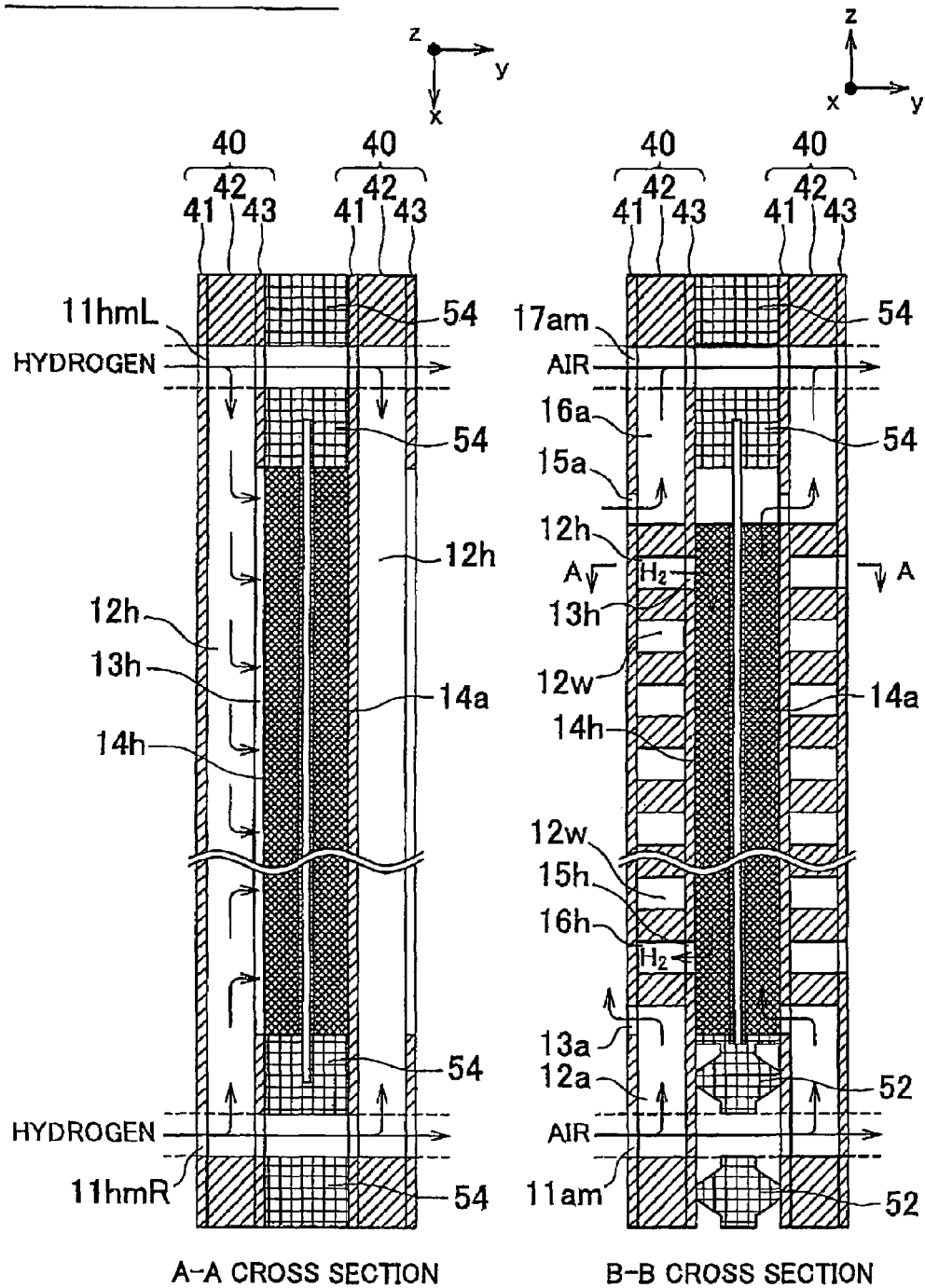
FIG. 6 is a view illustrating the gas passages in the fuel cell stack of the comparative example.

FIG. 6 is a view illustrating the gas passages in the fuel cell stack 100 of the comparative example together with FIG. 5. The gas passages in the fuel cell stack 100 include the fuel-gas passage 225 (FIG. 2), the air passage 235 (FIG. 2), a coolant passage. The coolant passage is defined by a coolant supply manifold 11wm, a coolant supply passage 12w, and a coolant discharge manifold 13wm, and the coolant flows through these portions in this order.

The fuel-gas passage 225 (FIG. 2) is defined by two fuel-gas supply manifolds 11hmL, 11hmR, a fuel-gas supply passage 12h, a fuel-gas supply hole 13h, the hydrogen-side porous passage portion 14h, a fuel-gas discharge hole 15h, a fuel-gas discharge passage 16h (FIG. 5), and two fuel-gas discharge manifolds 17hmL, 17hmR (FIG. 5), and the fuel gas flows through these portions in this order.

The air passage 235 (FIG. 2) is defined by an air supply manifold 11am, an air supply passage 12a, an air supply hole 13a, the air-side porous passage portion 14a, an air discharge hole 15a, an air discharge passage 16a (FIG. 5), an air-discharge manifold 17am (FIG. 5), and the air flows through these portions in this order.

Figure 7:
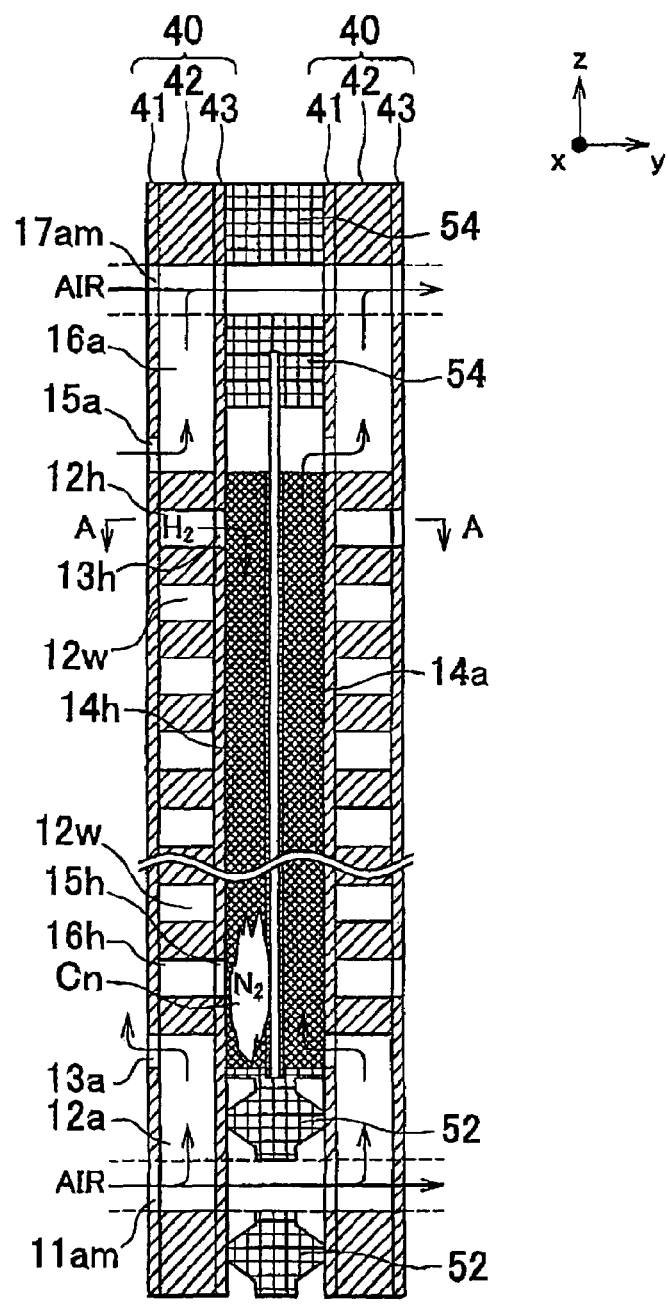
FIG. 7 is a view illustrating a state where nitrogen stagnation is occurring in the fuel cell stack of the comparative example due to the stoppage of the fuel gas discharge.

FIG. 7 is a view illustrating a state where nitrogen stagnation Cn is occurring in the fuel cell stack 100 of the comparative example due to the stoppage of the fuel gas discharge. As is evident from FIG. 7, the nitrogen stagnation Cn occurs in the downstream region of the hydrogen-side porous passage portion 14h.

Figure 8:
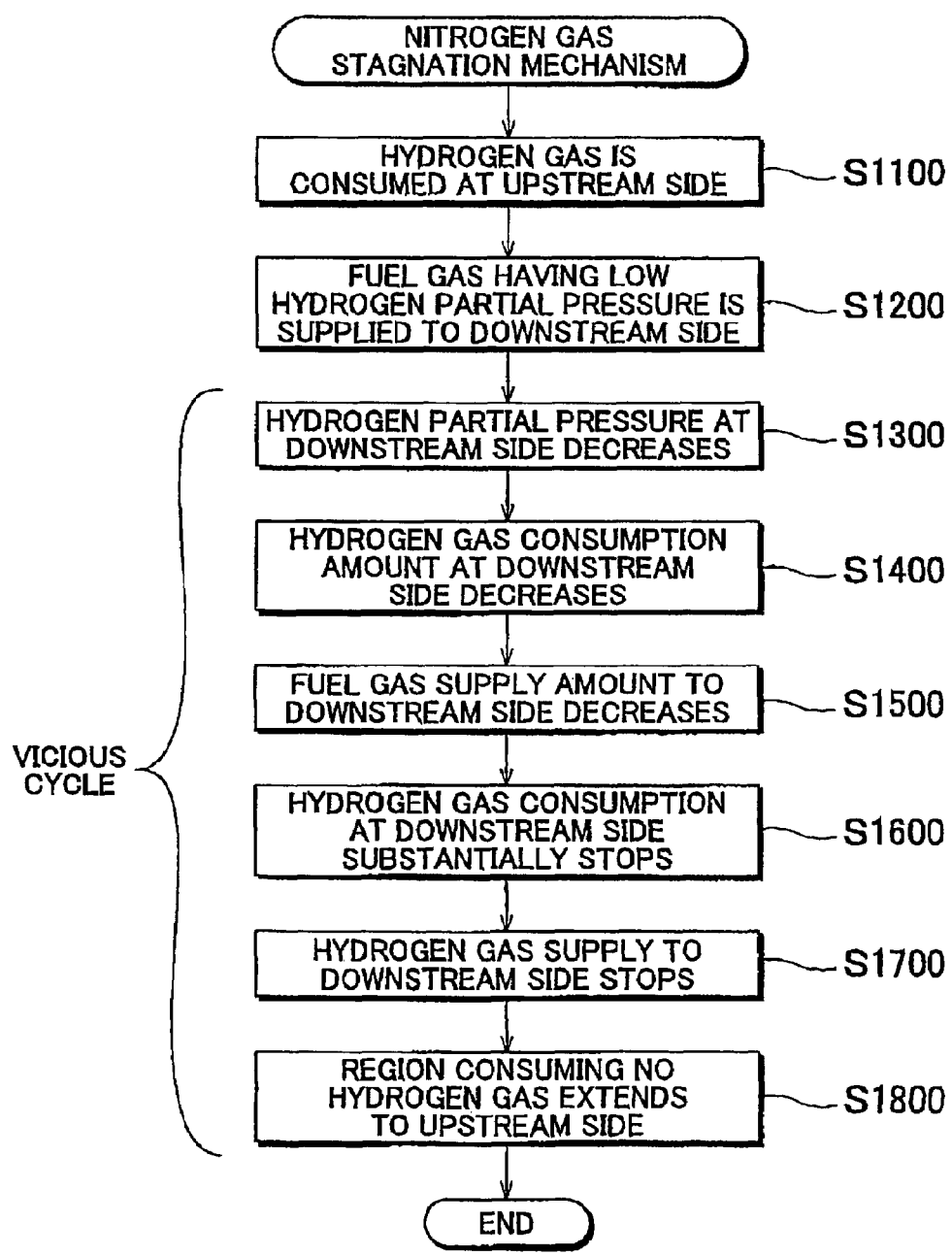
FIG. 8 is a flowchart illustrating the mechanism of occurrence of nitrogen stagnation in a fuel-gas passage, which has been presumed by the inventors.
Figure 9:
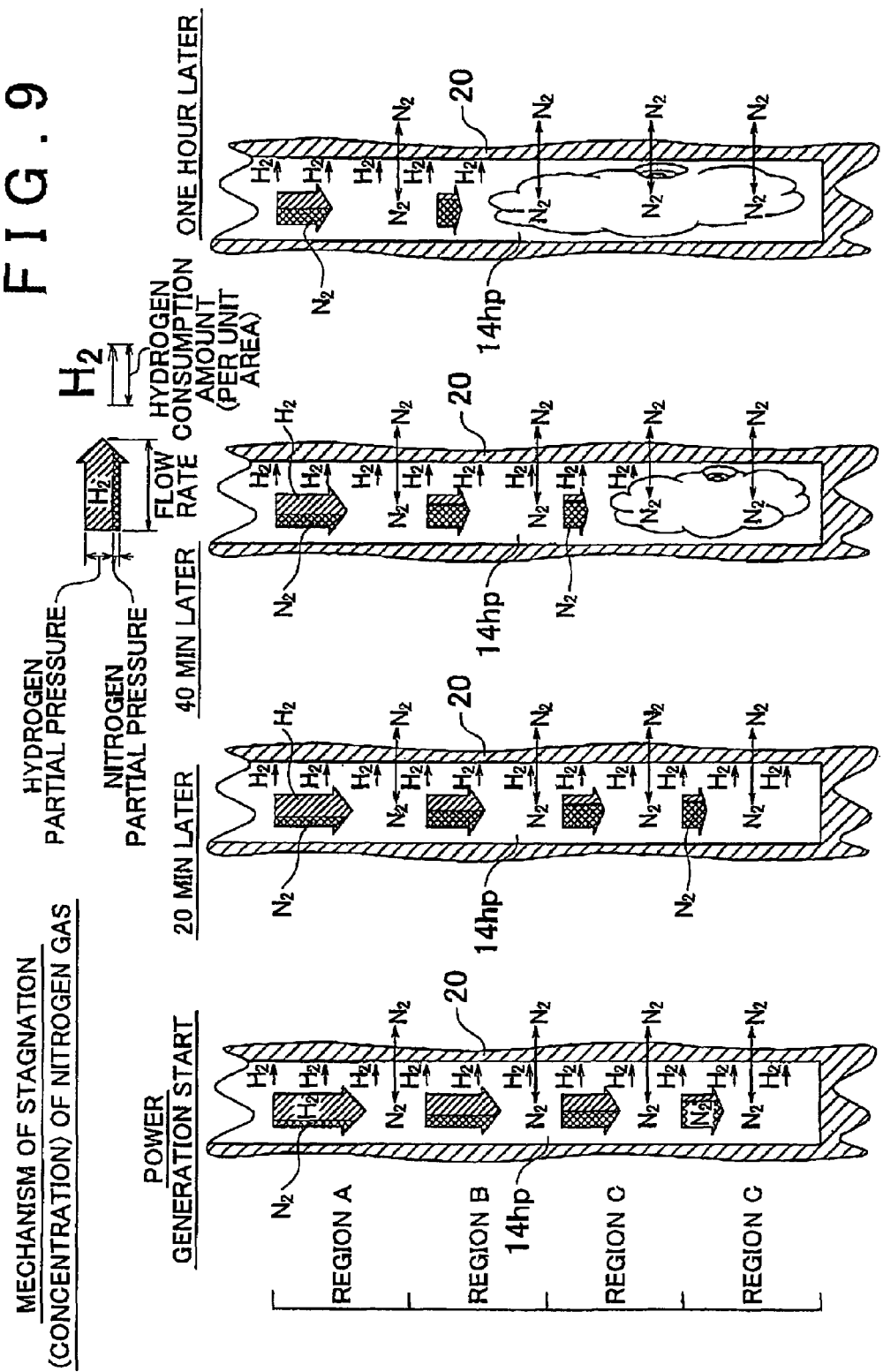
FIG. 9 is a view illustrating how a nitrogen stagnation occurs in a fuel-gas passage.

FIG. 8 is a flowchart illustrating the mechanism of occurrence of nitrogen stagnation in the fuel-gas passage, which has been presumed by the inventors. FIG. 9 is a view illustrating how a nitrogen stagnation occurs in the fuel-gas passage. Referring to FIG. 9, in conventional fuel-gas passages, because fuel gas is supplied along the reaction face of the membrane-electrode assembly 20 that consumes fuel gas (fuel-gas consumption face), the partial pressure of hydrogen gas in the fuel gas decreases as the fuel gas flows from upstream to downstream. This presumption has been made in the course of making the invention, and therefore the invention is not based on the assumption that the presumed mechanism actually exists.

For example, assuming that power generation starts in a state where the partial pressure of hydrogen gas in the fuel passage (the hydrogen-side porous passage portion 14h) is uniform, fuel gas starts to be supplied when the membrane-electrode assembly 20 starts absorbing and consuming hydrogen for power generation. Because hydrogen gas is consumed in respective regions (regions A to D) of the membrane-electrode assembly 20, the hydrogen partial pressure in the fuel gas decreases toward the downstream side of the membrane-electrode assembly 20 as the hydrogen gas continues to be consumed.

More specifically, when fuel gas is being supplied, as the fuel gas moves from the region A to the region B of the membrane-electrode assembly 20, a certain amount of hydrogen gas in the fuel gas is consumed at the region A (step S1100), and therefore the hydrogen partial pressure in the fuel gas supplied to the region B decreases accordingly (step S1200). The hydrogen partial pressure decreases in the same way when the fuel gas moves from the region B to the region C and from the region C to the region D.

As such, the hydrogen partial pressure is significantly lower at the region D in the downstream side of the membrane-electrode assembly 20 than at the region A (step S1300). As is evident from the figure indicating the state 20 minutes later than the start of power generation in FIG. 9, such a significant decrease in the hydrogen partial pressure suppresses the consumption of hydrogen at the region D (step S1400) and thus suppresses the supply of fuel gas (the flow rate of fuel gas) (step S1500). Such suppression of fuel-gas supply continues synergistically, and cyclically, until the end of the fuel gas supply to the region D (step S1600).

As a result, as is evident from the figure indicating the state 40 minutes later than the start of power generation in FIG. 9, nitrogen gas stagnates in the region D, and the fuel gas supply to the region D stops (step S1700). Further, in such a synergistic vicious cycle of fuel-gas supply, the nitrogen gas stagnation area extends from the region D to the region C and then to the region B on the upstream side.

C-2. Structure of Fuel-Cell Stack of Example Embodiment

Figure 10:
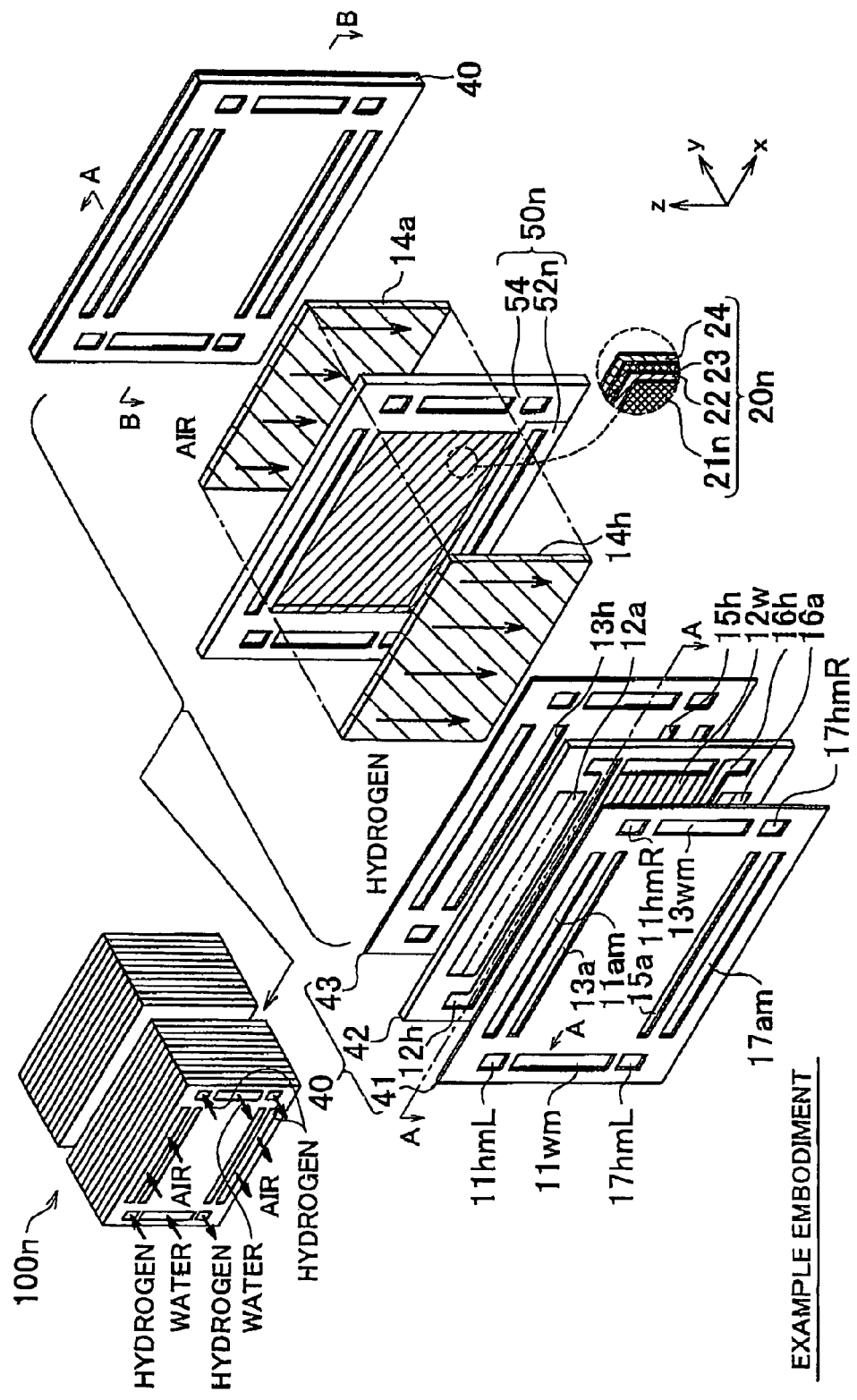
FIG. 10 is a view schematically showing the structure of the fuel cell stack of the example embodiment.

FIG. 10 is a view schematically showing the structure of the fuel cell stack 100n of the example embodiment. The fuel cell stack 100n is different from the fuel cell stack 100 of the comparative example in that the fuel-gas passage 225 (FIG. 2) is replaced with a newly deigned fuel-gas passage 225n (FIG. 3). The air passage 235 and the coolant passage in the fuel cell stack 100n of the example embodiment are the same as those in the fuel cell stack 100 of the comparative example.

Figure 11:
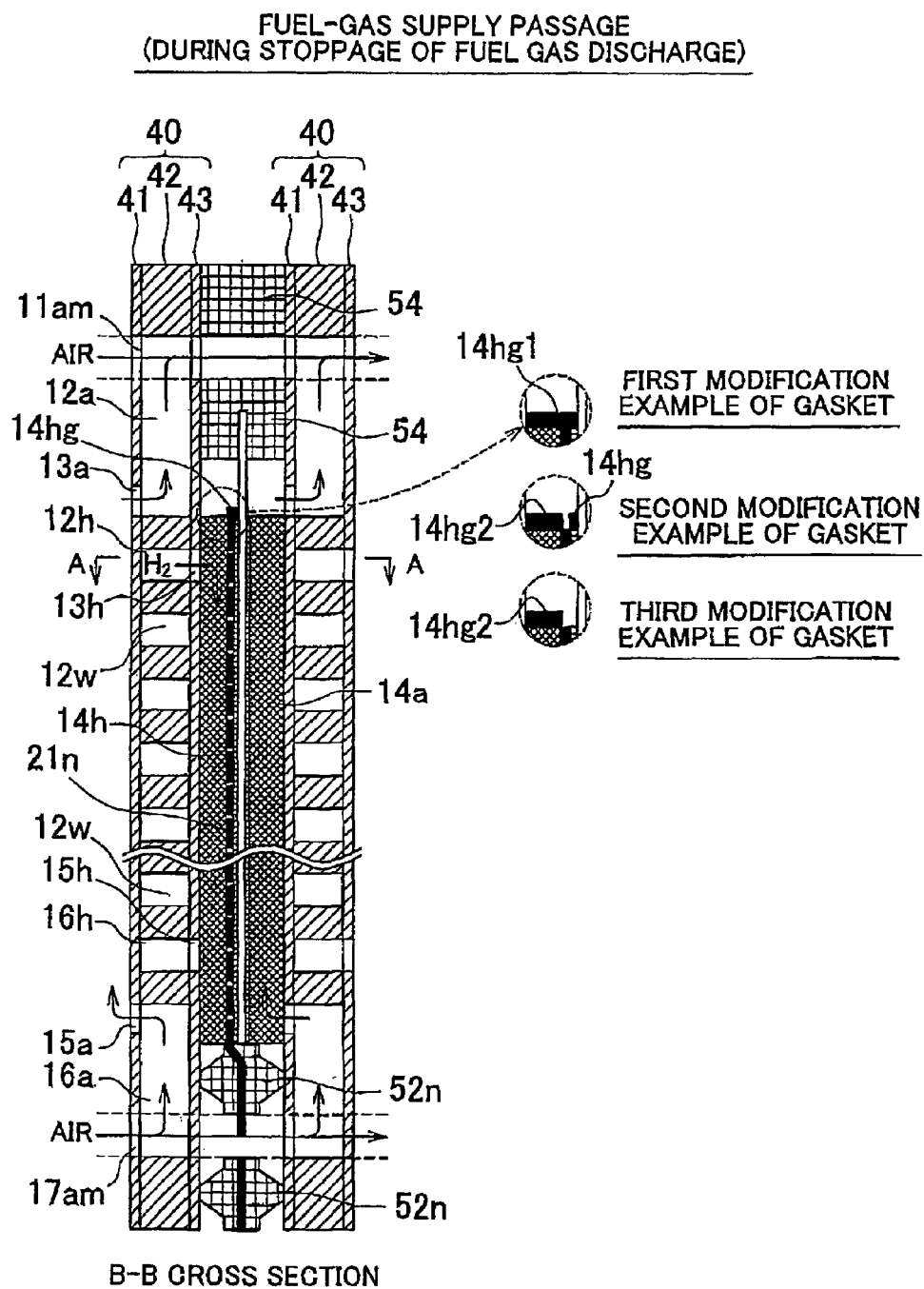
FIG. 11 is a view showing the gas passages in the fuel cell stack.

FIG. 11 is a view showing the gas passages in the fuel cell stack 100n together with FIG. 10.

The fuel-gas passage 225n is different from the fuel-gas passage 225 of the comparative example in that the fuel-gas passage 225n has a fuel-gas supply plate 21n that suppresses stagnation of the nitrogen gas that emerges in the fuel-gas passage 225 during the stoppage of fuel gas discharge and gaskets 14hg and 52n that surround the hydrogen-side electrode layer 22.

In the fuel-gas supply plate 21n, a number of orifices 211n each measuring about 1 mm in diameter are formed at intervals of 2 cm, and three air holes 212n leading to the air supply manifold 11 am are formed.

The gaskets 14hg and 52n are preferably made of a material more rigid than the material of the hydrogen-side electrode layer 22 and having a particularly high rigidity against a compressive force acting across their thickness. The gasket 14hg surrounding the hydrogen-side electrode layer 22 may be formed by impregnating a gasket around the hydrogen-side electrode layer 22.

Figure 12:
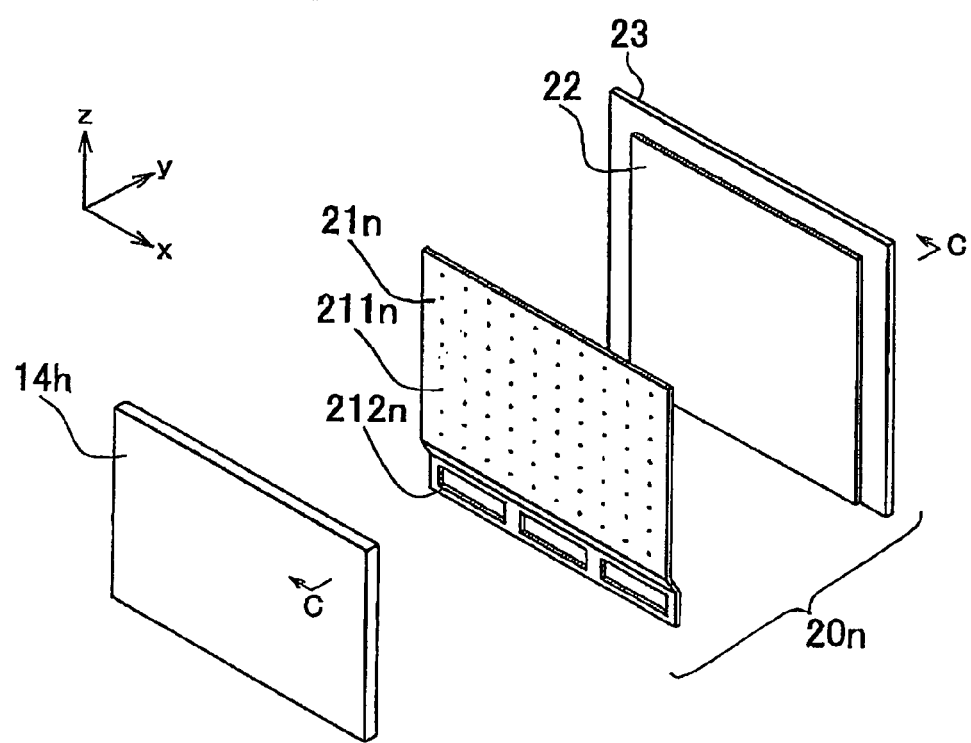
FIG. 12 is a view illustrating how a fuel-gas supply plate is arranged in each cell of the fuel cell stack of the example embodiment.

FIG. 12 is a view illustrating how the fuel-gas supply plate 21n is arranged in each cell of the fuel cell stack 100n of the example embodiment. The fuel-gas supply plate 21n is sandwiched between the hydrogen-side porous passage portion 14h and the hydrogen-side electrode layer 22 of the membrane-electrode assembly 20. In this example embodiment, the fuel-gas supply plate 21n is a metal plate inhibiting the fuel gas and the oxidizing gas from leaking to the opposite sides, and the use of such a metal plate provides the advantages of increased rigidity of the membrane-electrode assembly 20n, which suppresses its thermal contraction, and increased resistance against the differential pressure between the fuel gas and the oxidizing gas.

In this example embodiment, the fuel-gas supply plate 21n is formed as a portion of the membrane-electrode assembly 20n by being attached thereto. Alternatively, the fuel-gas supply plate 21n may be formed as a portion of the hydrogen-side porous passage portion 14h by being attached thereto, or the fuel-gas supply plate 21n may be provided as an independent component. The fuel-gas passage portion is not necessarily a porous passage portion. For example, the fuel-gas passage portion may be a spacer (not shown in the drawings) disposed on at least one side of the fuel-gas supply plate 21n and forming at least one of a gas passage upstream and downstream of the fuel-gas supply plate 21n.

Figure 13:
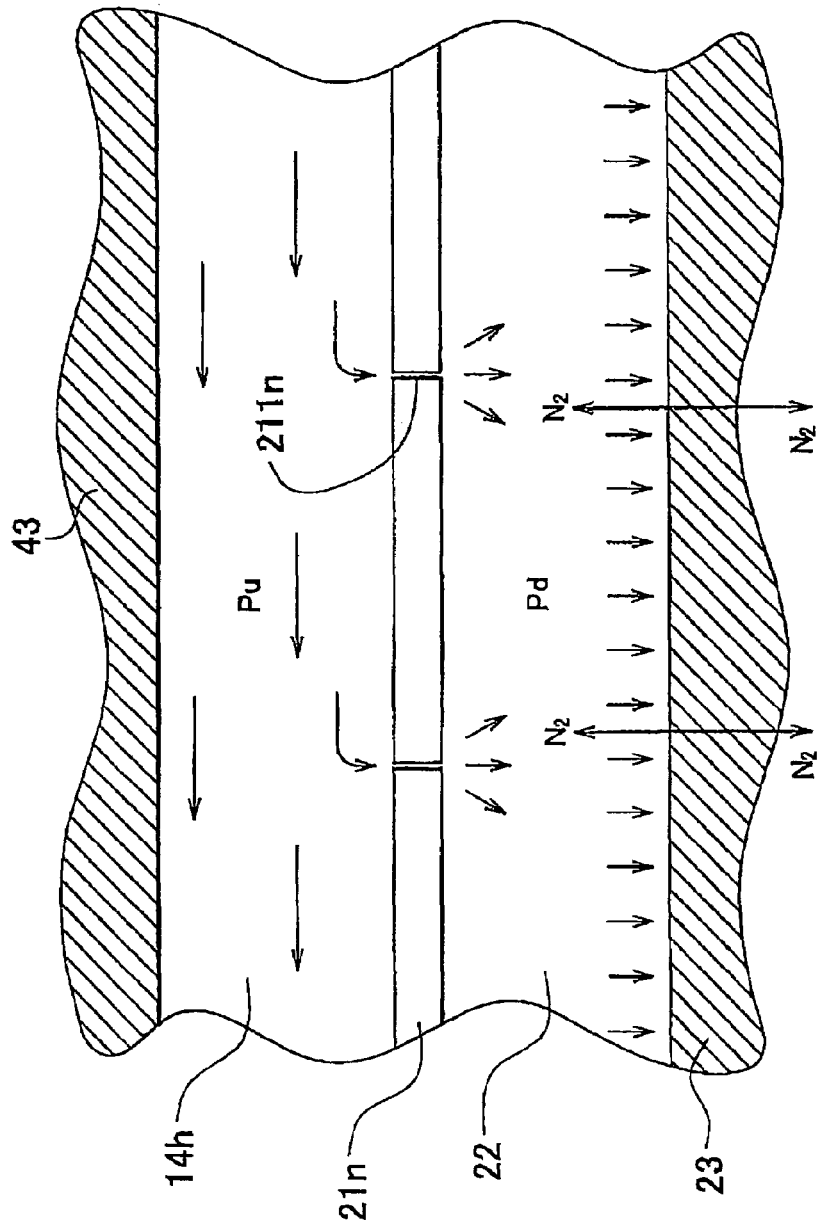
FIG. 13 is a view illustrating how fuel gas is distributed via the fuel-gas supply plate in the fuel cell stack.

FIG. 13 is a view illustrating how fuel gas is distributed via the fuel-gas supply plate 21n in the fuel cell stack 100n. Referring to FIG. 13, fuel gas enters the hydrogen-side porous passage portion 14h from the fuel-gas supply hole 13h (FIG. 11) and then reaches the orifices 211n of the fuel-gas supply plate 21n, and then the fuel gas enters the hydrogen-side electrode layer 22 via the orifices 211n.

Thus, in the structure described above, the hydrogen-side porous passage portion 14h forming the passage for distributing fuel gas to the orifices 211n is partitioned off from the hydrogen-side electrode layer 22 by the fuel-gas supply plate 21n, the aforementioned decrease in the hydrogen partial pressure (FIG. 8 and FIG. 9) is suppressed. On the other hand, the analysis and research by the inventors have revealed that the nitrogen gas that has moved to the hydrogen-side porous passage portion 14h from the air-side porous passage portion 14a through the membrane-electrode assembly 20 moves back to the air-side porous passage portion 14a from the hydrogen-side porous passage portion 14h through the membrane-electrode assembly 20 and therefore the nitrogen gas in the hydrogen-side porous passage portion 14h and the nitrogen gas in the air-side porous passage portion 14a can be maintained in equilibrium. Note that in this specification the word "partition" is intended to have a broad meaning, referring to the states where two or more regions or portions are partitioned off from each other such that contacts or fluid movements between the regions or portions are inhibited as well as the states where the regions or portions are completely partitioned off from each other.

As such, the inventors have empirically discovered that if nitrogen gas can be stabilized in a dispersed state in the vicinity of the membrane-electrode assembly 20 while supplying fuel gas to the hydrogen-side electrode layer 22 side continuously, electric power can be generated stably, and continuously, even if the fuel gas is not circulated.

Figure 14:
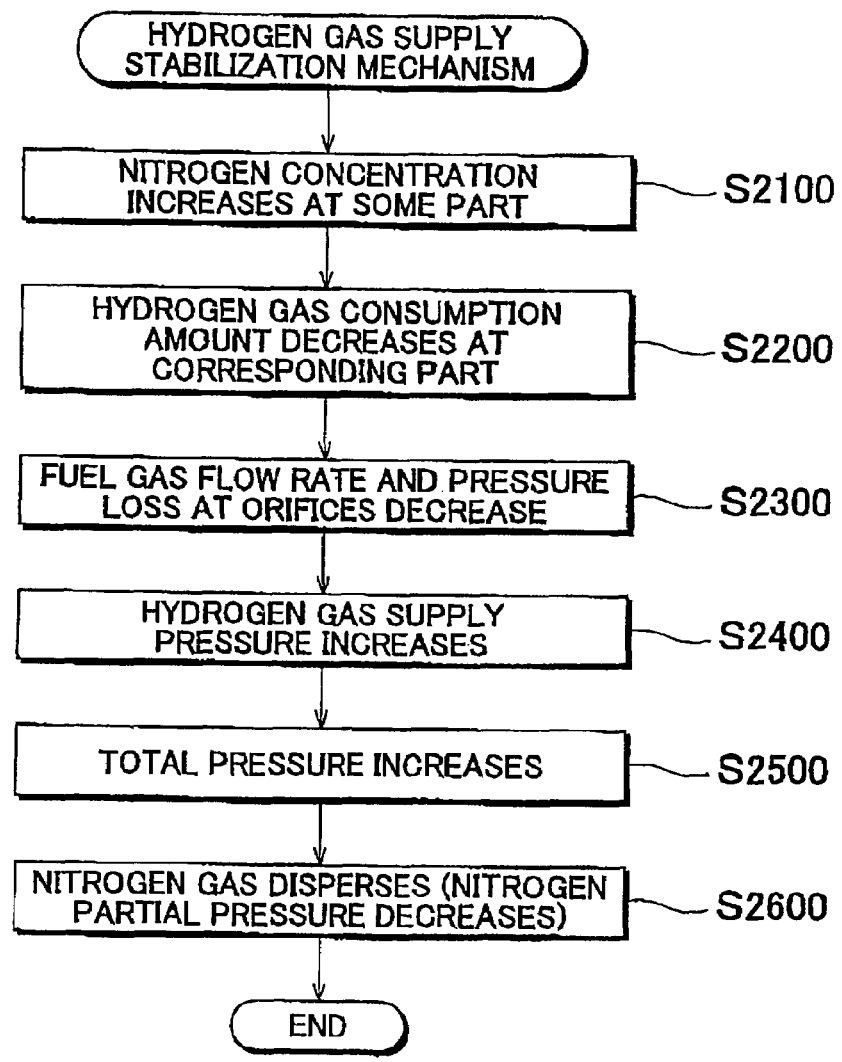
FIG. 14 is a flowchart illustrating a presumed mechanism of hydrogen gas supply stabilization.
Figure 15:
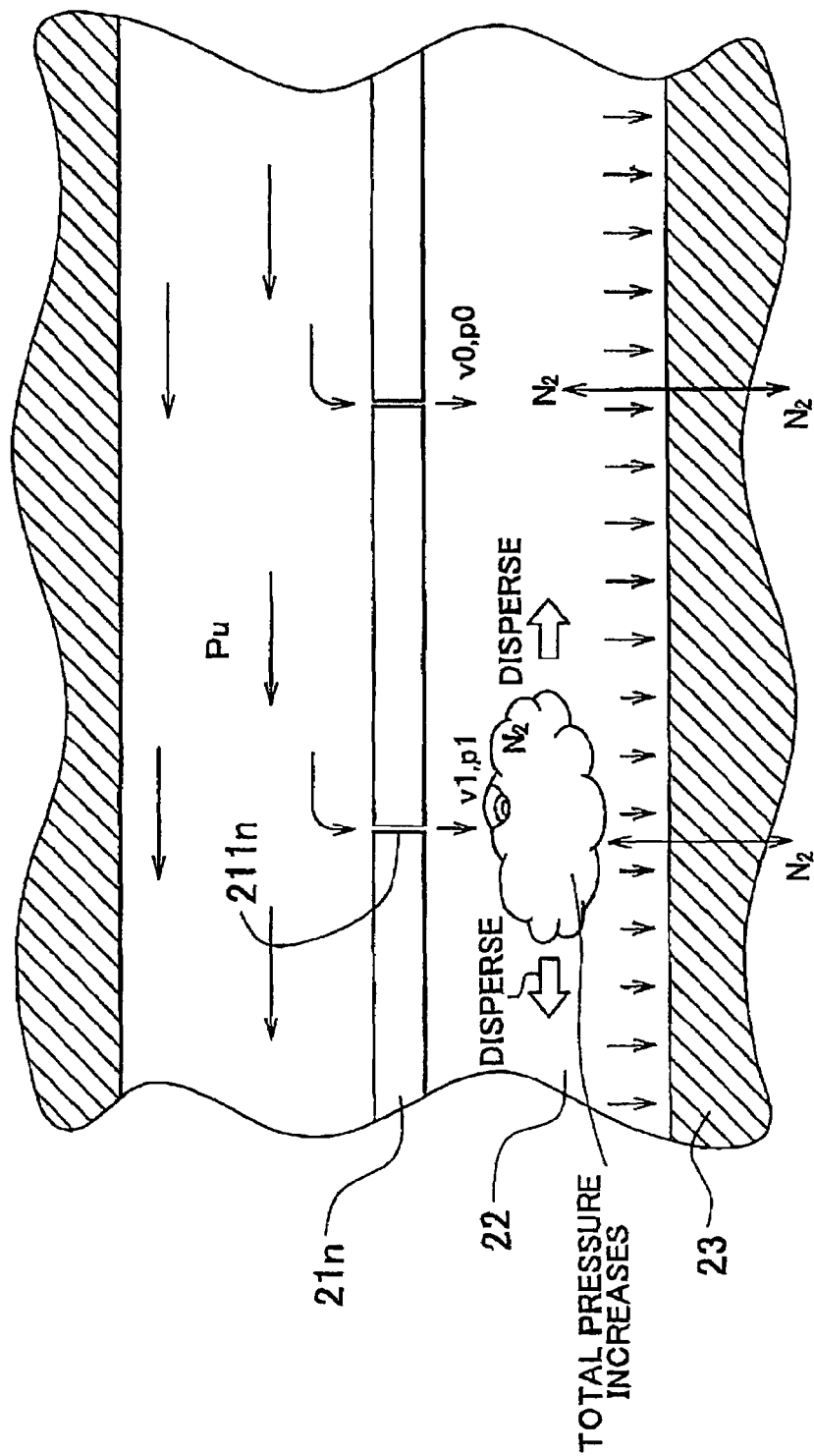
FIG. 15 is a view illustrating how stagnant nitrogen gas spreads in the fuel-gas passage portion.

FIG. 14 is a flowchart illustrating a presumed mechanism of hydrogen gas supply stabilization. FIG. 15 is a view illustrating how stagnant nitrogen gas spreads in the fuel-gas passage portion. According to the presumed mechanism, even if the nitrogen partial pressure increases at some part of the fuel-gas passage portion due to some external disturbances or interferences, the increase in the nitrogen partial pressure is cancelled. That is, even if the nitrogen partial pressure increases in a certain region or regions, the increase in the nitrogen partial pressure is cancelled in the mechanism described below.

Referring to FIG. 14, if the nitrogen partial pressure increases in a certain region (step S2100), the hydrogen partial pressure in turn decreases in the same region, and therefore the amount of hydrogen gas absorbed to the corresponding portion of the membrane-electrode assembly 20 decreases accordingly (step S2200). As a result, a fuel-gas flow rate V1 and the pressure loss (=Pu−p1) at the orifices 211n decrease (step S2300).

Such a decrease in the pressure loss (=Pu−p1) leads to an increase in the pressure at which to supply fuel gas from each orifice 211n to the hydrogen-side electrode layer 22 (step S2400). That is, a supply pressure P1, the pressure at which fuel gas is supplied from the orifices 211n, approaches a pressure Pu, the fuel gas pressure upstream of the orifices 211n. As a result, in this region, the total pressure of fuel gas increases temporarily (step S2500), which causes dispersion of the nitrogen gas to adjacent regions (step S2600). This phenomenon may be recognized as the Bernoulli suction effect between the region where the fuel gas flow rate is relatively high (v1) and the region where the fuel gas flow rate is relatively low (v0).

Although the foregoing analysis is based on the presumption by the inventors, the research by the inventors has proved that owing to unknown physical phenomena the above-described structure enables to continue power generation stably, and steadily, for several hours without performing the fuel gas circulation.

According to the analysis and research by the inventors, the diameter of each orifice 211n of the fuel-gas supply plate 21n and the interval between the orifices 211n are preferably set such that the fuel gas flow rate or the pressure loss at each orifice 211n is large enough to suppress a reverse flow of fuel gas due to the dispersion of nitrogen gas under a given fuel cell operation state (e.g., rated output operation state). For example, it was discovered that, in the case of solid polymer fuel cells, if the aperture ratio of the fuel-gas supply plate 21n is set to approximately 1% or lower, a sufficient fuel gas flow rate or pressure loss can be obtained at each orifice 211n. The aperture ratio of the fuel-gas supply plate 21n is calculated by dividing the sum of the areas of the orifices 211n by the entire area of the fuel-gas supply plate 21n. The inventors have confirmed, through calculations, that setting the aperture ratio of the fuel-gas supply plate 21n to an order of one-hundredth of the area of a circulation type fuel-gas passage does not lead to an excessive increase in the power loss at the circulation pump (compressor) 228 for circulating fuel gas (FIG. 2).

Figure 16:
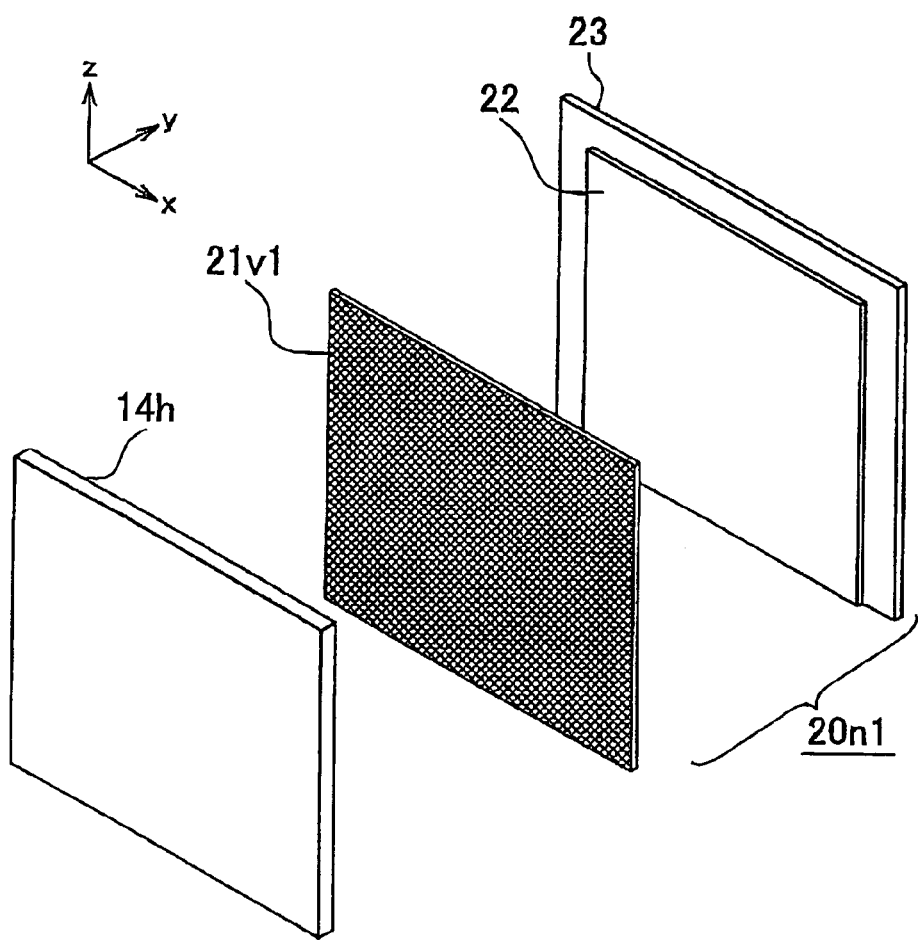
FIG. 16 is a view illustrating the first modification example of the fuel-gas passage portion.

FIG. 16 is a view illustrating the first modification example of the fuel-gas passage portion. In this example, the fuel-gas supply plate 21n is replaced with a dense porous member 21v1 having a higher density or a larger pressure loss than the hydrogen-side porous passage portion 14h. That is, the hydrogen-side porous passage portion 14h serving as a fuel-gas distribution passage is partitioned off from the hydrogen-side electrode layer 22 by the dense porous member 21v1 that is formed, preferably, so as to provide a predetermined pressure loss or a predetermined fuel gas flow rate.

Figure 17:
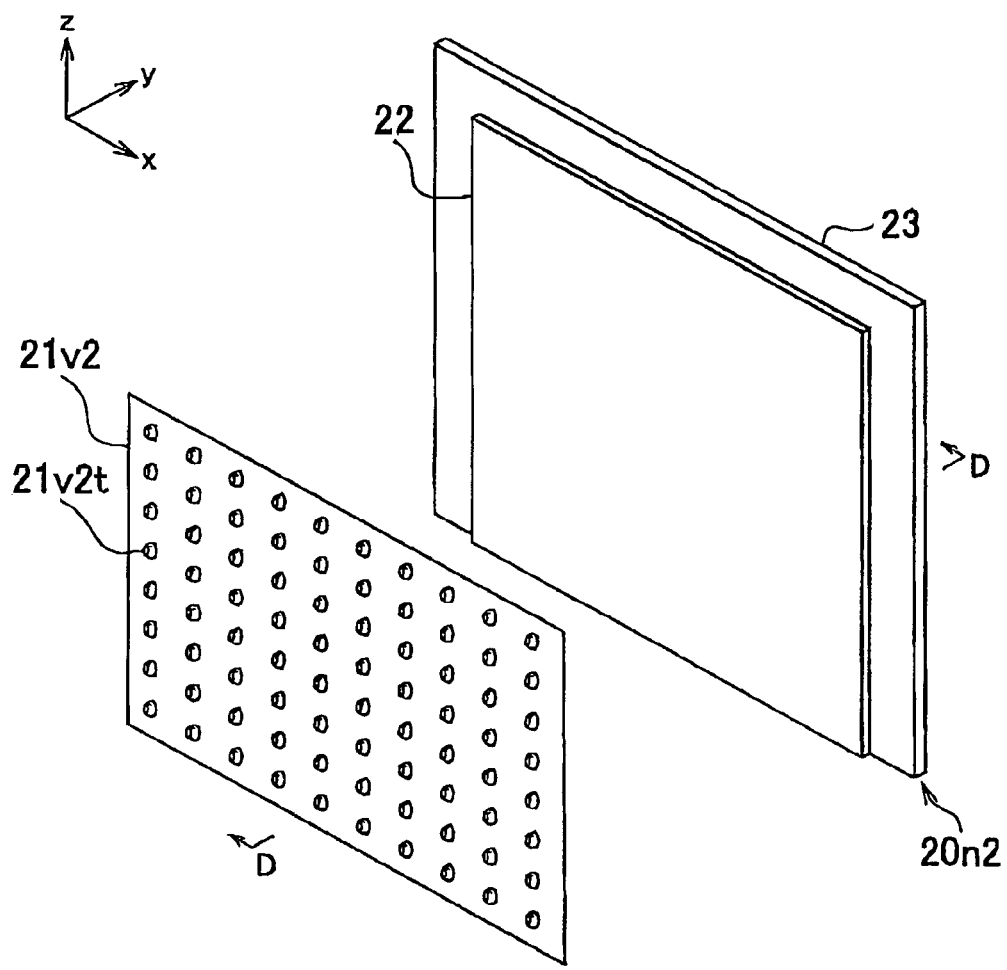
FIG. 17 is a view illustrating the second modification example of the fuel-gas passage portion.
Figure 18:
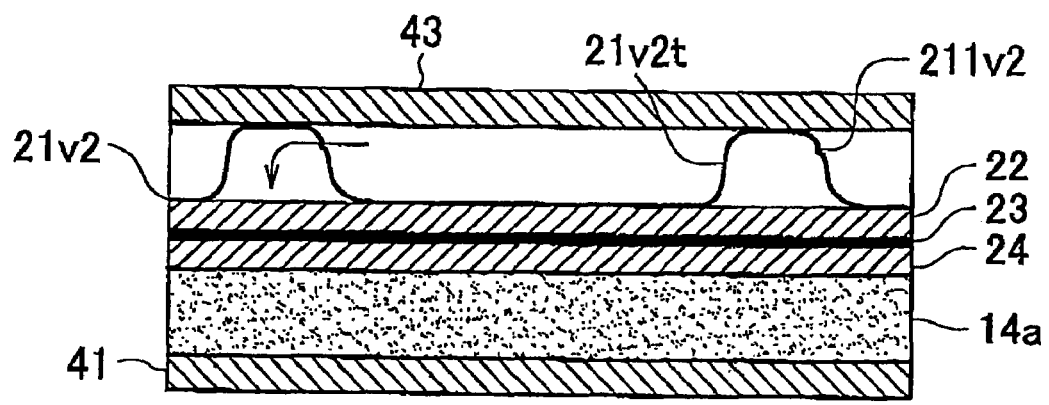
FIG. 18 is a view illustrating the second modification example of the fuel-gas passage portion.

FIG. 17 and FIG. 18 are views illustrating the second modification example of the fuel-gas passage portion. In this example, the fuel-gas supply plate 21n is replaced with a fuel-gas supply plate 21v2 that is a pressed metal plate. The fuel-gas supply plate 21v2 has convex portions 21v2t each forming a fuel-gas passage on the upstream side of the fuel-gas supply plate 21v2 and having an orifice 211v2. According to this structure, because the fuel-gas supply plate 21v2 also forms the gas passages on the upstream side thereof, and it eliminates the need of providing the hydrogen-side porous passage portion 14h of the foregoing example embodiment, which is desirable.

FIG. 19 is a view showing other example structure of the second modification example. In this example, stoppers 21v2c, which are conductive, are provided to form fuel-gas passages on the upstream side of a fuel-gas supply plate 21v2a. According to this structure, because convex portions 21v2a of the fuel-gas supply plate 21v2a need not receive the stacking load of the fuel cell stack 100n, the freedom in designing the shape of each convex portion 21v2a increases, which is desirable. For example, the convex portions 21v2a may be formed in a diamond shape when viewed from above.

Figure 20:
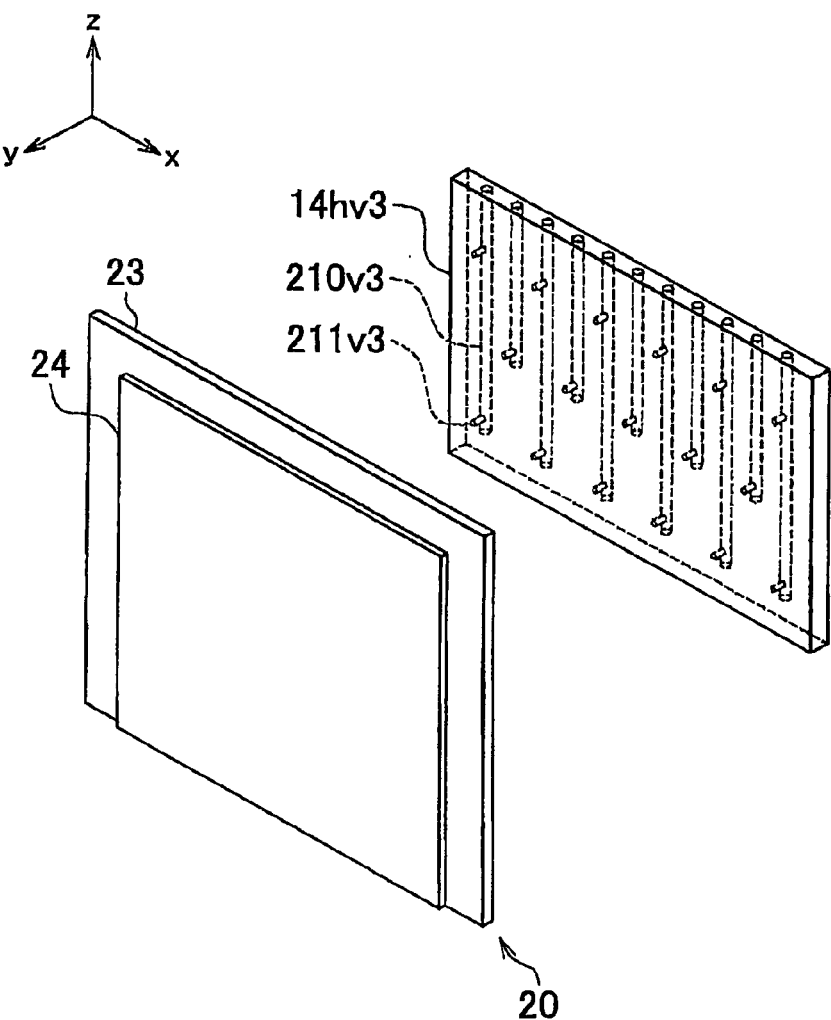
FIG. 20 is a view illustrating the third modification example of the fuel-gas passage portion.

FIG. 20 is a view illustrating the third modification example of the fuel-gas passage portion. In this example, a fuel-gas passage portion 14hv3, which is a porous member, has communication holes 210v3 formed within the fuel-gas passage portion 14hv3 and orifices 211v3 extending from the respective communication holes 210v3 to the outside, and fuel gas is distributed to respective regions through the communication holes 210v3 and the orifices 211v3. As in this case, a porous member may be adapted to have the function of distributing fuel gas.

Figure 21:
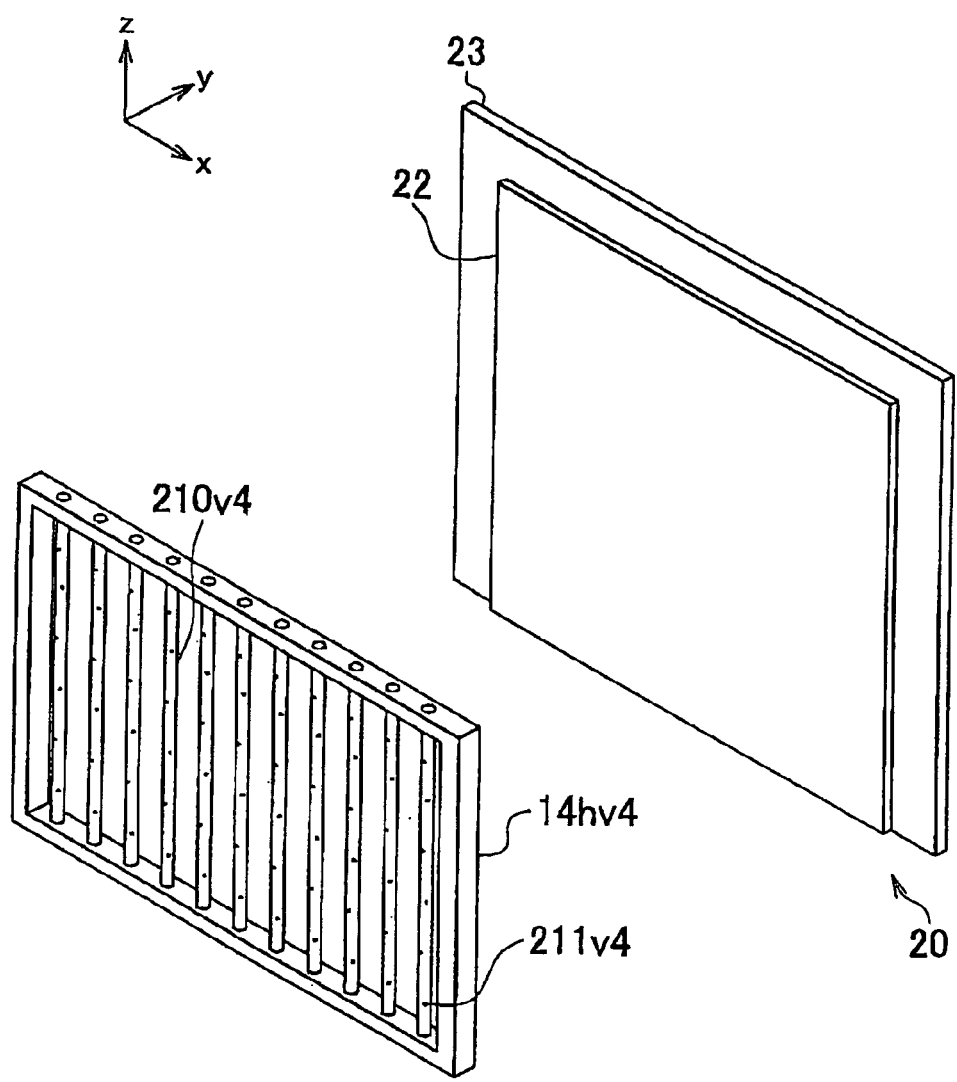
FIG. 21 is a view illustrating the fourth modification example of the fuel-gas passage portion.

FIG. 21 is a view illustrating the fourth modification example of the fuel-gas passage portion. Referring to FIG. 21, a fuel passage portion 14v4 is formed of pipes 210v4 each having orifices 211v4, not a porous member nor a pressed metal plate, and fuel gas is distributed to respective regions via the orifices 211v4. Thus, as long as fuel gas can be distributed to respective regions, the fuel-gas passage portion may have various structures as well as those using a porous member and a pressed metal plate.

According to the fuel-gas passage portion with the fuel-gas supply plate 21n and its modified versions described above, thus, fuel gas directly flows to the respective regions of the hydrogen-side electrode layer 22, where fuel gas is consumed, without going through other regions, or fuel gas flows to the hydrogen-side electrode layer 22 from the area distant from the hydrogen-side electrode layer 22 (preferably, a passage partitioned off from the hydrogen-side electrode 22) in the direction crossing the reaction face of the electrolyte membrane 23 (a catalyst face not shown in the drawings). The above "consumed" is intended to have a broad meaning including both consumptions for reactions and cross-leaks. Preferably, the hydrogen-side electrode layer 22 has a flat surface because nitrogen stagnations tend to occur at indentations and concaves.

Further, although it is not essential to achieve particular fuel gas flow rates and pressure losses in the above-described example embodiment and modification examples, the results of the researches and analysis by the inventors indicate that significant effects can be obtained by achieving particular fuel gas flow rate and/or particular pressure losses.

Further, the above-described structures eliminating the need for fuel-gas circulation also provide a significant advantage that the fuel cell system can be efficiently operated at a high pressure, which could not be expected by those skilled in the art at the time of filing this application. For example, referring to FIG. 22, according to the Nernst equation, the electromotive force of a fuel cell system can be increased by increasing the pressure in fuel-gas passages of the fuel cell system. However, in the case of fuel-gas supply systems that circulate fuel gas, increasing the pressure in the fuel-gas passages leads to an increase in the load on the circulation pump and thus to a decrease in the operation efficiency of the fuel cell system.

In FIG. 22, the formula F1 indicates that the electromotive force E (EMF) is correlative to the activation of hydrogen gas (hydrogen partial pressure/standard pressure) and to the activation of oxygen gas (oxygen partial pressure/standard pressure). The formula G2 corresponds to the hydrogen gas term indicating an increase in the electromotive force resulting from an increase in the hydrogen partial pressure ($P_1 \rightarrow P_2$).

According to the non-circulation type fuel cell system of the example embodiment, because the pressure in the fuel cell system can be increased without increasing the capacity of the circulation pump, the fuel cell system can be made small and light-weight, which is especially important for use in vehicles. In particular, because it was believed by those skilled in the art at the time of filing this application that increasing the reaction gas pressure in a small fuel cell system inevitably results in a decrease in its operation efficiency, the above-described effect of the example embodiment could not be expected by those skilled in the at the time of filing this application.

Further, because polymer electrolyte is normally used in small and light-weight fuel cells, differential pressure operation in which only the pressure in fuel-gas passages is increased can be easily performed, and according to the empirical formula F3 that was formulated by Parsons Inc. in 2000 (FIG. 23), the more the reaction gas pressure of a fuel cell system is increased, the more significantly the capacity of the fuel cell system increases, and thus such fuel cells are suitable for use in vehicles (Refer to "Fuel Cell Systems Explained 2nd ed." by James Larminie and Andrew Dicks in 2003). Note that the empirical formula F3 corresponds to the formula F2 that is a theoretical formula having a high relevance to high-temperature type fuel cells.

In addition, in this example embodiment, preferably, the dispersing flow of nitrogen gas from the hydrogen-side electrode layer 22 to the hydrogen-side porous passage portion 14h is suppressed and the hydrogen-side porous passage portion 14h is partitioned from the hydrogen-side electrode layer 22. The higher the dispersion rate of nitrogen gas, the more difficult it is to partition the hydrogen-side porous passage portion 14h from the hydrogen-side electrode layer 22 properly. However, in the case of solid polymer fuel cells that operate at a relatively low temperature, the partition can be accomplished relatively easily. This is because the dispersion rate of nitrogen gas significantly increases as the operation temperature increases. Meanwhile, increasing the fuel gas pressure in the fuel cell system causes a decrease in the dispersion rate of nitrogen gas, and therefore it is desirable to operate solid polymer fuel cells at a high pressure.

The formula F3 in FIG. 24 represents the Fick's 1st law regarding steady flows. In the formula F3, the dispersion rate of nitrogen gas is proportional to the gradient of nitrogen gas concentration and the dispersion factor of nitrogen gas. The dispersion factor has a positive correlation with the temperature and a negative correlation with the pressure. As such, the above-described effects can be obtained.

Figure 25:
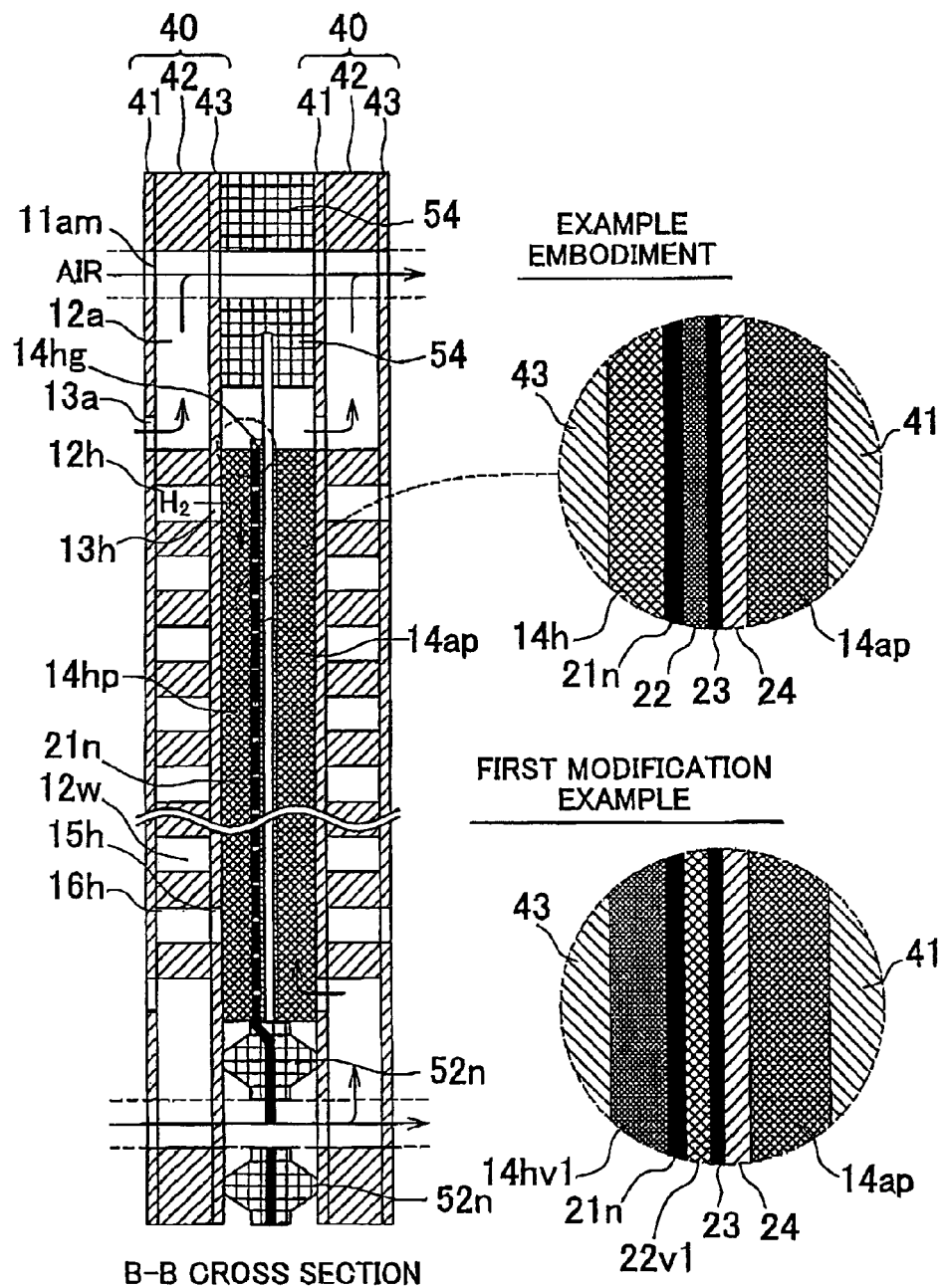
FIG. 25 is a view illustrating the difference in density between a hydrogen-side porous passage portion, which is present on the upstream side of the fuel-gas supply plate, and the gas diffusion layer of a hydrogen-side electrode layer, which is present on the downstream side of the fuel-gas supply plate.

FIG. 25 is a view illustrating the difference in density between the hydrogen-side porous passage portion 14h, which is present on the upstream side of the fuel-gas supply plate 21n, and the gas diffusion layer of the hydrogen-side electrode layer 22, which is present on the downstream side of the fuel-gas supply plate 21n. In this example embodiment, the density of the material of the hydrogen-side porous passage portion 14h on the upstream side is lower than the density of the gas diffusion layer of the hydrogen-side electrode layer 22 on the downstream side, which suppresses the decrease in the pressure of fuel gas when the fuel gas flows through the inside of the hydrogen-side porous passage portion 14h. Thus, the pressures applied from the fuel gas to the respective orifices 211n can be easily equalized, which is desirable.

On the other hand, in the first modification example shown in FIG. 25, conversely, the density of the material of the gas diffusion layer of the hydrogen-side electrode layer 22 on the downstream side is lower than the density of the material of the hydrogen-side porous passage portion 14h on the upstream side. This structure inhibits the nitrogen gas from entering the hydrogen side porous passage portion 14hv1 on the upstream side from the gas diffusion layer of the hydrogen-side electrode layer 22v1 on the downstream side, which is desirable. That is, because the density of the hydrogen side porous passage portion 14hv1 is high and/or the pressure loss at the hydrogen side porous passage portion 14hv1 is large, the nitrogen gas tends to diffuse in the hydrogen-side electrode 22v1, rather than in the hydrogen side porous passage portion 14hv1, and flow in the planar direction of the hydrogen-side electrode 22v1. The equalization of the fuel gas pressures applied to the respective orifices 211n can be accomplished also by setting the diameter of each orifice 21*n* and each interval between the orifices 21*n* variably as needed, for example.

Figure 26:
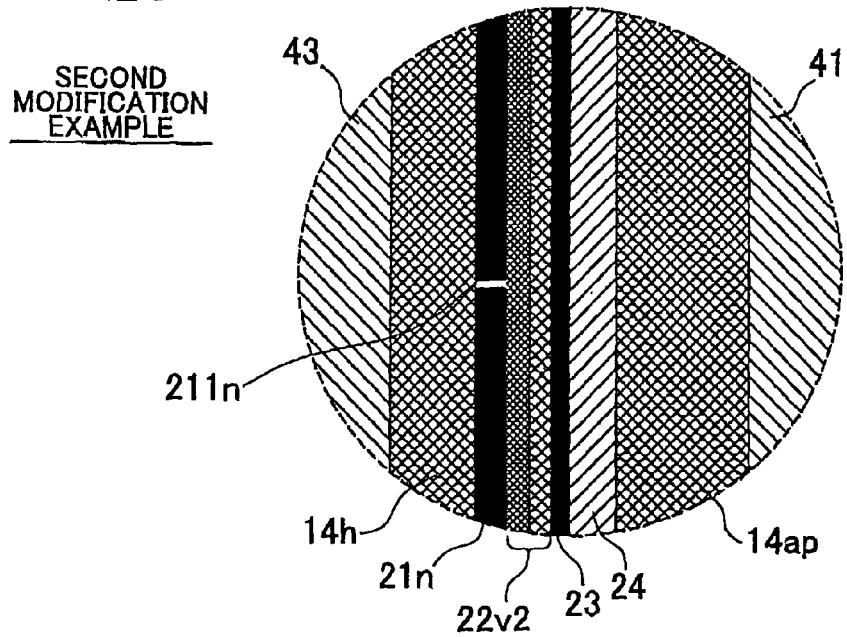
FIG. 26 is a view showing the gas diffusion layer of a hydrogen-side electrode according to the second modification example.

FIG. 26 is a view showing the gas diffusion layer of a hydrogen-side electrode 22*v*2 according to the second modification example. In the second modification example, the gas diffusion layer of the hydrogen-side electrode 22*v*2 has a two-layer structure. Among the two gas diffusion layers, the density of the material of the gas diffusion layer adjacent the electrolyte membrane 23 is lower than the density of the material of the other gas diffusion layer, or the pressure loss at the gas diffusion layer adjacent the electrolyte membrane 23 is smaller than the pressure loss at the other gas diffusion layer. This structure causes the exhaust water discharged from the electrolyte membrane 23 to disperse toward the hydrogen-side porous passage portion 14*h* and thus prevents the exhaust water from flooding, which may otherwise interfere with the supply of fuel gas.

Such exhaust water discharge is accomplished owing to the physical law that the higher the density of a porous material or the larger the pressure loss at the porous material, the greater the capillary force for sucking water. Therefore, as long as the capillary force of the gas diffusion layer of the hydrogen-side electrode 22*v* increases toward the side away from the electrolyte membrane 23, the gas diffusion layer of the hydrogen-side electrode 22*v* may employ any structure. That is, while the gas diffusion layer of the hydrogen-side electrode 22*v* is a two-layer porous portion in the example described above, it may alternatively be a porous portion having a single layer or three or more layers in which the porous material density varies as described above.

Figure 27:
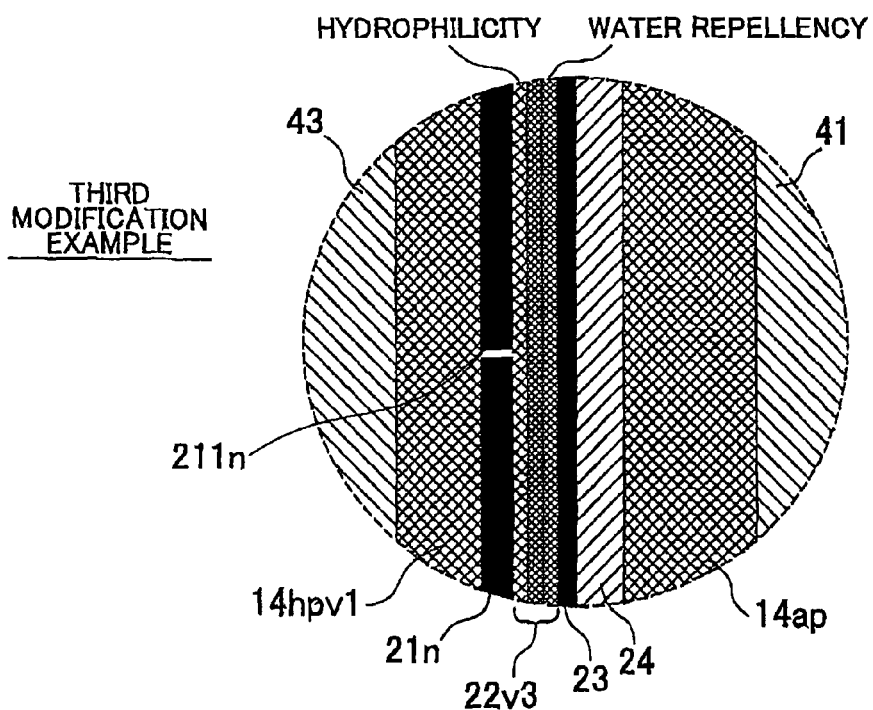
FIG. 27 is a view showing the gas diffusion layer of a hydrogen-side electrode according to the third modification example.

FIG. 27 is a view showing the gas diffusion layer of a hydrogen-side electrode 22*v*3 according to the third modification example. In the third modification example, the gas diffusion layer of the hydrogen-side electrode 22*v*3 has a three-layer structure. The water repellencies of the materials of the three gas diffusion layers increase in steps toward the electrolyte membrane 23 or the hydrophilicities of the materials of the three gas diffusion layers decrease in steps toward the electrolyte membrane 23. This structure also causes dispersion of the exhaust water discharged from the electrolyte membrane 23 and thus prevents the flooding of exhaust water.

Such dispersing discharge of exhaust water is accomplished by replacing the densities of the materials of the respective gas diffusion layers, or the like, of the second modification example with the water repellencies or the hydrophilicities of the materials of the respective gas diffusion layers. Therefore, as long as the hydrophilicity of the gas diffusion layer of the hydrogen-side electrode 22*v*3 increases toward the side away from the electrolyte membrane 23 or as long as the water repellency of the gas diffusion layer decreases toward the side away from the hydrogen-side electrode 22*v*3, the gas diffusion layer of the hydrogen-side electrode 22*v*3 may employ any structure. For example, the gas diffusion layer of the hydrogen-side electrode 22*v*3 may be a porous portion having a single layer or three or more layers in which the hydrophilicity or the water repellency varies as described above. Note that the water repellency, the hydrophilicity, and the density of the gas diffusion layer may be set in various combinations as needed to achieve a desired effect.

Figure 28:
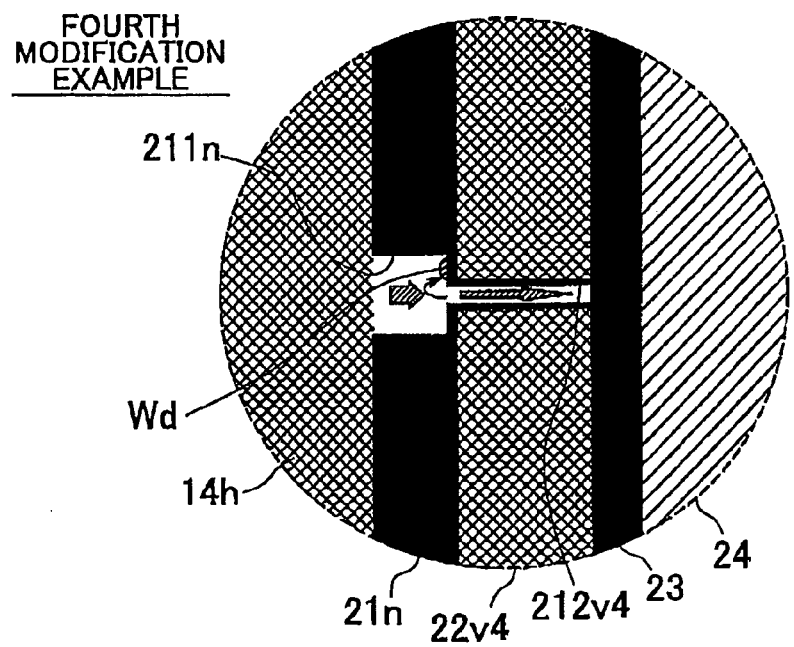
FIG. 28 is a view showing the gas diffusion layer of a hydrogen-side electrode according to the fourth modification example.

FIG. 28 is a view showing the gas diffusion layer of a hydrogen-side electrode 22*v*4 according to the fourth modification example. The gas diffusion layer of the hydrogen-side electrode 22*v*4 differs from the foregoing gas diffusion layers in that communication holes 212*v*4 are formed at the positions corresponding to the orifices 211*n* of the fuel-gas supply plate 21*n*. The communication holes 212*v*4 serve to divide and disperse the exhaust water stagnating on the surface of the catalyst layer of the hydrogen-side electrode 22*v*4 (not shown in the drawings). In particular, the communication holes 212*v*4 are smaller in diameter than the orifices 211*n* so that exhaust water Wd discharged via the communication holes 212*v*4 is absorbed into the hydrogen-side electrode 22*v*4, whereby the orifices 211*n* are prevented from being clogged up with the exhaust water, which is desirable.

Figure 29:
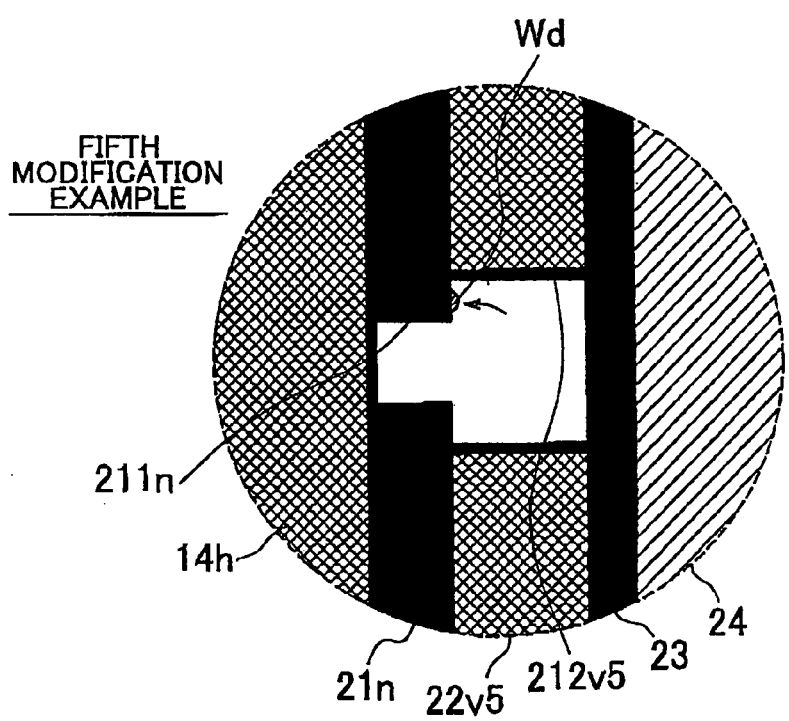
FIG. 29 is a view showing the gas diffusion layer of a hydrogen-side electrode according to the fifth modification example.

FIG. 29 is a view showing the gas diffusion layer of a hydrogen-side electrode 22*v*5 according to the fifth modification example. In the fifth modification example, communication holes 212*v*5 are formed at the positions corresponding to the orifices 211*n* of the fuel-gas supply plate 21*n*. The communication holes 212*v*5 serve to divide and disperse the exhaust water stagnating on the surface of the hydrogen-side electrode 22*v*5, as in the fourth modification example. However, the fifth modification example differs from the fourth modification example in that the communication holes 212*v*5 are larger in diameter than the orifices 211*n*. According to this structure, the exhaust water wd discharged from the communication holes 212*v*5 is blocked by the fuel-gas supply plate 21*n* and then absorbed into the hydrogen-side electrode 22*v*5, whereby the orifices 211*n* are prevented from being clogged up with the exhaust water as in the forth modification example.

It is to be noted that because the exhaust water can be divided if the communication holes 212*v*4, 212*v*5 communicate with the respective orifices 211*n*, it is not essential that the diameters of the communication holes 212*v*4, 212*v*5 be different from those of the orifices 211*n*.

Figure 30:
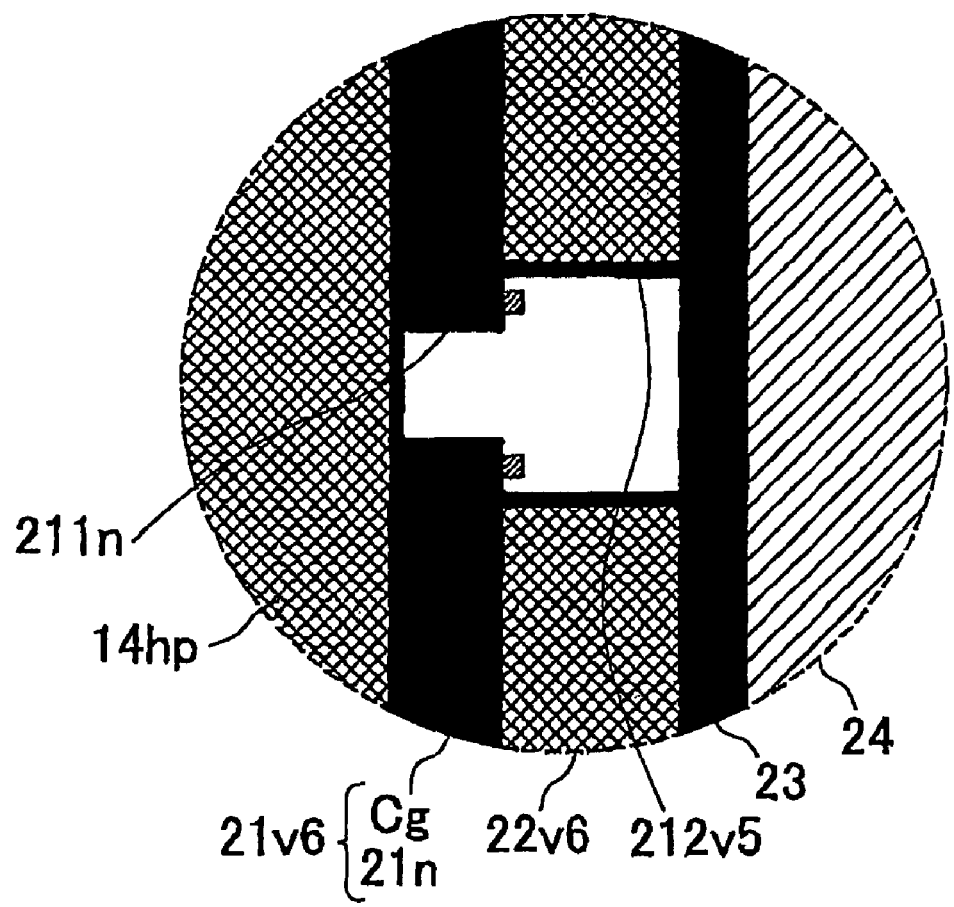
FIG. 30 is a view showing the gas diffusion layer of a hydrogen-side electrode according to the sixth modification example.

FIG. 30 is a view showing the gas diffusion layer of a hydrogen-side electrode 22*v*6 according to the sixth modification example. In the sixth modification example, the communication holes 212*v*5 are formed at the positions corresponding to the orifices 211*n* of the fuel-gas supply plate 21*n* and the communication holes 212*v*5 are larger in diameter than the orifices 211*n*, as in the fifth modification example described above. A difference of the sixth modification example from the fifth modification example lies in that a fuel-gas supply plate 21*v*6 is provided with a positioning member Cg defining the positional relation between the orifices 211*n* and the hydrogen-side electrode 22*v*6. The use of the positioning member Cg increases the reliability in obtaining the above-described effects.

In systems in which fuel gas is not discharged periodically during power generation, it is particularly important to prevent the flooding of exhaust water as described above. That is, in such systems, the amount of water vapor discharged together with exhaust fuel gas is small or zero, and therefore humidification cannot be performed using discharged exhaust water outside of the fuel cell stack 100. Meanwhile, the above-described structures of the example embodiment each enable the fuel cell system, which does not circulate fuel gas, to operate in its normal operation mode while dispersing exhaust water without discharging water vapor together with exhaust fuel gas, thus smoothening the use cycle of water to humidify fuel gas in the fuel cell stack 100.

FIG. 31 to FIG. 35 are views illustrating modification examples of the air-side porous passage portion 14*a*. The structures employed in these examples are adapted to solve a problem that may occur on the air passage side in non-circulation type fuel-gas supply systems. This problem is a new problem that has been recognized by the inventors.

More specifically, the inventors discovered that employing a structure not circulating fuel gas affects the designing of the air passages as well as causing the foregoing problems related to the fuel-gas passages. For example, as is evident from the comparative example illustrated in FIG. 5, for the purpose of uniformizing the humidification state in the membrane-electrode assembly 20, related-art technologies employ structures in which fuel gas and air flow in the opposite directions. That is, in the reaction gas passages in the comparative example illustrated in FIG. 5, the reaction gases are humidified by the exhaust water discharged from the hydrogen-side electrode layer 22 and the air-side electrode layer 24, respectively, and therefore the humidity of each reaction gas increases from the inlet to the outlet of the corresponding reaction gas passage. As such, in order to uniformize the humidification state in the membrane-electrode assembly 20, the comparative example illustrated in FIG. 5 employs a structure in which the reaction gases to be supplied to the respective electrodes (i.e., fuel gas and oxidizing gas) flow in the opposite directions, that is, in which the inlet of the reaction passage on one side of the membrane-electrode assembly 20 is present near the outlet of the reaction passage on the other side of the membrane-electrode assembly 20.

In the structures according to the foregoing example embodiment and its modification examples, however, because fuel gas is supplied to the membrane-electrode assembly 20 while maintaining the hydrogen partial pressure in the fuel gas uniform as compared to the structures in which fuel gas is circulated, the above-described effect obtained by the opposite reaction gas flows can not be obtained. For the purpose of solving this issue, the inventors have invented the following structure.

Figure 33:
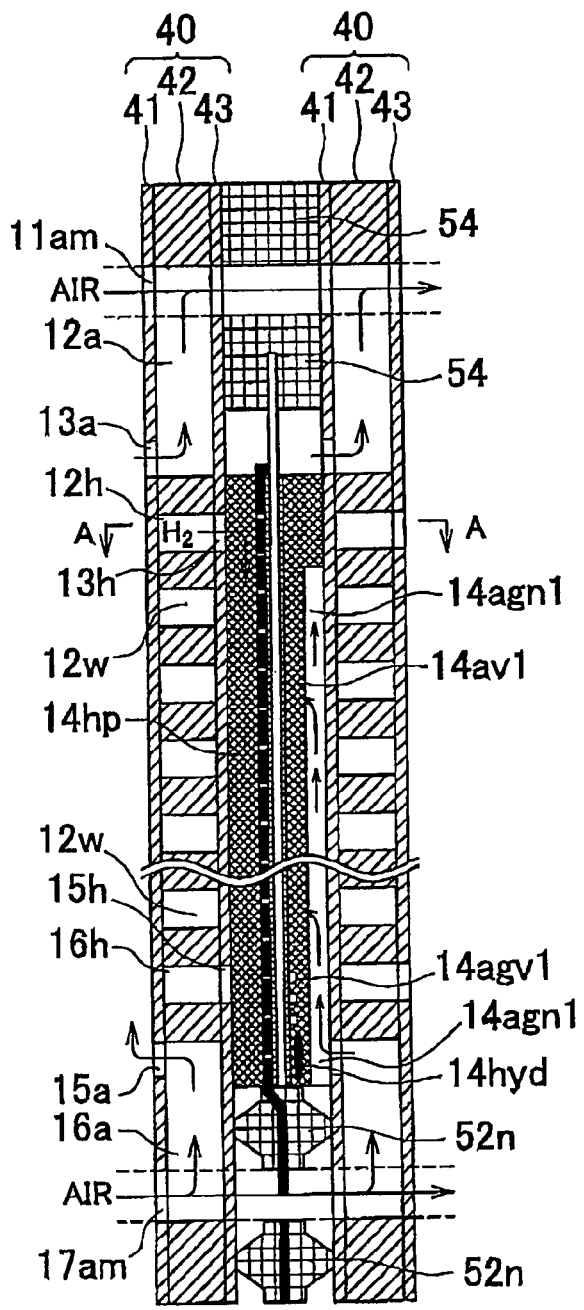
FIG. 33 is a view showing the gas passages within a fuel cell stack incorporating the air-side electrode porous passage portion of the first modification example.

FIG. 31 is a view showing an air-side electrode porous passage portion 14$av$1 of the first modification example. FIG. 32 is a view showing an air-side electrode porous passage portion 14$av$2 of the second modification example. FIG. 33 is a view showing the gas passages within a fuel cell stack incorporating the air-side electrode porous passage portion 14$av$1 of the first modification example. The air-side electrode porous passage portion 14$av$2 of the second modification example has the same structure as the air-side porous passage portion 14$a$ except that the air-side electrode porous passage portion 14$av$2 has a grooved passage portion 14$c$ (e.g., a perforated metal). Owing to the grooved passage portion 14$c$, the air-side electrode porous passage portion 14$av$2 provides the same effects as those obtained with the air-side electrode porous passage portion 14$av$1. The grooved passage portion 14$c$ may be used in combination with the air-side electrode porous passage portion 14$av$1 that has grooves as described below, and a hydrophilization treatment may be applied to the grooves of the air-side electrode porous passage portion 14$av$1.

The air-side electrode porous passage portion 14$av$1 of the first modification example differs from the air-side porous passage portion 14$a$ of the example embodiment in that grooves 14$ag$1 are formed in the surface of the air-side electrode porous passage portion 14$av$1 on the side opposite the surface abutting on the air-side electrode layer 24. According to this structure, air is supplied to the air-side electrode porous passage portion 14$av$1 via the grooves 14$ag$1, and this suppresses the difference between the humidity on the upstream side and the humidity on the downstream side. Thus, it is possible to minimize the possibility of dryout at portions of the air-side electrode porous passage portion 14$av$1 near the air supply hole 13$a$ (the air inlet side) and the possibility of flooding at portions of the air-side electrode porous passage portion 14$av$1 near the air discharge passage 16$a$ (the air outlet side).

Further, in the air-side electrode porous passage portion 14$av$1 shown in FIG. 32, the portions near the air supply hole 13$a$ (the air inlet side) are hydrophilized, and the air passages are formed such that air flows from the lower side to the upper side. The hydrophilization helps retain water and thus prevent dryout, and the airflow from the lower side to the upper side helps retain water in the lower side under the gravity.

In the comparative example shown in FIG. 5, because the passages are formed such that air flows from the lower side to the upper side in order to create the opposite reaction gas flows, and therefore, if fuel gas flows in one direction, air flows in the opposite direction. On the other hand, in the case of the example embodiment and its modification examples described above, because fuel gas is directly and evenly supplied to the membrane-electrode assembly 20, there are no such "upstream" and "downstream" concepts, and therefore the air passages are preferably set such that air flows from the lower side to the upper side.

Figure 34:
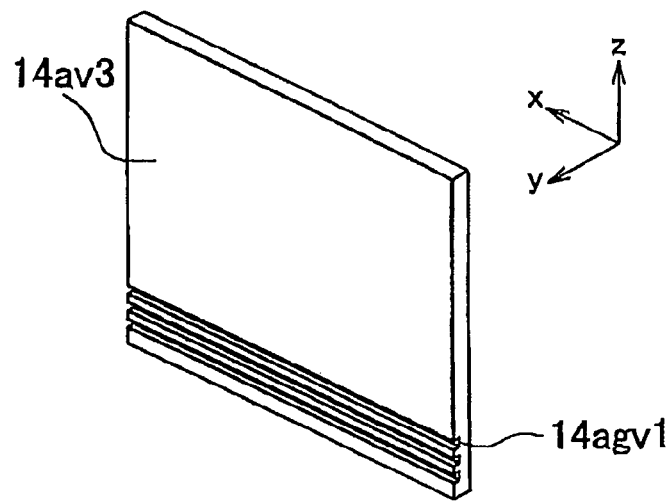
FIG. 34 is a view showing an air-side electrode porous passage portion of the third modification example.

FIG. 34 is a view showing an air-side electrode porous passage portion 14$av$3 of the third modification example. The air-side electrode porous passage portion 14$av$3 of the third modification example differs from the air-side electrode porous passage portion 14$av$1 of the first modification example in that water retention grooves 14$agv$1 are formed in the portion of the air-side electrode porous passage portion 14$av$3 in the vicinity of the air discharge passage 16$a$ (the air outlet side). A research by the inventors has proved that it is preferable that the water retention grooves 14$agv$1 be approximately 1 mm or larger in width.

Figure 35:
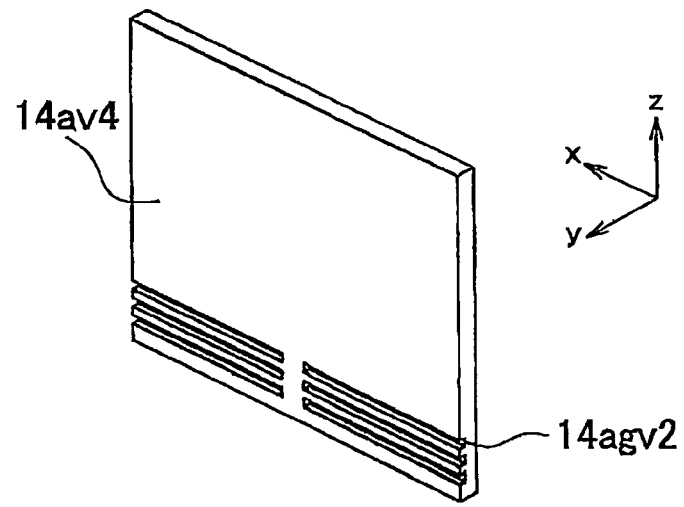
FIG. 35 is a view illustrating an air-side electrode porous passage portion of the fourth modification example.

For example, each water retention groove 14$agv$1 may be continuously formed from one end to the other end of the air-side electrode porous passage portion 14$av$3, or may be divided into two or more separate portions, as in the case of an air-side electrode porous passage portion 14$av$4 shown in FIG. 35, and each portion may have different length and width from others. Further, each water retention groove 14$agv$1 may be hydrophilized.

Further, in the example embodiment and its modification examples described above, because fuel gas is supplied to the membrane-electrode assembly 20 while maintaining the hydrogen partial pressure in the fuel gas substantially uniform, there arise unique issues regarding the uniformization of the reaction distribution and the heat distribution, which correspond to the reaction distribution, as well as the foregoing issues on the water management.

In the case where fuel gas and air flow in opposite directions as described above, as is evident from the Nernst equation in FIG. 22, the reaction distribution becomes uniform as well as the humidification state. That is, the upstream region of the fuel-gas passage where the hydrogen partial pressure is high (FIG. 9) faces the downstream region of the air passage where the oxygen partial pressure is low, while the downstream region of the fuel-gas passage where the hydrogen partial pressure is low faces the upstream region of the air passage where the oxygen partial pressure is high, whereby reactions uniformly occur throughout the membrane electrode assembly 20.

The air-side electrode porous passage portion 14$av$1 of the first modification example shown in FIG. 1 provides an effect of reducing the difference in the oxygen partial pressure in the air supplied to the upstream region and the oxygen partial pressure in the air supplied to the downstream region, and therefore it solves the foregoing problem. However, because, unlike fuel gas, air needs to be discharged in the structures of the example embodiment and its modification examples described above, there is a trade-off between the power needed to supply air to each fuel cell and the uniformity in the oxygen partial pressure in air supplied.

Further, the management of water in the air passages influences, via reverse dispersion of water, the fuel-gas passages, and therefore the air passages are preferably designed in consideration of possible influences of the air passages on the fuel-gas passages. In particular, in the case of systems that do not discharge fuel gas periodically during power generation, because fuel gas is humidified using the water dispersed from the air passages, such designing of the air passages is especially important. More specifically, preferably, the flooding of water at the oxidizing gas side electrode is effectively prevented by increasing the drainability of exhaust water, or a relatively uniform reverse dispersion of water is accomplished on the fuel-gas passage side These can be accomplished by, for example, the following structure, which may be combined with any of the foregoing structures.

The multi-layer structure of the hydrogen-side electrode 22v3 of the third modification example (FIG. 27) may be applied to the air-side electrode layer 24. In the third modification example, as described above, the gas diffusion layer of the hydrogen-side electrode 22v2 has a three-layer structure, and the water repellencies of the materials of the three layers are set so as to increase in steps toward the electrolyte membrane 23 or the hydrophilicities of the materials of the three layers are set so as to decrease in steps toward the electrolyte membrane 23. Even when applied to the air-side electrode layer 24, this structure effectively disperses the exhaust water discharged from the electrolyte membrane 23 and thus prevents the flooding of exhaust water.

To accomplish such dispersing drainage of exhaust water, it is enough to ensure that the farther the location is away from the electrolyte membrane 23, the higher the hydrophilicity (or the lower the water repellency) is. Therefore, the gas diffusion layer of the electrolyte membrane 23 may alternatively be, for example, a porous portion having a single layer or three or more layers in which the hydrophilicity, or the like, varies. Note that the water repellency, the hydrophilicity, and the density of the gas diffusion layer may be set in various combinations as needed to achieve a desired effect. As such, by performing the water management in the air passage and the water management in the fuel-gas passage cooperatively, desired reverse water dispersion can be accomplished and therefore the water management in the fuel-gas passage can be more properly performed.

D. Manufacturing of Fuel-Cell Stack of Example Embodiment

FIG. 36 is a view showing the fuel-gas supply plate 21v5 of the fifth modification example. If the fuel-gas supply plate 21v5 is provided in any of the structures according to the example embodiment and its modification examples described above, a new process for mounting the fuel-gas supply plate 21v5 needs to be added. In view of this, in the fifth modification example, the edges of the fuel-gas supply plate 21v5 are bent so as to enable easy positioning of the fuel-gas supply plate 21v5 when mounting it during assembly of the fuel cell stack.

FIG. 37 is a view showing a fuel-gas supply plate 21v6 of the sixth modification example. According to the sixth modification example, the hydrogen-side electrode layer 22 has two positioning pins 22ref1, 22ref2 that are provided in the fuel-gas passage, and positioning pin holes 21ref1, 21ref2 are formed in the fuel-gas supply plate 21v6, and positioning pin holes 14ref1, 14ref2 are formed in the hydrogen-side porous passage portion 14hv6.

According to this structure, the two positioning pins 22ref1, 22ref2 are provided in the fuel-gas passage, and this disagrees with the common technical knowledge that positioning pins should be provided outside the fuel-gas passage, which was believed appropriate at the time of filing this application. However, regardless of this, common knowledge, the inventors examined the above-described structures and focused on the fact that, in said structures, leaks occur only between portions where fuel gas flow and therefore they judged that no significant problem would result from said structures. As a result, positioning pins provided outside of the fuel-gas passage can be removed, and the size and weight of each fuel cell can be reduced accordingly.

E: Other Example Modifications

While the invention has been described with reference to the example embodiments thereof, it is to be understood that the invention is not limited to the example embodiments. To the contrary, the invention is intended to cover various modifications and equivalent arrangements. In particular, it is to be noted that the elements cited in the foregoing example embodiment and its modifications but not included in the independent claims of the invention are not essential and thus can be removed as needed. In the following, other modification examples will be described.

E-1

The invention may optionally incorporate the following structures and features.

(1) Regions to which fuel gas may be supplied from the fuel-gas supply plate are partitioned off from each other via partitions.

(2) The hydrogen-side electrode layer may have a structure that helps fuel gas disperse away from the orifices in the fuel-gas supply plate along the surfaces of said orifices (e.g., cobweb-like grooves, grooves radiating in all directions, portions in which the air permeability varies from position to position).

(3) In the hydrogen-side electrode layer, partitions are provided between the regions to which fuel gas is supplied from the respective orifices of the fuel-gas supply plate in order to inhibit the movement of fuel gas between said regions. In this case, each block of the hydrogen-side electrode layer is not necessarily provided for each single orifice of the gas supply plate. Further, the respective blocks of the hydrogen-side electrode layer may be shaped in a honeycomb pattern. The respective blocks of the hydrogen-side electrode layer may be differently sized so as to equalize the amount per unit area of fuel gas supplied from each orifice of the fuel-gas supply plate. Further, orifices may be provided in the fuel-gas supply plate such that the number of orifices per unit area increases toward the downstream side where interferences on fuel gas flows are relatively strong.

(4) A fluid circulator (e.g., ejector) or fluid circulators may be provided at least one of the upstream passage portion and the downstream passage portion of the fuel-gas supply plate to inhibit nitrogen concentration (e.g., the vicious cycle illustrated in FIG. 8 and FIG. 9) through its dispersion.

(5) The fuel cell system may have a storage portion for storing non-reactive fluids including nitrogen gas in fuel-gas supply passages.

(6) To provide functions equivalent to the fuel-gas supply functions of the fuel-gas supply plate, the fuel-gas supply passage portion may incorporate portions at which the flow resistance varies or is adjusted (e.g., adjustment of the ratio of orifices, adjustment of grooves, adjustment (variation) of groove width) or at which particular fuel-gas passage paths or directions are set. For example, the fuel-gas passage portion may be formed such that fuel gas is supplied in two or more different directions (e.g., from the outer edge to the center of the fuel-gas passage portion).

(7) In order to prevent an unexpected drop of the output of the fuel cell system, the fuel cell system may be adapted to limit the system output to a predetermined range or to stop the system output during the start-up of the fuel cell system. As a result of limiting the system output at the start-up of the fuel cell system, the consumption of hydrogen gas decreases, for example, and it helps uniformize the nitrogen concentration and optimize the hydrogen partial pressure in the hydrogen-side electrode layer.

(8) The fuel cell system may be configured such that fuel gas is supplied to fuel cells via two or more fuel-gas supply manifolds. In this case, the flow rate and pressure of fuel gas to be supplied to each manifold may be independently adjusted to ensure that fuel gas is uniformly supplied to the hydrogen-side electrode layer.

(9) In the fuel cell system, a buffer tank for the fuel-gas passage may be provided within or outside of the fuel cell. The buffer tank may be connected to the fuel-gas passage via a valve. In this case, the valve is opened during the start-up of the fuel cell system to discharge nitrogen gas, and the like, which have accumulated while the fuel cell system was not operating.

(10) A water repellant treatment may be applied to almost the entire surface of the fuel-gas supply plate on the hydrogen-side electrode layer side and/or to all the orifices of the fuel-gas supply plate. Further, the fuel-gas supply plate may be formed such that the hydrophilicity and/or the water repellency at one side of the fuel-gas supply plate are not equal to the hydrophilicity and/or the water repellency at the other side. The hydrophilicity and the water repellency may be increased by gold-plating or water repellant coating, for example.

(11) The fuel-gas supply plate may have a multi-layer structure. In this case, for example, a smaller number of through holes may be formed in the upstream layer, or a larger number of through holes may be formed in the downstream layer.

E-2

While the invention is applied to solid polymer fuel cells in the foregoing example embodiment, the invention may be applied also to various other fuel cells, such as solid oxide fuel cells, molten carbonate fuel cells, and phosphoric acid fuel cell systems. However, note that the inventors found that the above-described significant effects may be obtained by solid polymer electrolyte fuel cells.

E-3

While pure hydrogen is used as fuel gas in the foregoing example embodiment, in the case where the electrolyte membrane 23 is made of electrolyte permeable to particular impurities, reformation gas containing said impurities may be used as fuel gas.

E-4

For example, an aspect of the invention relates to a fuel cell using air as oxidizing gas and having: an anode provided on an outer face of an electrolyte membrane on one side thereof and having a gas diffusibility; a cathode provided on an outer face of the electrolyte membrane on the other side thereof and having a gas diffusibility; a conductive sheet portion provided adjacent to an outer face of the anode, which has a gas impermeability, a sheet-like shape, and a plurality of through holes that spread two-dimensionally along a horizontal plane of the conductive sheet portion; a conductive porous portion provided adjacent to an outer face of the conductive sheet portion and forming a fuel-gas supply passage through which fuel gas is dispersedly distributed in directions along the horizontal plane of the conductive sheet portion; and a separator provided adjacent to an outer face of the conductive porous portion.

According to the fuel cell described above, the conductive sheet portion inhibits the gas leaking from the cathode side to the anode side from entering the conductive porous portion, so that the supplied fuel gas is dispersed. Thus, the power generation efficiency of the entire fuel cell improves.

In the fuel cell described above, preferably, one of the pressure at which fuel gas is supplied to the gas supply passage and the pressure at which oxidizing gas is supplied to the cathode is set such that the minimum value of the pressure of fuel gas flowing in the fuel-gas supply passage is larger than the maximum value of the partial pressure of leak gas leaking to the anode from the oxidizing gas in the cathode through the electrolyte membrane.

According to the structure described above, the nitrogen leaking to the anode is more effectively prevented from flowing into the conductive porous portion via the through holes in the conductive sheet portion.

In the above-described fuel cell, preferably, the anode is provided adjacent the conductive sheet portion and the anode has a gas diffusion layer having a gas flow resistance lower than the conductive porous portion.

This structure facilitates the dispersion of the fuel gas supplied to the anode through the through holes of the conductive sheet portion, so that the fuel gas disperses throughout the entire anode.

In the above-described fuel cell, preferably, the fuel gas supplied to the anode should not be discharged to the outside at least during the normal power generation of the fuel cell. In this case, optionally, the anode side may have a closed structure that does not discharge fuel gas from the anode to the outside.

In the above-described fuel cell, preferably, a metal material is plated to the surface of the conductive sheet portion on the conductive porous portion side or a polymer conductive paste is impregnated to said surface of the conductive sheet portion, and the through holes are formed in said surface.

According to this structure, the contact resistance between the conductive sheet and the conductive porous portion decreases.

In the above-described fuel cell, preferably, the cathode has an oxidizing-gas supply hole via which oxidizing gas is supplied to the cathode and an oxidizing-gas discharge hole via which oxidizing gas is discharged after used for electro-chemical reactions at the cathode, and the through holes in the conductive sheet portion are differently sized depending upon their relative distances to the oxidizing-gas supply hole or to the oxidizing-gas discharge hole such that the through hole or holes close to the oxidizing-gas supply hole are smaller in diameter than the through hole or holes close to the oxidizing-gas discharge hole.

According to this structure, because the through holes in the region of the conductive sheet portion corresponding to the portion of the anode where the leak gas partial pressure is high are relatively small in diameter, the flow speed of the fuel gas in said region of the conductive sheet portion is high, whereby the leak gas is prevented from flowing into the conductive porous portion. On the other hand, the through holes in the region of the conductive sheet portion corresponding to the portion of the anode where the leak gas partial pressure is low are relatively large in diameter, the exhaust water leaking from the cathode to the anode can be drained to the conductive porous portion via the through holes.

In the above-described fuel cell, preferably, the separator is constituted of a plurality of conductive plates stacked on top of each other and one of the conductive plates has a fuel-gas supply hole through which fuel gas is supplied to the surface of the conductive porous portion in a direction substantially perpendicular to the surface of the conductive porous portion, and a coolant passage is provided in the separator.

The invention can be embodied as a method invention including various fuel cell manufacturing methods, as well as a structure invention such as fuel cells as those described above.

E-4-A. Example Embodiments

E-4-A1. Structure of Fuel Cell 100s

Figure 38:
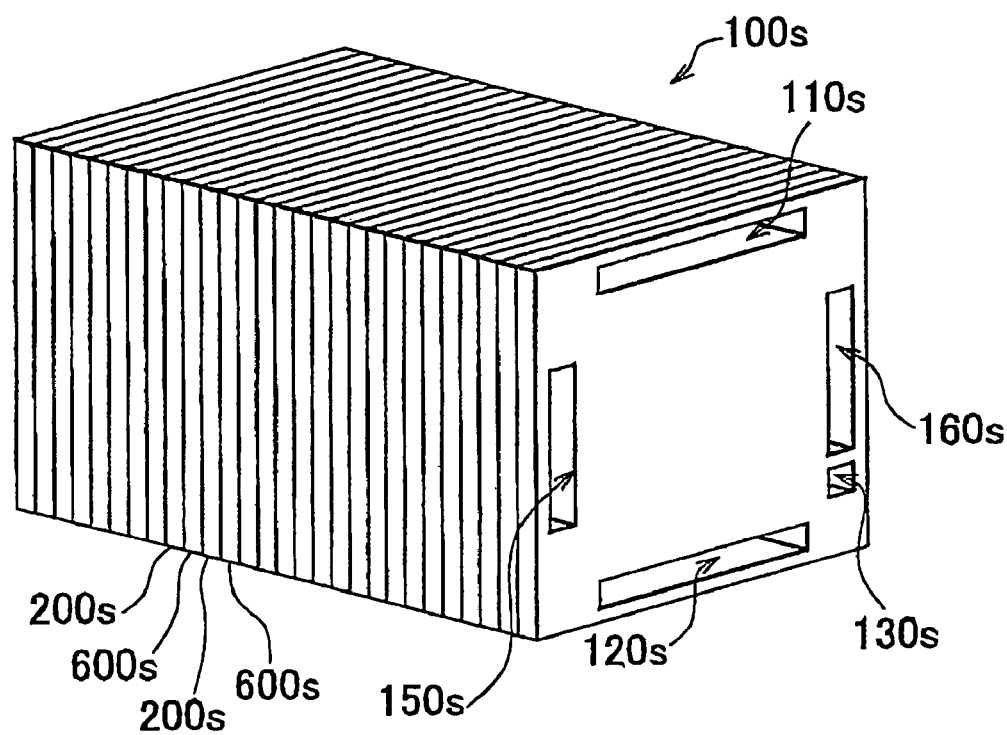
FIG. 38 is a view showing the exterior of the fuel cell unit of the example embodiment.
Figure 39:
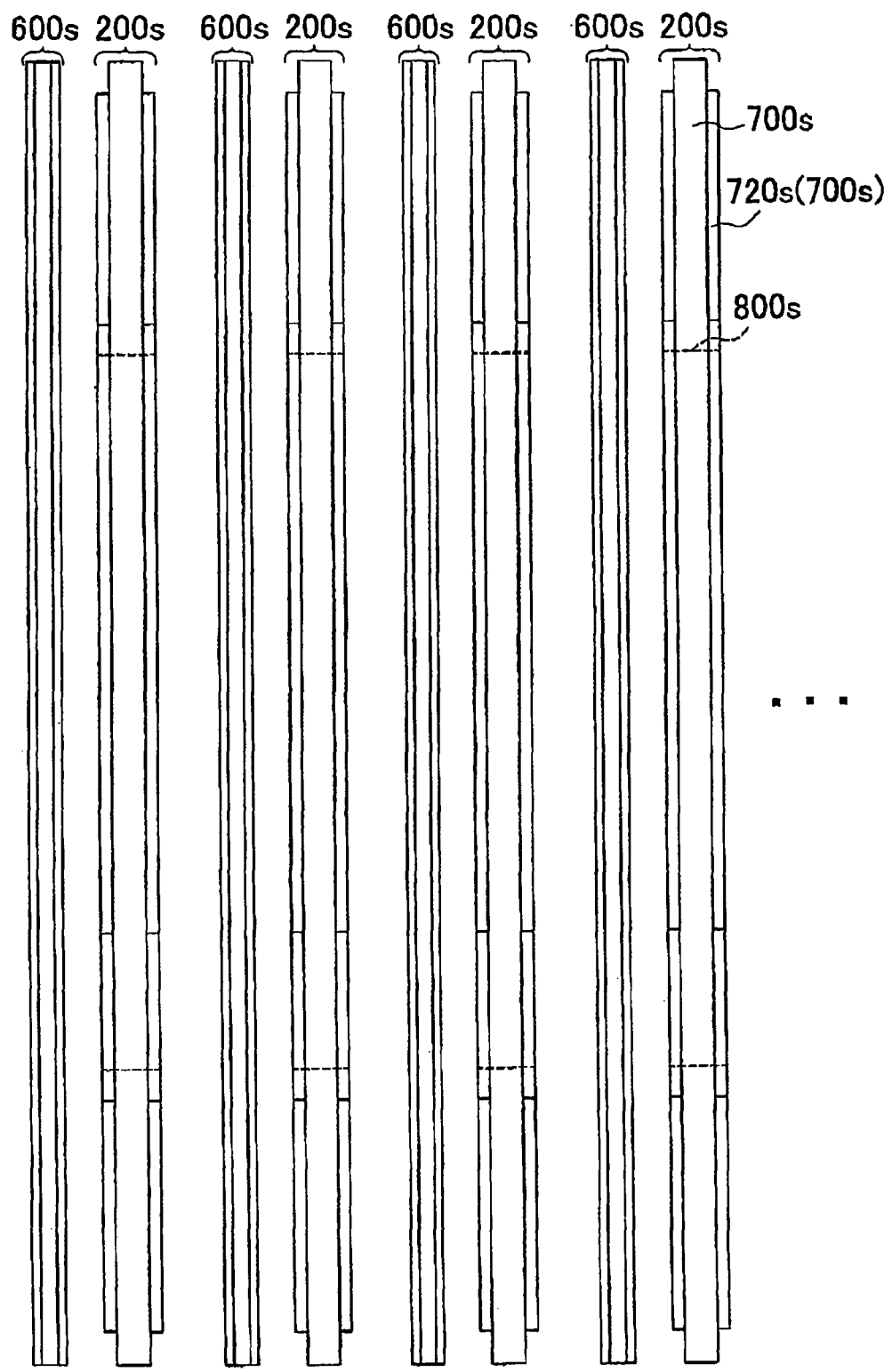
FIG. 39 is a side view of the fuel cell unit.

The structure of a fuel cell unit 100s according to an example embodiment of the invention will be briefly described. FIG. 38 is a view showing the exterior of the fuel cell unit 100s of the example embodiment, and FIG. 39 is a side view of the fuel cell unit 100s. Referring to FIG. 38 and FIG. 39, the fuel cell unit 100s has a stack structure constituted of seal-integrated power generation assemblies 200s and separators 600s that are alternately stacked. When manufacturing the fuel cell unit 100s, a given number of seal-integrated power generation assemblies 200s and a given number of separators 600s are stacked on top of each other, and then they are clamped in their stacking direction at a given clamping pressure. Although FIG. 39 shows spaces between the seal-integrated power generation assemblies 200s and the separators 600s, these spaces do no exist in the actual structure, that is, the seal-integrated power generation assemblies 200s and the separators 600s are in contact with each other. In the following, the direction in which the seal-integrated power generation assemblies 200s and the separators 600 are stacked will be referred to as "stacking direction" where necessary. Sealers 700s (ribs 720s) will be described in detail later.

Referring to FIG. 38, the fuel cell unit 100s has an oxidizing-gas supply manifold 110s for supplying oxidizing gas, an oxidizing-gas discharge manifold 120s for discharging oxidizing gas, a fuel-gas supply manifold 130s for supplying fuel gas, and a coolant supply manifold 150s for supplying coolant, and a coolant discharge manifold 160s for discharging coolant. The fuel cell unit 100s is structured not to discharge fuel gas from the anode side, that is, the fuel cell unit 100s has a closed structure that does not discharge fuel gas from the anode to the outside. This structure will hereinafter be referred to as "anode dead-end structure" where necessary. Thus, the fuel cell unit 100s does not have any manifold for discharging fuel gas. In the fuel cell unit 100s, air is used as oxidizing gas, and hydrogen is used as fuel gas. Antifreeze liquid (e.g., water, ethylene glycol), air, or the like, may be used as coolant. Further, gas obtained by adding high-concentration oxygen into air may be used as oxidizing gas.

E-4-A2. Seal-Integrated Power Generation Assembly 200s

Figure 40:
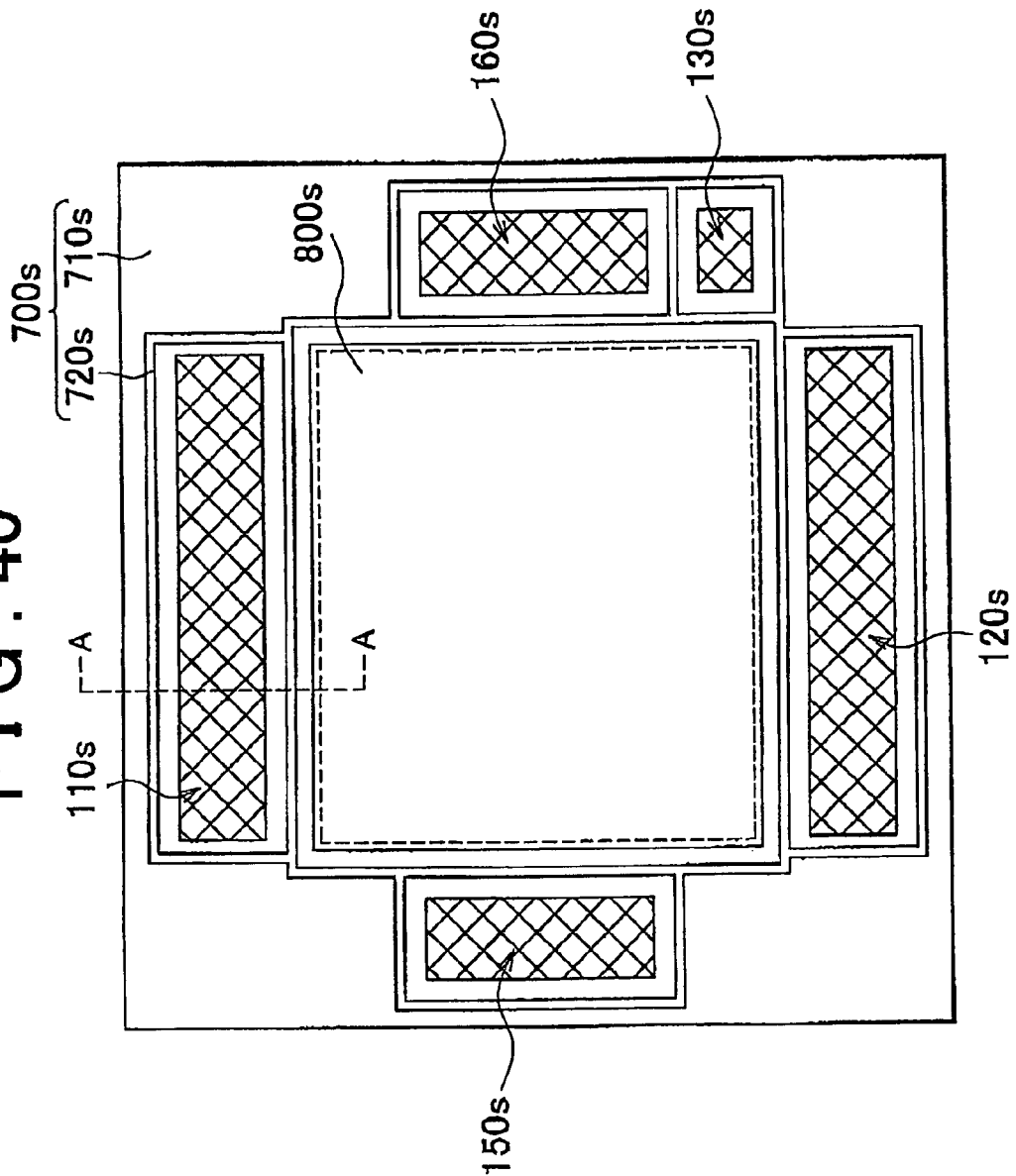
FIG. 40 is an elevation view of a seal-integrated power generation assembly.
Figure 41:
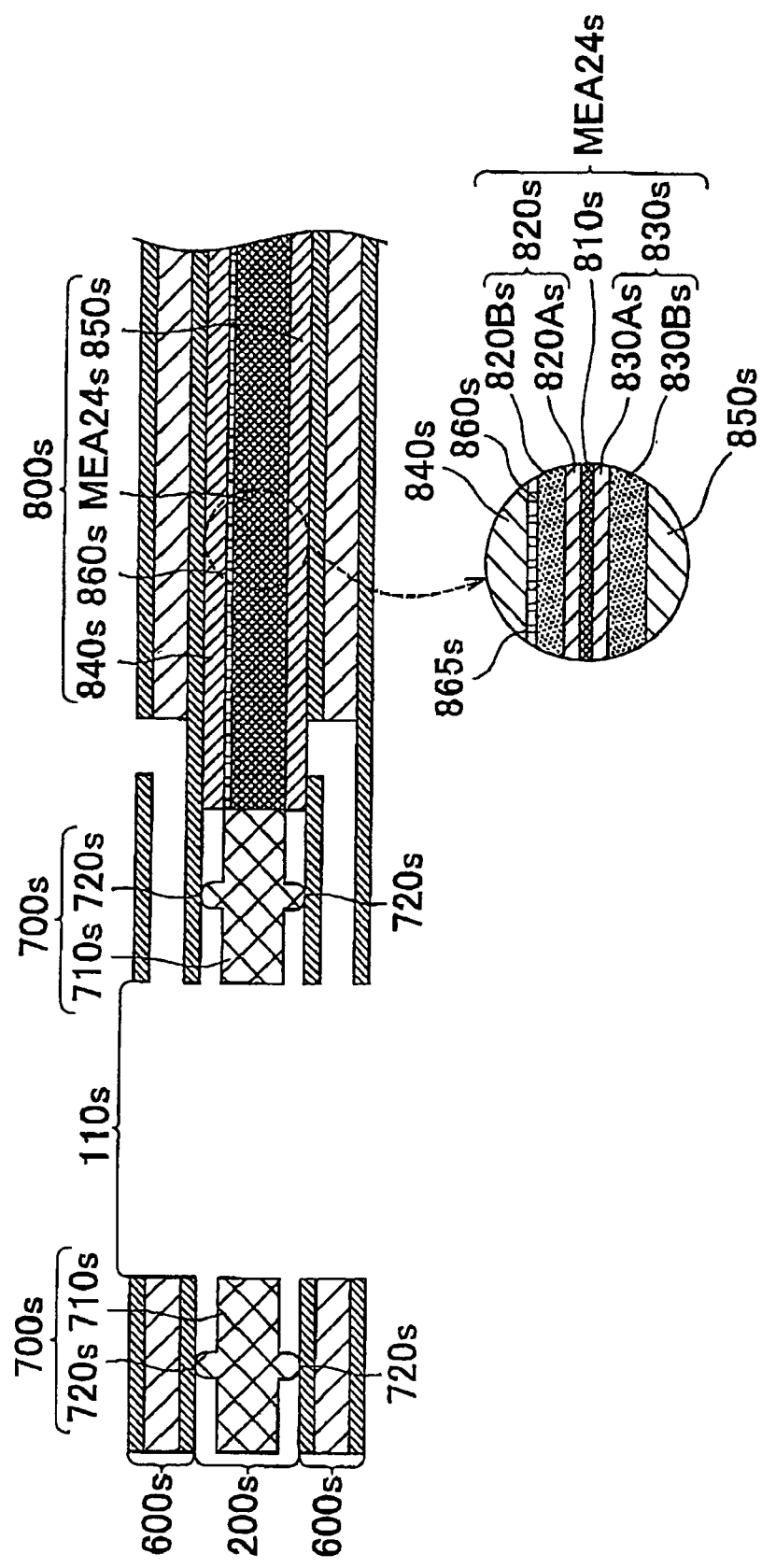
FIG. 41 is a cross-sectional view taken along the line A-A in FIG. 40.

FIG. 40 is an elevation view of the seal-integrated power generation assembly 200s (a view of each seal-integrated power generation assembly 200s seen from the right side in FIG. 39). FIG. 41 is a cross-sectional view taken along the line A-A in FIG. 40. FIG. 41 shows, as well as the seal-integrated power generation assembly 200s, two separators 600 that are provided on both sides of the seal-integrated power generation assembly 200s when the fuel cell unit 100s is assembled.

Referring to FIG. 39, FIG. 40, and FIG. 41, the seal-integrated power generation assembly 200s is constituted of a stack portion 800s and the sealer 700s.

As shown in FIG. 41, the stack portion 800s has a MEA 24s, a conductive sheet 860s characterizing the invention, an anode-side porous portion 840s, and a cathode-side porous portion 850s.

The MEA 24s has an electrolyte membrane 810s, an anode 820s, and a cathode 830s. The electrolyte membrane 810s is made of, for example, a fluorine resin or a hydrocarbon resin and exhibits a high ion conductivity in a wet condition. The anode 820s is constituted of a catalyst layer 820As provided on one side of the electrolyte membrane 810s and an anode-side diffusion layer 820Bs provided on the outer side of the catalyst layer 820As. The cathode 830s is constituted of a catalyst layer 830As provided on the other side of the electrolyte membrane 810s and a cathode-side diffusion layer 830Bs provided on the outer side of the catalyst layer 830As. The catalyst layers 820As, 830As are each formed of, for example, electrolyte and catalyst carriers (e.g., platinum-carrying carbon) on each of which catalyst (e.g., platinum) is supported. The anode-side diffusion layer 820Bs and the cathode-side diffusion layer 830Bs are each formed of, for example, carbon cloth woven from carbon fiber threads, carbon papers, or carbon felts. The MEA 24s is rectangular.

The anode-side porous portion 840s and the cathode-side porous portion 850s are each made of a porous material having a gas diffusibility and a conductivity, such as porous metal. For example, expanded metal, perforated metal, meshes, felts, etc., are used. Further, the anode-side porous portion 840s and the cathode-side porous portion 850s contact power generation regions DA of the separators 600s, which will be described later, when the seal-integrated power generation assemblies 200s and the separators 600s are stacked to form the fuel cell unit 100s. Further, the anode-side porous portion 840s serves as a fuel-gas supply passage for supplying fuel gas to the anode 820s as will be described later, while the cathode-side porous portion 850s serves as an oxidizing-gas supply passage for supplying oxidizing gas to the cathode 830s as will be described later. Note that the gas flow resistance of the anode-side diffusion layer 820Bs is lower than that of the anode-side porous portion 840s and the gas flow resistance of the cathode-side diffusion layer 830Bs is lower than that of the cathode-side porous portion 850s.

Figure 42:
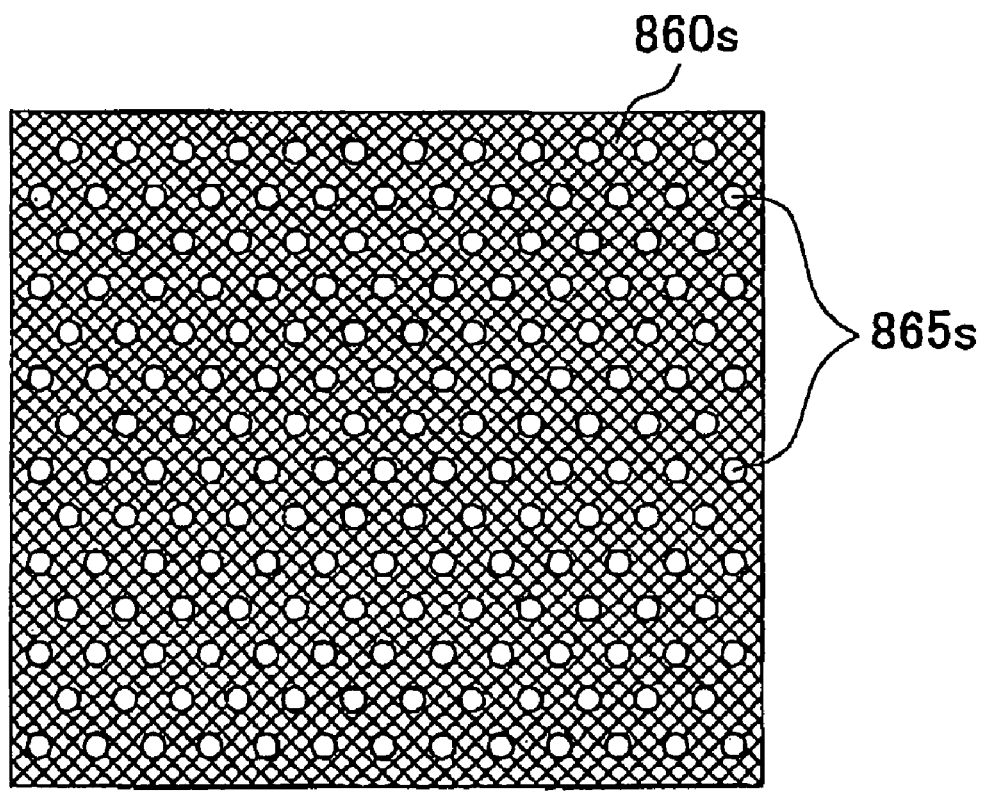
FIG. 42 is an elevation view of a conductive sheet that characterizes the invention.

FIG. 42 is an elevation view of the conductive sheet 860s that characterizes the invention (a view of the conductive sheet 860s seen from the upper side in FIG. 41). Referring to FIG. 42, the conductive sheet 860s is formed in a sheet-like shape (a thin membrane shape), and a number of through holes 865s are formed in the conductive sheet 860s so as to spread two-dimensionally. Each through hole 865s is circular and has a common diameter (that is, each through hole 865 has common shape and size). The through holes 865s are arranged in a staggered pattern. The conductive sheet 860s is made of gold and is joined to one side of the anode-side porous portion 840s by thermal-compression bonding, soldering, welding, or the like. Note that the through holes 865s of the conductive sheet 860s may be arranged in a grid pattern.

The sealer 700s is provided at the outer periphery of the stack portion 800s along the plane thereof (will be referred to as "planar direction"). The sealer 700s is manufactured by setting the stack portion 800s on a mold such that the outer peripheral end face of the stack portion 800s faces the cavity of the mold and then injecting material into the cavity. As such, the sealer 700s is formed so as to surround the outer periphery of the stack portion 800s air-tightly with no gaps therebetween. The sealer 700s is made of a material that is gas-impermeable and elastic and exhibits a high thermal resistance within the operation temperature range of the fuel cell unit, such as rubber and elastomer. More specifically, silicon rubber, butyl rubber, acrylic rubber, natural rubber, fluorine rubber, ethylene propylene rubber, styrene elastomer, fluorine elastomer, etc. may be used as the material of the sealer 700s.

As shown in FIG. 39 to FIG. 41, the sealer 700s has a support portion 710s and ribs 720s provided on the both sides of the support portion 710s and forming a seal line. Referring to FIG. 40, through holes are formed in the support portion 710s. These through holes form the manifolds 120s to 150s, respectively (Refer to FIG. 38). When the seal-integrated power generation assemblies 200s and the separators 600s are stacked, each rib 720s sticks to the adjacent separator 600s and thus seals between the seal-integrated power generation assembly 200s and the separator 600s, preventing leaks of the reaction gas and the coolant. The rib 720s forms a seal line surrounding the stack portion 800s entirely and seal lines surrounding the respective manifold holes entirely as shown in FIG. 40.

E-4-A3. Structure of Separator 600s

Figure 43:
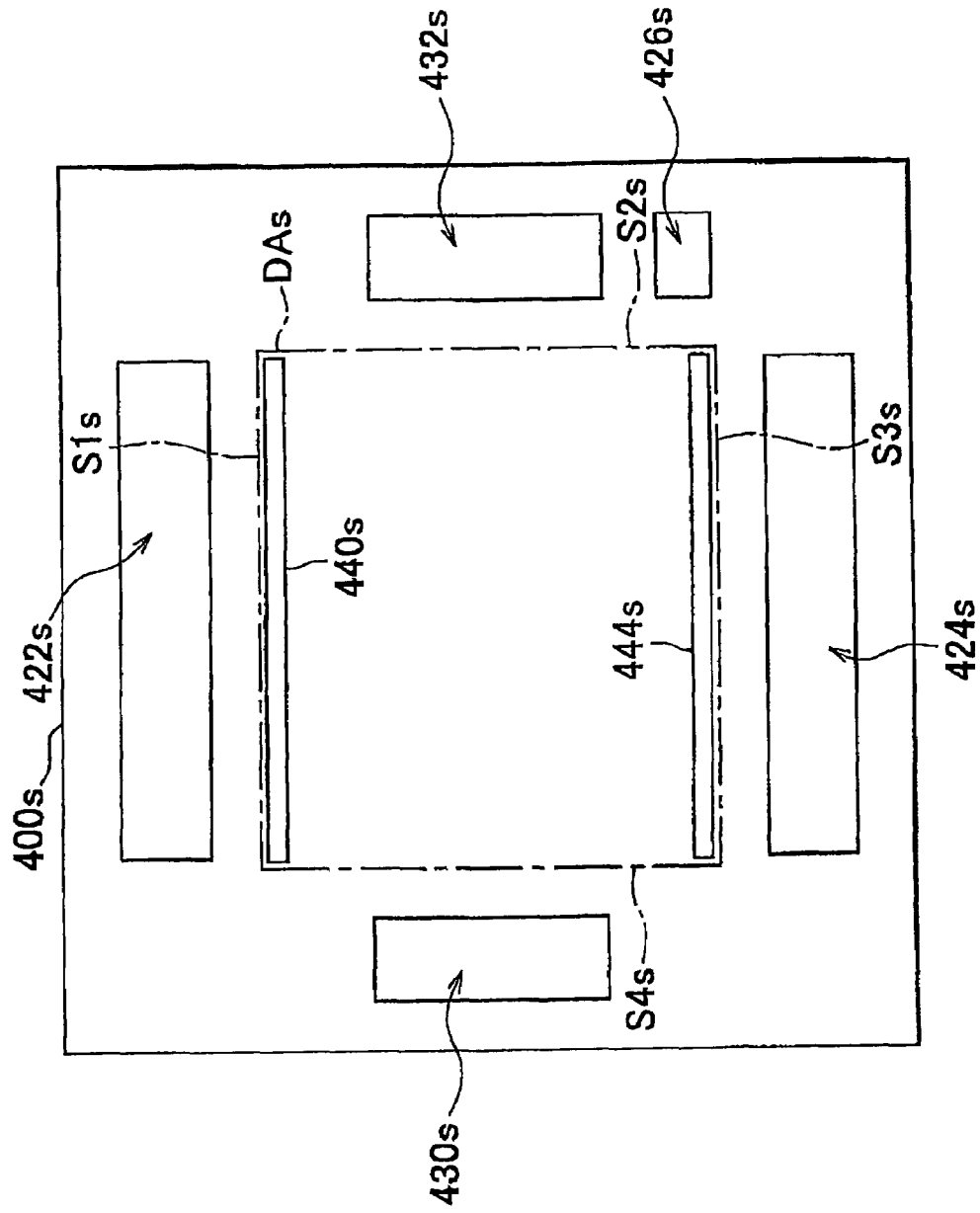
FIG. 43 is a view showing the shape of a cathode plate of a separator.
Figure 44:
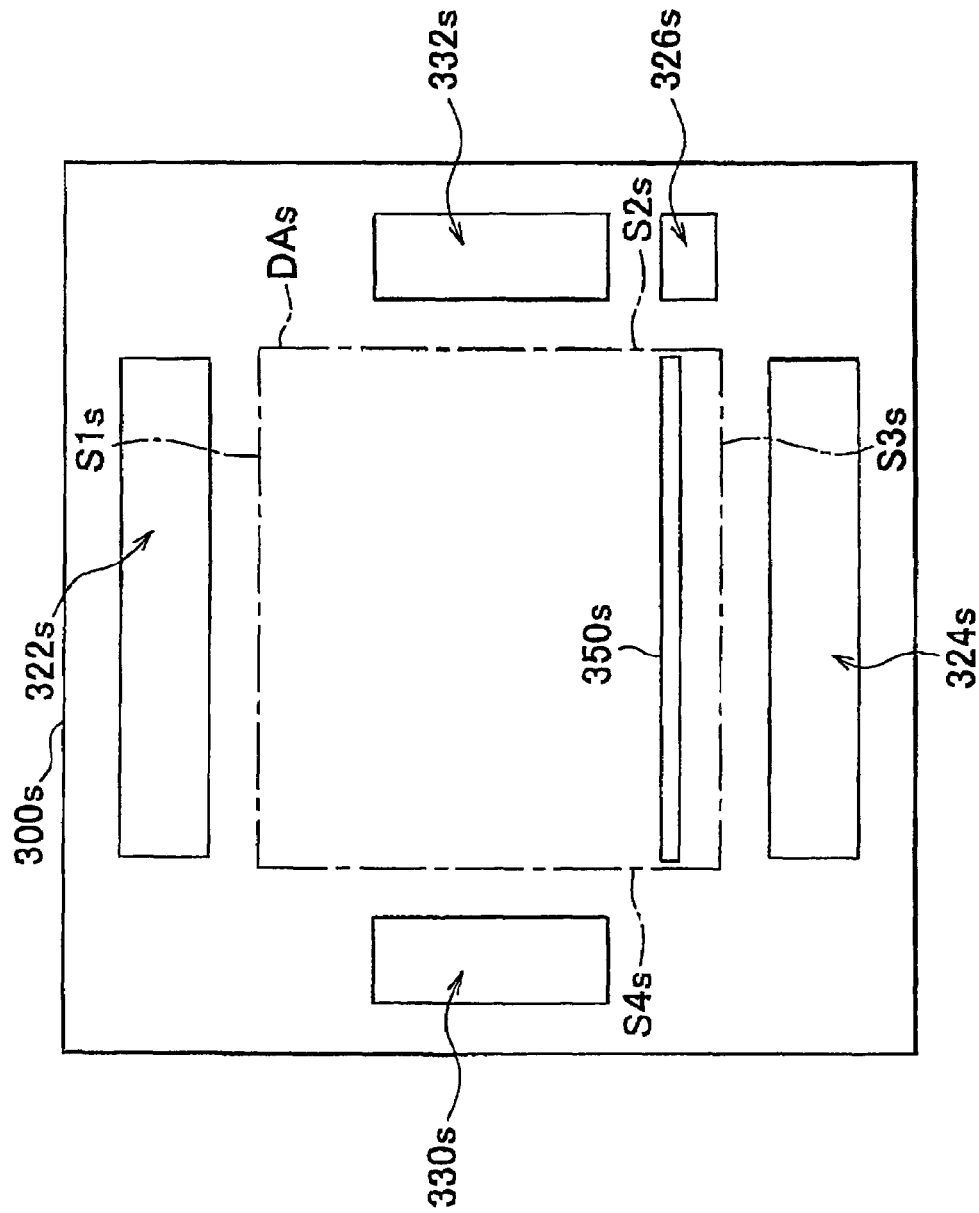
FIG. 44 is a view showing the shape of an anode plate of the separator.
Figure 45:
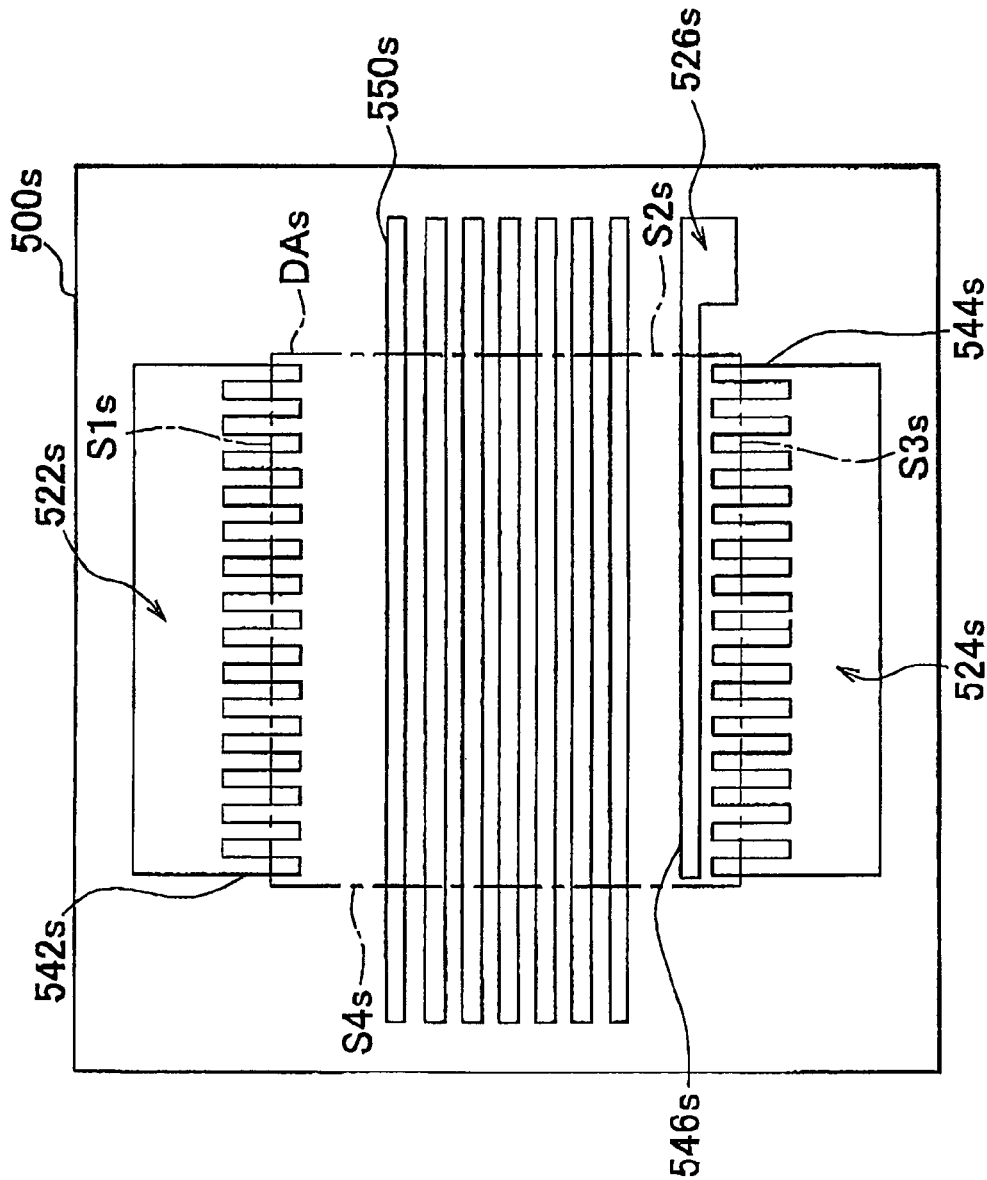
FIG. 45 is a view showing the shape of an intermediate plate of the separator.
Figure 46:
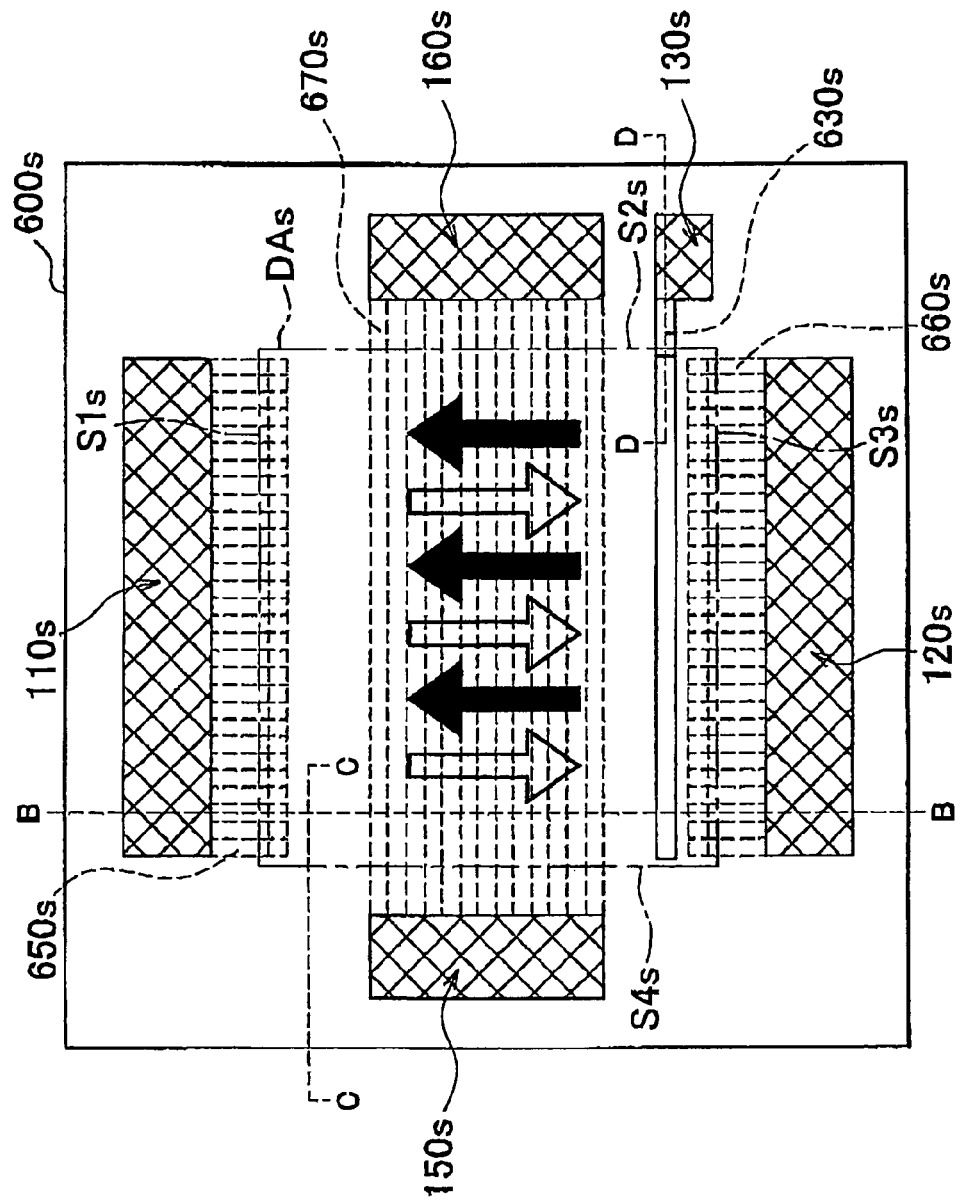
FIG. 46 is an elevation view of the separator.

FIG. 43 is a view showing the shape of a cathode plate 400s of the separator 600s. FIG. 44 is a view showing the shape of an anode plate 300s of the separator 600s. FIG. 45 is a view showing the shape of an intermediate plate 500s of the separator 600s. FIG. 46 is an elevation view of the separator 600s. In the following, the structure of the separator 600s will be described with reference to FIG. 43 to FIG. 46. The separator 600s is constituted of the cathode plate 400s, the anode plate 300s, and the intermediate plate 500s shown in FIG. 43, FIG. 44, and FIG. 45, respectively. FIG. 43, FIG. 44, FIG. 45, and FIG. 46 show views of the cathode plate 400s, the anode plate 300s, the intermediate plate 500s, and the separator 600s seen from the right side in FIG. 9. The black and white arrows in FIG. 46 will be later explained.

Indicated by broken lines at the centers of the plates 300s, 400s, and 500s and the separator 600s in FIG. 43 to FIG. 46 is a region DA that faces the air-side electrode layer 24 of the stack portion 800s of the seal-integrated power generation assembly 200s when the separators 600s and the seal-integrated power generation assemblies 200s are stacked to form the fuel cell unit 100s. Because the region DA is where power generation is performed, this region will hereinafter be referred to as "power generation region DA". Since the MEA 24s is rectangular, the power generation region DA is rectangular naturally. Referring to FIG. 43 to FIG. 46, the side S1 of the power generation region DA on the upper side will be referred to as "first side", the side S2 on the right side will be referred to as "second side", the side S3 on the lower side will be referred to as "third side", and the side S4 on the left side will be referred to as "fourth side". The first side S1 and the third side S3 are opposite to each other, and the second side S2 and the fourth side S4 are also opposite to each other. The first side S1 and the second side S2 are adjacent to each other. Likewise, the second side S2 and the third side S3, the third side S3 and the fourth side S4, and the fourth side S4 and the first side S1 are adjacent to each other.

The cathode plate 400s (FIG. 43) is made of, for example, stainless steel. The cathode plate 400s has five manifold openings 422s to 432s, an oxidizing-gas supply slit 440s, and an oxidizing-gas discharge slit 444s. The manifold openings 422s to 432s form the above-described manifolds in the fuel cell unit 100s, respectively. The manifold openings 422s to 432s are arranged on the respective outer sides of the power generation region DA. The oxidizing-gas supply slit 440s is an oblong opening having a substantially rectangular cross section and formed in the power generation region DA along the first side S1. The oxidizing-gas supply slit 440s extends almost the entire length of the first side S1. Likewise, the oxidizing-gas discharge slit 444s is an oblong opening having a substantially rectangular cross section and formed in the power generation region DA along the third side S3. The oxidizing-gas discharge slit 444s extends almost the entire length of the third side S3.

Like the cathode plate 400s, the anode plate 300s (FIG. 44) is made of, for example, stainless steel. The anode plate 300s has five manifold openings 322s to 332s and a fuel-gas supply slit 350s. The manifold openings 322s to 332s form the above-described manifolds in the fuel cell unit 100s, respectively. The manifold openings 322s to 332s are arranged on the respective outer sides of the power generation region DA. The fuel-gas supply slit 350s is formed in the power generation region DA along the third side S3 at such a position that, when the separator 600s is assembled, the fuel-gas supply slit 350s does not overlap the oxidizing-gas discharge slit 444s of the cathode plate 400s.

Like the anode plate 300s and the cathode plate 400s, the intermediate plate 500s (FIG. 45) is made of, for example, stainless steel. The intermediate plate 500s has three manifold openings 522s to 526s for supplying and discharging the reaction gases (oxidizing gas and fuel gas), a plurality of oxidizing-gas distribution passage openings 542s, a plurality of oxidizing-gas discharge passage openings 544s, and a single fuel-gas distribution passage opening 546s. Further, the intermediate plate 500s has a plurality of coolant passage openings 550s. The manifold openings 522s to 528s form the above-described manifolds in the fuel cell stack 100, respectively. The manifold openings 522s to 528s are arranged on the respective outer sides of the power generation region DA.

Each coolant passage opening 550s is oblong penetrating the power generation region DA in the horizontal direction of FIG. 45, and the both ends of the coolant passage opening 550s are located outside of the power generation region DA. That is, each coolant passage opening 550s extends across the second side S2 and the fourth side S4 of the power generation region DA. The coolant passage openings 550s are arranged at given intervals in the vertical direction of FIG. 45.

In the intermediate plate 500s (FIG. 45), the oxidizing-gas distribution passage openings 542s communicate, on one side, with the manifold opening 522s, whereby the oxidizing-gas distribution passage openings 542s and the manifold opening 522s together form a pectinate through hole. The end portions of the oxidizing-gas distribution passage openings 542s on the other side overlap the oxidizing-gas supply slit 440s of the cathode plate 400s when the anode plate 300s, the cathode plate 400s, and the intermediate plate 500s are joined together to form the separator 600s. Thus, the oxidizing-gas distribution passage openings 542s communicate with the oxidizing-gas supply slit 440s in the assembled separator 600s.

In the intermediate plate 500s (FIG. 45), the oxidizing-gas discharge passage openings 544s communicate, on one side, with the manifold opening 524s, whereby the oxidizing-gas discharge passage openings 544s and the manifold opening 524s together form a pectinate through hole. The end portions of the oxidizing-gas discharge passage openings 544s on the other side overlap the oxidizing-gas discharge slit 444s of the cathode plate 400s when the anode plate 300s, the cathode plate 400s, and the intermediate plate 500s are joined together to form the separator 600s. Thus, the oxidizing-gas discharge passage openings 544s communicate with the oxidizing-gas discharge slit 444s in the assembled separator 600s.

In the intermediate plate 500s (FIG. 45), the fuel-gas distribution passage opening 546s extends, on one side thereof, across the second side S2 and along the third side S3 at a position not overlapping the oxidizing-gas discharge passage openings 544s, and the end of the fuel-gas distribution passage opening 546s on the same side is located near the fourth side S4. That is, the fuel-gas distribution passage opening 546s extends substantially the entire length of the third side S3. The portion of the fuel-gas distribution passage opening 546s that is located in the power generation region DA overlaps the fuel-gas supply slit 350s of the anode plate 300s when the anode plate 300s, the cathode plate 400s, and the intermediate plate 500s are joined together to form the separator 600s. Thus, the fuel-gas distribution passage opening 546s communicates with the fuel-gas supply slit 350s in the assembled separator 600s.

Each separator 600s (FIG. 46) is assembled by joining the anode plate 300s, the cathode plate 400s, and the intermediate plate 500s such that the intermediate plate 500s is sandwiched between the anode plate 300s and the cathode plate 400s and then punching through the exposed portions at the regions corresponding to the coolant supply manifold 150s and the coolant discharge manifold 160s of the intermediate plate 500s, respectively. The three plates can be joined together by, for example, thermal-compression bonding, soldering, welding, or the like. This is how to manufacture the separators 600s each having the five manifolds 110s to 160s that are the through holes hatched in FIG. 46, a plurality of oxidizing-gas distribution passages 650s, a plurality of oxidizing-gas discharge passages 660s, a fuel-gas distribution passage 630s, and a plurality of coolant passages 670s.

As shown in FIG. 46, each oxidizing-gas distribution passage 650s is defined by the oxidizing-gas supply slit 440s of the cathode plate 400s and the corresponding one of the oxidizing-gas distribution passage openings 542s of the intermediate plate 500s. Each oxidizing-gas distribution passage 650s is an internal passage extending in the separator 600s, and one end of which communicates with the oxidizing-gas supply manifold 110s and the other end leads to the surface of the cathode plate 400s on the other side thereof. Further, as shown in FIG. 46, each oxidizing-gas discharge passage 660s is defined by the oxidizing-gas discharge slit 444s of the cathode plate 400s and the corresponding one of the oxidizing-gas discharge passage openings 544s of the intermediate plate 500s. Each oxidizing-gas discharge passage 660s is an internal passage extending in the separator 600s, and one end of which communicates with the oxidizing-gas discharge manifold 120s and the other end leads to the surface of the cathode plate 400s on the other side thereof.

Referring to FIG. 46, the fuel-gas distribution passage 630s is defined by the fuel-gas supply slit 350s of the anode plate 300s and the fuel-gas distribution passage opening 546s of the intermediate plate 500s. The fuel-gas distribution passage 630s is an internal passage communicating at one end with the fuel-gas supply manifold 130s and leading at the other end to the surface of the anode plate 300s on the other side. The coolant passages 670s are defined by the coolant passage openings 550s of the intermediate plate 500s (FIG. 45). Each coolant passage 670s communicates at one end with the coolant supply manifold 150s and at other end with the coolant discharge manifold 160s.

E-4-A4. Operation of Fuel Cell Unit 100s

Figure 47:
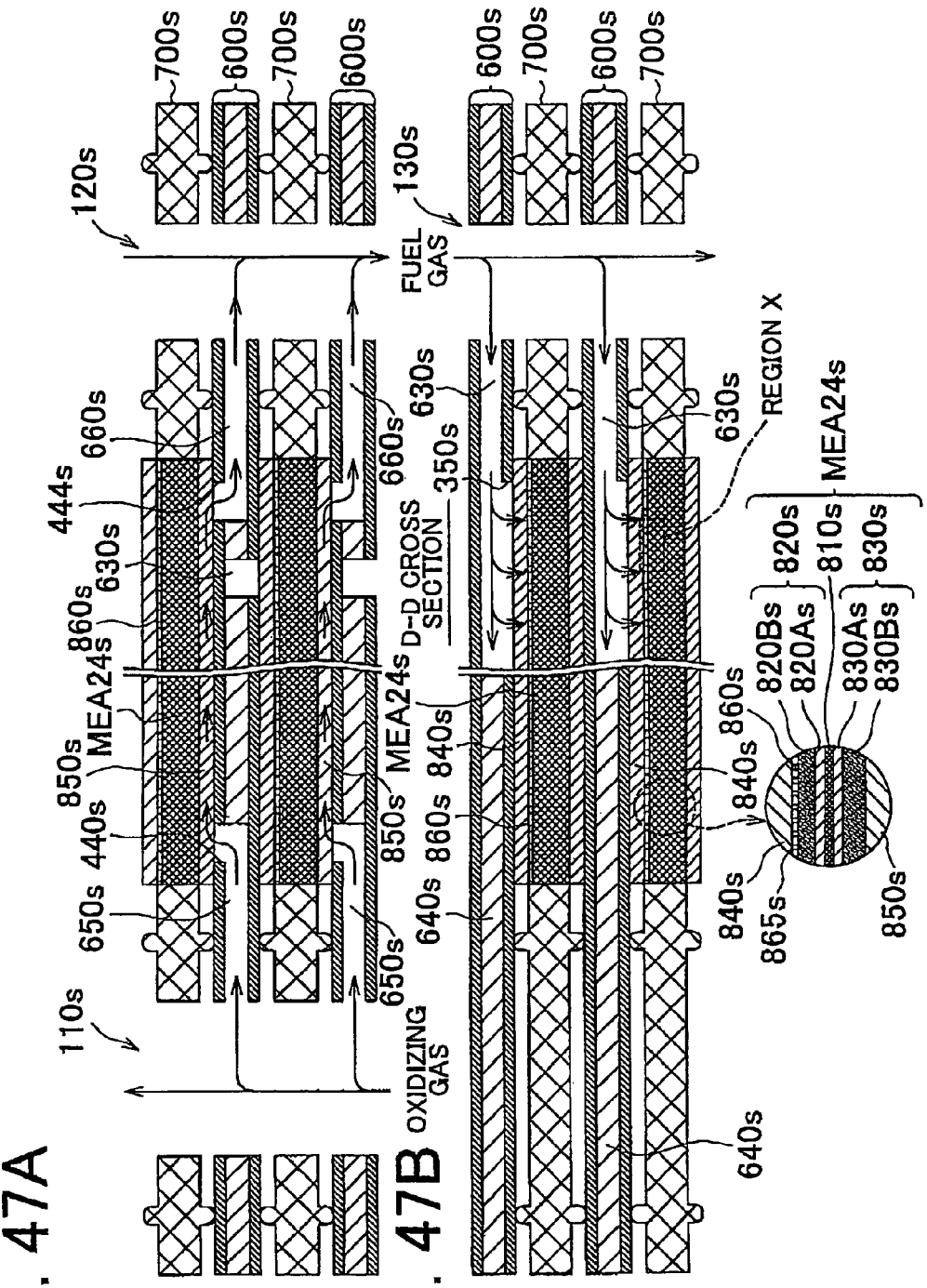
FIG. 47 is a view showing the reaction gas flows in the fuel cell unit of the example embodiment.
Figure 48:
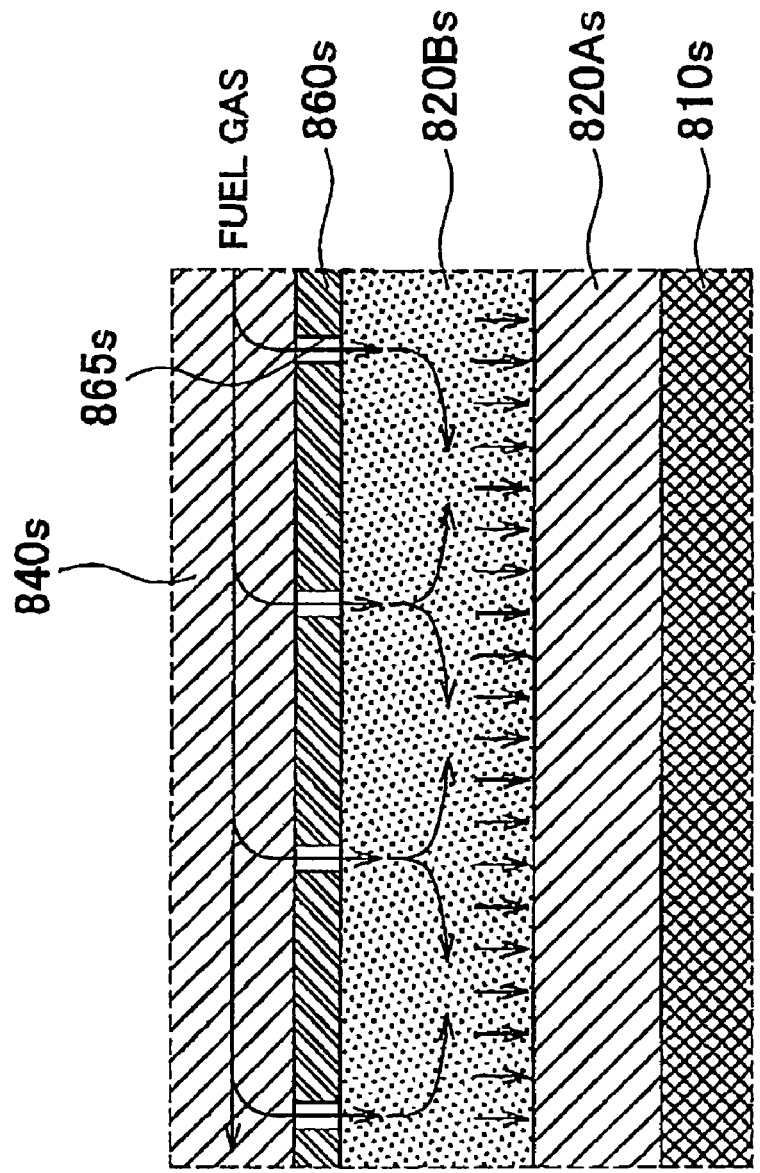
FIG. 48 is an enlarged view of the region X.

FIG. 47 is a view showing the reaction gas flows in the fuel cell unit 100s of the example embodiment. FIG. 48 is an enlarged view of the region X shown in FIG. 47. For the sake of clarity, FIG. 47 only shows two seal-integrated power generation assemblies 200s and two separators 600s, which are stacked. FIG. 47A shows a cross section taken along the line B-B in FIG. 46. The right side of FIG. 47B shows a cross section taken along the line D-D in FIG. 46 while the left side shows a cross section taken along the line C-C in FIG. 46. The arrows in FIG. 47 and FIG. 48 indicate the reaction gas flows.

The fuel cell unit 100s generates power in response to oxidizing gas being supplied to the oxidizing-gas supply manifold 110s and fuel gas being supplied to the fuel-gas supply manifold 130s. During the power generation of the fuel cell unit 100s, the heat generated by the power generation raises the temperature of the fuel cell unit 100s, and therefore coolant is supplied to the coolant supply manifold 150s to suppress the increase in the temperature of the fuel cell unit 100s.

The coolant supplied to the coolant supply manifold 150s is delivered to the coolant passage 670s. The coolant supplied to each coolant passage 670s flows from one end to the other end of the coolant passage 670s while performing heat exchange and then it is discharged to the coolant discharge manifold 160s.

As indicated by the arrows in FIG. 47A, the oxidizing gas supplied to the oxidizing-gas supply manifold 110s flows through the oxidizing-gas distribution passage 650s and then enters the cathode-side porous portion 850s via the oxidizing-gas supply slit 440s (FIG. 43). After thus entering the cathode-side porous portion 850s, the oxidizing gas flows through the inside of the cathode-side porous portion 850s, which serves as an oxidizing-gas supply passage, from the upper side to the lower side as indicated by the white arrows in FIG. 46. Then, the oxidizing gas enters the oxidizing-gas discharge passage 660s via the oxidizing-gas discharge slit 444s (FIG. 43), and then the oxidizing gas is discharged to the oxidizing-gas discharge manifold 120s via the oxidizing-gas distribution passage 650s. A portion of the oxidizing gas flowing through the inside of the cathode-side porous portion 850s diffuses throughout the entire portion of the cathode 830s abutting on the cathode-side porous portion 850s and then it is used for cathode reactions (e.g., $2H^+ + 2e^- + (1/2)O_2 \rightarrow H_2O$).

As indicated by the arrows in FIG. 47B, the fuel gas supplied to the fuel-gas supply manifold 130s flows from the fuel-gas supply manifold 130s to the fuel-gas distribution passage 630s and then enters the anode-side porous portion 840s via the fuel-gas supply slit 350s (FIG. 44). After thus entering the anode-side porous portion 840s, the fuel gas flows through the inside of the anode-side porous portion 840s, which serves an a fuel-gas supply passage, from the lower side to the upper side as indicated by the black arrows in FIG. 46. At this time, as shown in FIG. 48, the fuel gas enters the anode 820s (an anode-side gas diffusion later 820s) via the through holes 865s of the conductive sheet 860s abutting on the anode-side porous portion 840s and then is used for anode reactions (e.g., $H_2 \rightarrow 2H^+ + 2e^-$). Detail on the gas diffusion in the anode-side diffusion layer 820Bs will be later described with reference to FIG. 48. The fuel cell unit 100s of the example embodiment employs an anode dead-end structure including no fuel-gas discharge passages and outlets, and therefore the fuel gas supplied to the anode-side porous portion 840s is basically consumed at the anode 820s.

Meanwhile, in some cases, nitrogen in oxidizing gas leaks from the cathode 830s side to the anode 820s side. Such leaking nitrogen or the like will hereinafter be referred to as "leak gas" where necessary. In the fuel cell unit 100s of the example embodiment, the pressure at which fuel gas is supplied to the fuel-gas supply passage portion (will be referred to as "fuel-gas supply pressure" where necessary) and the pressure at which oxidizing is supplied to the oxidizing-gas supply passage portion (will be referred to as "oxidizing-gas supply pressure" where necessary) are set such that the minimum value of the pressure of fuel gas flowing in the fuel-gas supply passage portion is larger than the maximum value of the partial pressure of the leak gas at the anode 820s which has leaked from the cathode 830s side through the electrolyte membrane 810s. This requirement may be satisfied by either setting only one of the fuel-gas supply pressure and the oxidizing-gas supply pressure to a given value or setting both of the fuel-gas supply pressure and the oxidizing-gas supply pressure to given values. The set value of the fuel-gas supply pressure and/or the set value of the oxidizing-gas supply pressure are determined based on, for example, particular data empirically obtained.

As described above, in the fuel cell unit 100s of the example embodiment, the conductive sheet 860s is provided between the anode 820s (the anode-side diffusion layer 820Bs) and the anode-side porous portion 840s, which inhibits the leak gas from entering the anode-side porous portion 840s (fuel-gas supply passage portion) from the anode-side diffusion layer 820Bs and thus prevents the leak gas from stagnating at the anode-side porous portion 840s (fuel-gas supply passage portion).

In addition, the through holes 865s are formed in the conductive sheet 860s so as to spread two-dimensionally along the horizontal plane of the conductive sheet 860s. As such, after entering the anode-side porous portion 840s, the fuel gas flows into each through hole 865s in the direction perpendicular to the surface of the anode 820s (the anode-side diffusion layer 820Bs), which is the stacking direction, and then enters the anode 820s and disperses throughout the entire anode-side diffusion layer 820Bs, whereby the fuel gas is supplied to the catalyst layer 820As (Refer to FIG. 48). According to this structure, that is, the fuel gas supplied to the anode-side porous portion 840s can be dispersedly supplied to the anode 820s and thus power generation can be performed using the entire portion of the anode 820s (the catalyst layer 820As). As such, the power generation efficiency of the fuel cell unit 100s improves.

Further, in the fuel cell unit 100s of the example embodiment, the fuel-gas supply pressure and the oxidizing-gas supply pressure are adjusted such that the minimum value of the pressure of fuel gas flowing in the fuel-gas supply passage portion is larger than the maximum value of the partial pressure of the leak gas at the anode 820s which has leaked from the cathode 830s side via the electrolyte membrane 810s. This arrangement significantly reduces the amount of the leak gas entering the anode-side porous portion 840s from the anode 820s (the anode-side diffusion layer 820Bs) via the through holes 865s of the conductive sheet 860s.

Further, in the fuel cell unit 100s of the example embodiment, the gas flow resistance of the anode-side diffusion layer 820Bs is higher than that of the anode-side porous portion 840s. Thus, the fuel gas supplied to the anode-side diffusion layer 820Bs via the through holes 865s of the conductive sheet 860s can be more reliably dispersed throughout the entire portion of the anode-side diffusion layer 820Bs.

In the foregoing example embodiment, the anode 820s and the cathode 830s correspond to "anode" and "cathode" in the claims, the anode-side diffusion layer 820Bs corresponds to "gas diffusion layer" in the claims, the conductive sheet 860s corresponds to "conductive sheet portion" in the claims, the through holes 865s correspond to "through hole" in the claims, the anode-side porous portion 840s corresponds to "conductive porous portion" in the claims, and the separators 600s correspond to "separator" in the claims.

Note that the invention is not limited to the structures and arrangements employed in the foregoing example embodiment. To the contrary, the invention is intended to cover various modifications and equivalent arrangements within the sprit and scope of the invention.

E-4-B1: First Modification Example of Example Embodiment

Figure 49:
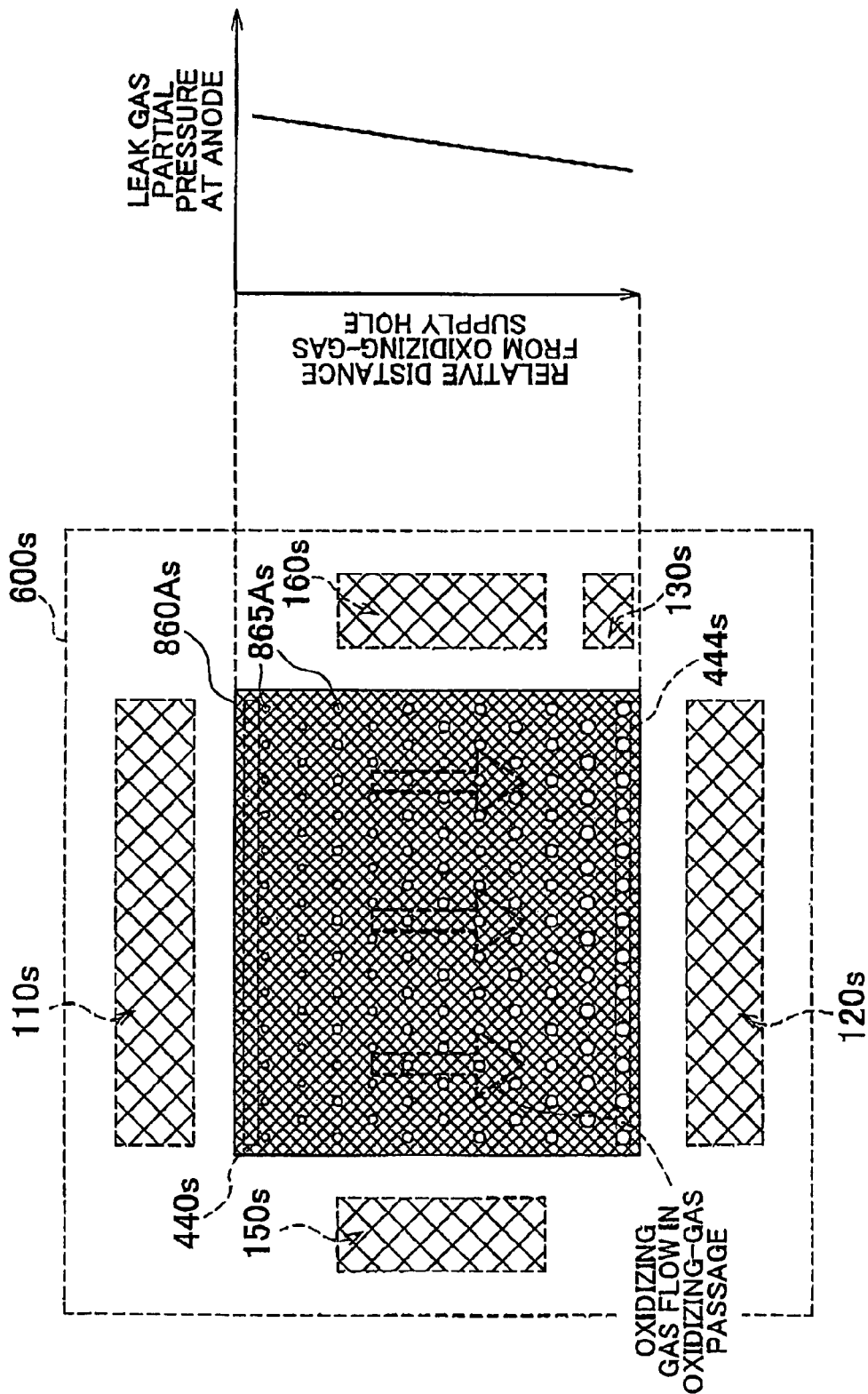
FIG. 49 is a view showing a conductive sheet of a fuel cell unit according to the first modification example.
Figure 50:
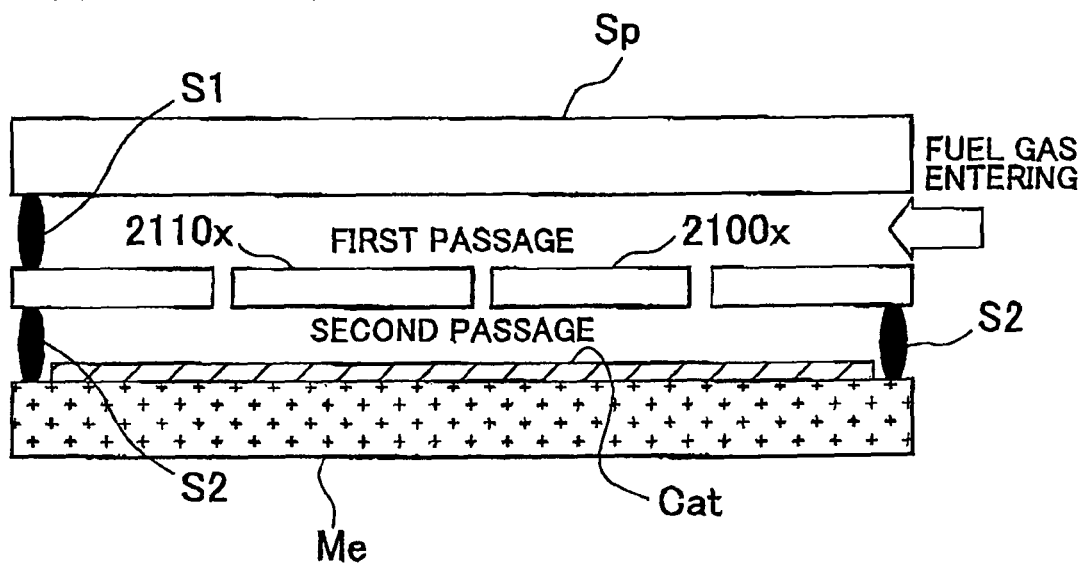
FIG. 50 is a view showing other example of a passage structure in a fuel cell (first example)
Figure 51:
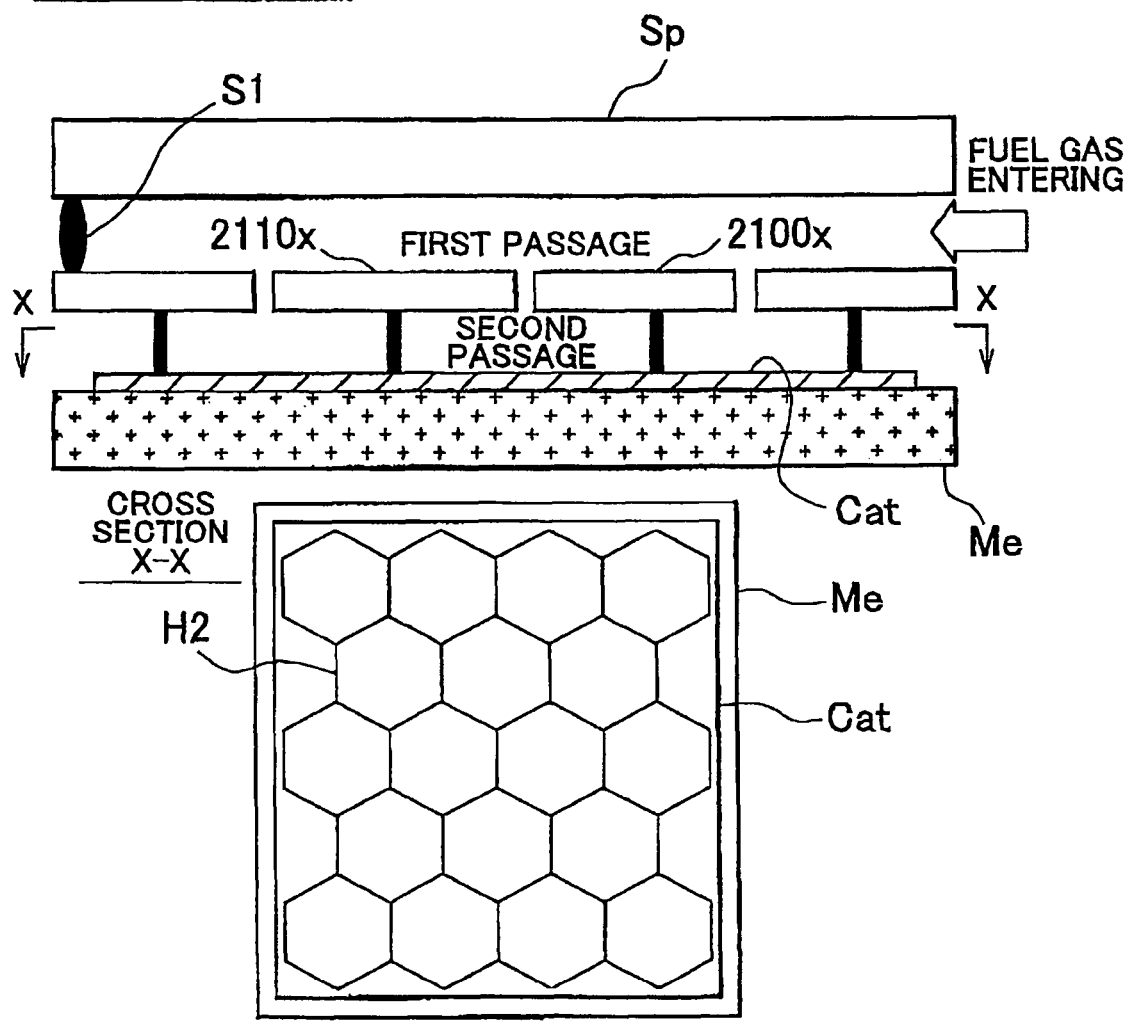
FIG. 51 is a view showing other example of a passage structure in a fuel cell (second example).

FIG. 49 is a view showing a conductive sheet 860As of a fuel cell unit according to the first modification example. FIG. 49 is an elevation view of the conductive sheet 860As in a state where the stack portions 800s each including the conductive sheet 860s and the separators 600s are stacked. In FIG. 49, only the cathode plate 400s of the separator 600s (broken line) is shown, and other plates of the separator 600s and other stack portions 800s (the anode-side porous portions 840s, etc) are not shown.

While the through holes 865s of the conductive sheet 860s of the fuel cell unit 100s of the foregoing example embodiment have a common diameter, the invention is not limited to this. In the first modification example, the through holes 865As of the conductive sheet 860As are formed as follows. Referring to FIG. 49, the through holes 865As are formed such that the larger the relative distance from the oxidizing-gas supply slit 440s (i.e., an oxidizing-gas supply hole for supplying oxidizing gas to the cathode 830s), in other words, the smaller the relative distance to the oxidizing-gas discharge slit 444s (i.e., an oxidizing-gas discharge hole for discharging the oxidizing gas from the cathode 830s), the larger the diameter of the through hole 865As. This is because the smaller the relative distance from the oxidizing-gas supply slit 440s, the higher the leak gas partial pressure at the anode 820s, and the larger the relative distance to the oxidizing-gas discharge slit 444s, the lower the leak gas partial pressure at the anode 820s.

Thus, in the first modification example, the through holes 865As are formed such that the closer to the oxidizing-gas supply slit 440s, that is, the higher the leak gas partial pressure at the corresponding portion of the anode 820s, the smaller the diameter of the through hole 865As, and such that the closer to the oxidizing-gas discharge slit 444s (the more distant from the oxidizing-gas supply slit 440s), that is, the lower the leak gas partial pressure at the corresponding portion of the anode 820s, the larger the diameter of the through hole 865s. According to this structure, because the diameters of the through holes 865s formed in the portion of the conductive sheet 860As corresponding to the region of the anode 820s where the leak gas partial pressure is high are relatively small, the fuel gas flow rate at said through holes 865s is relatively high, thus inhibiting the leak gas from entering the anode-side porous portion 840s, and on the other hand, because the diameters of the through holes 865s formed in the portion of the conductive sheet 860As corresponding to the region of the anode 820s where the leak gas partial pressure is low are relatively large, the exhaust water leaking from the cathode 830s to the anode 820s (will be referred to as "leak water"

where necessary) can be discharged to the anode-side porous portion 840s via said through holes 865As.

E-4-B2. Second Modification Example of Example Embodiment

While a gold sheet is used as the conductive sheet 860s in the fuel cell unit 100s of the foregoing example embodiment, the invention is not limited to this. That is, the conductive sheet 860s may be made of various other materials, such as titanium and stainless steel. In this case, the conductive sheet 860s is joined to one side of the anode-side porous portion 840s by thermal-compression bonding, soldering, welding, or the like.

Further, the conductive sheet 860s may be made of a conductive polymer paste, such as a silver paste, a carbon paste, and a silver-carbon paste. In this case, after forming the conductive polymer paste into a sheet-like shape, the formed sheet may be joined to one side of the anode-side porous portion 840s by thermal-compression bonding or the formed sheet may be jointed to the anode-side porous portion 840s in the following method.

First, a conductive polymer paste is prepared, and then the paste is applied to one side of the anode-side porous portion 840s and mildly impregnated into the anode-side porous portion 840s, after which thermal-compression bonding is performed. This method reduces the contact resistance between the conductive sheet 860s and the anode-side porous portion 840s. When using a conductive polymer paste, the through holes 865s are formed (punched) using a pinholder-like tool, for example. Further, in the case where a conductive polymer paste is applied into a sheet-like shape as mentioned above, the through holes 865s may be formed using a mold having a plurality of projections. In this case, the projections of the mold form the through holes 865s.

Further, the conductive sheet 860s may be joined to the anode-side porous portion 840s using a metal material (e.g., gold), which will referred to as "material M", in the following method. In this method, the material M is first prepared, and then it is plated to one side of the anode-side porous portion 840s. This reduces the contact resistance between the conductive sheet 860s and the anode-side porous portion 840s. Before plating the material M to the anode-side porous portion 840s, the corresponding surface of the anode-side porous portion 840s may be masked in advance. In this case, the through holes 865s are formed by removing the mask from the anode-side porous portion 840s after the plating of the material M.

E-4-B3. Third Modification Example of Example Embodiment

While the separators 600s are each constituted of the three metal plates stacked and have flat surfaces in the fuel cell unit 100s of the foregoing example embodiment, the separators 600s may have various other structures and various other shapes.

E-4-B4: Fourth Modification Example of Example Embodiment

While the materials of the respective parts and portions of each stack portion 800s and the respective parts and portions of each separator 600s have been specified in the foregoing example embodiment, they are only exemplary. That is, various other materials may be used. For example, while the anode-side porous portion 840s and the cathode-side porous portion 850s are made of porous metal material in the foregoing example embodiment, they may alternatively be made of other materials such as porous carbon materials. Further, while the separators 600s are made of metal in the foregoing example embodiment, they may alternatively be made of other materials such as carbon.

E-4-B5. Fifth Modification Example of Example Embodiment

While the fuel cell unit 100s of the foregoing example embodiment has a closed structure that does not discharge the fuel gas from the anode to the outside (anode dead-end structure), the invention is not limited to this. For example, the fuel cell unit 100s may have holes, passages, and manifolds for discharging fuel gas. In such a case, for example, a check valve that checks the fuel gas discharged from a fuel-gas discharge manifold (will be referred to as "check valve N") is provided outside of the fuel cell unit 100s, and the check valve N is closed at least during the normal power generation of the fuel cell unit 100s so that the fuel gas supplied to the anode 820s is not discharged to the outside. Irrespective of such modifications, the effects obtained by the fuel cell unit 100s are substantially the same as those described above.

The invention claimed is:

1. A fuel cell in form of a solid polymer fuel cell, comprising:
   an electrolyte;
   a hydrogen-side electrode layer provided on one side of the electrolyte and having a hydrogen-gas consuming face at which hydrogen gas is consumed;
   an air side electrode layer provided on the other side of the electrolyte and having an oxidizing-gas consuming face at which oxidizing gas is consumed;
   a first separator provided adjacent to the hydrogen-gas consuming face;
   a second separator provided adjacent to the oxidizing-gas consuming face;
   a fuel gas supply plate that has a plurality of through holes and is located between the first separator and the hydrogen side electrode layer;
   a first gas passage portion that is located between the first separator and the fuel gas supply plate; and
   a second gas passage portion that is located between the fuel gas supply plate and the hydrogen-side electrode layer,
   wherein the first gas passage portion and the second gas passage portion each have a porous portion permeable to a reaction gas, and a pressure loss per unit length of the porous portion of the second gas passage portion is smaller than a pressure loss per unit length of the porous portion of the first gas passage portion, when the first gas passage portion and the second gas passage portion are provided with gas at a same flow rate, to disperse nitrogen gas in the second passage.

2. The fuel cell according to claim 1, wherein:
   the first gas passage portion is a portion through which the hydrogen gas is distributed toward predetermined regions of the hydrogen-gas consuming face of the hydrogen-side electrode layer;
   the second gas passage portion is a portion through which the distributed gases are supplied to the predetermined regions of the hydrogen-gas consuming face of the hydrogen-side electrode layer; and
   the fuel gas supply plate suppresses a reverse flow from the second gas passage portion to the first gas passage portion.

3. The fuel cell according to claim 2, wherein
the fuel gas supply plate supplies hydrogen gas at a flow rate equal to or higher than a flow rate that is predetermined based on a diffusion rate of nitrogen in a given operation state of the fuel cell.

4. The fuel cell according to claim 1, wherein
the water repellency of the second gas passage portion increases toward the electrolyte in a direction in which components of the fuel cell are stacked.

5. The fuel cell according to claim 1, wherein
the hydrophilicity of the second gas passage portion increases toward the side away from the electrolyte in a direction in which components of the fuel cell are stacked.

6. The fuel cell according to claim 1, wherein
the second gas passage portion is formed of a porous material, the density of which increases toward the side away from the electrolyte in a direction in which components of the fuel cell are stacked.

7. The fuel cell according to claim 1, wherein:
the oxidizing gas contains air,
the hydrogen-side electrode layer is provided on an outer face of the electrolyte on one side of the electrolyte and has a gas diffusibility,
the air side electrode layer is provided on an outer face of the electrolyte on an other side of the electrolyte and has a gas diffusibility,
the fuel cell further comprising:
a conductive sheet portion provided adjacent to an outer face of the hydrogenside electrode layer, which has a gas impermeability, a sheet-like shape, and a plurality of through holes that spread two-dimensionally along a horizontal plane of the conductive sheet portion; and
a conductive porous portion provided adjacent to an outer face of the conductive sheet portion and forming a hydrogen-gas supply passage through which hydrogen gas is dispersedly distributed in directions along the horizontal plane of the conductive sheet portion, and
the first separator is provided adjacent to an outer face of the conductive porous portion.

8. The fuel cell according to claim 7, wherein
the diameter of a first through hole among the through holes of the conductive sheet portion is larger than the diameter of a second through hole that is closer to an oxidizing-gas supply hole for supplying oxidizing gas to the air side electrode layer than the first through hole is.

9. The fuel cell according to claim 1, wherein
the oxidizing-gas consuming face of the air side electrode layer has a plurality of grooves through which the oxidizing gas is supplied to the oxidizing-gas consuming face.

10. The fuel cell according to claim 1, wherein
a water retention groove is provided at a position near a passage for discharging the oxidizing gas and adjacent the oxidizing-gas consuming face of the air side electrode layer.

11. The fuel cell according to claim 2, wherein
the hydrogen gas is supplied through the first gas passage portion to the predetermined regions in a direction crossing the hydrogen-gas consuming face of the hydrogen-side electrode layer.

12. The fuel cell according to the claim 11, wherein
the first gas passage portion is partitioned off from the hydrogen-gas consuming face of the hydrogen-side electrode layer.

13. The fuel cell according to claim 1, wherein
the fuel cell does not have any manifold for discharging the hydrogen gas.

14. The fuel cell according to claim 1, further comprising
a manifold for discharging the hydrogen gas, wherein said manifold is closed during normal power generation of the fuel cell.

15. A vehicle comprising:
the fuel cell according to claim 1, and
a drive portion that drives the vehicle using power supplied from the fuel cell.

16. The fuel cell according to claim 1, wherein
the fuel gas supply plate has a projection on a side opposite from the hydrogen-gas consuming face, the projection forming a third gas passage.

17. The fuel cell according to claim 1, wherein
the aperture ratio of the fuel gas supply plate is approximately 1% or lower.

18. The fuel cell according to claim 1, wherein:
the fuel gas supply plate is provided adjacent to a face of the hydrogen-side electrode layer which is opposite to a face of the hydrogen-side electrode layer adjacent to the electrolyte,
the fuel gas supply plate has a gas impermeability, a sheet-like shape, and a plurality of through holes that spread two-dimensionally along a horizontal plane of the fuel gas supply plate, and
the fuel cell further includes a conductive porous portion that is provided adjacent to a face of the fuel gas supply plate which is opposite to a face of the fuel gas supply plate adjacent to the hydrogen-side electrode layer, and that forms the first gas passage portion through which the hydrogen gas is dispersedly distributed in directions along the horizontal plane of the fuel gas supply plate.

19. The fuel cell according to claim 1 wherein
the fuel gas supply plate is a metal plate that is provided adjacent to a face of the hydrogen-side electrode layer which is opposite to a face of the hydrogen-side electrode layer adjacent to the electrolyte, and
the fuel gas supply plate has a gas impermeability, a sheet-like shape, and a plurality of through holes that spread two-dimensionally along a horizontal plane of the metal plate.

20. The fuel cell according to claim 19, further comprising:
a gasket that surrounds an end portion of the hydrogen-side electrode layer, that is made of a material more rigid than a material of the hydrogen-side electrode layer against a compressive force acting across a thickness of the gasket.

21. The fuel cell according to claim 1,
wherein an oxidizing-gas passage portion is a passage through which oxidizing-gas is supplied to the oxidizing-gas consuming face,
wherein a sealer is provided between the first separator and the second separator, that sticks to the first separator and the second separator so that the sealer seals between the sealer and the first separator and between the sealer and the second separator,
wherein the electrolyte, the hydrogen-side electrode layer, and the fuel gas supply plate have a sheet-like shape, and
wherein the sealer is formed so as to surround end portions of the electrolyte, the hydrogen-side electrode layer and the air side electrode layer air-tightly with no gaps between the sealer and the electrolyte, between the sealer and the hydrogen-side electrode layer, and between the sealer and the air side electrode layer.

* * * * *